(12) United States Patent
Lee et al.

(10) Patent No.: US 12,444,764 B2
(45) Date of Patent: Oct. 14, 2025

(54) COMPLEX FIBER, SOLID STATE ELECTROLYTE COMPRISING SAME, AND METAL-AIR BATTERY COMPRISING SAME

(71) Applicant: FLEXOLYTE, Ansan-Si (KR)

(72) Inventors: Jung-Ho Lee, Ansan-si (KR); Sambhaji Shivaji Shinde, Ansan-si (KR); Dong-Hyung Kim, Ansan-si (KR)

(73) Assignee: FLEXOLYTE, Ansan-si (KR)

( * ) Notice: Subject to any disclaimer, the term of this patent is extended or adjusted under 35 U.S.C. 154(b) by 628 days.

(21) Appl. No.: 17/418,304

(22) PCT Filed: Feb. 22, 2021

(86) PCT No.: PCT/KR2021/002214
§ 371 (c)(1),
(2) Date: Jun. 25, 2021

(87) PCT Pub. No.: WO2021/167431
PCT Pub. Date: Aug. 26, 2021

(65) Prior Publication Data
US 2021/0408567 A1 Dec. 30, 2021

(30) Foreign Application Priority Data

| Feb. 20, 2020 | (KR) | 10-2020-0021252 |
| Feb. 20, 2020 | (KR) | 10-2020-0021253 |
| Feb. 21, 2020 | (KR) | 10-2020-0021894 |
| Nov. 30, 2020 | (KR) | 10-2020-0164652 |
| Nov. 30, 2020 | (KR) | 10-2020-0164653 |

(51) Int. Cl.
| H01M 8/1016 | (2016.01) |
| H01M 12/06 | (2006.01) |
| H01M 50/403 | (2021.01) |
| H01M 50/429 | (2021.01) |

(52) U.S. Cl.
CPC ......... *H01M 8/1016* (2013.01); *H01M 12/06* (2013.01); *H01M 50/403* (2021.01); *H01M 50/4295* (2021.01); *H01M 2220/20* (2013.01); *H01M 2300/0065* (2013.01)

(58) Field of Classification Search
CPC ........... H01M 8/1016; H01M 10/0565; H01M 50/403; H01M 2300/0065; H01M 2220/20; H01M 50/4295; H01M 12/06
See application file for complete search history.

(56) References Cited

U.S. PATENT DOCUMENTS

| 4,049,879 A | 9/1977 | Thompson et al. |
| 6,001,507 A | 12/1999 | Ono et al. |
| 7,629,080 B1 | 12/2009 | Allen et al. |
| 8,257,849 B2 | 9/2012 | Uchida |
| 8,277,966 B2 | 10/2012 | Yoon et al. |
| 8,716,168 B2 | 5/2014 | Yoo et al. |
| 9,362,567 B2 | 6/2016 | Kim et al. |
| 9,751,078 B2 | 9/2017 | Yoo et al. |
| 9,954,231 B2 | 4/2018 | Kim et al. |
| 10,026,966 B2 | 7/2018 | Kakehata et al. |
| 10,199,692 B2 | 2/2019 | Kim et al. |
| 10,566,670 B2 | 2/2020 | Choi |
| 2010/0068461 A1 | 3/2010 | Wallace et al. |
| 2011/0031935 A1 | 2/2011 | Miyoshi et al. |
| 2014/0248539 A1 | 9/2014 | Liu |
| 2015/0050556 A1 | 2/2015 | Liu et al. |
| 2016/0322684 A1 | 11/2016 | Choi |
| 2016/0322685 A1 | 11/2016 | Choi |
| 2017/0141429 A1 | 5/2017 | Lee et al. |
| 2017/0373320 A1 | 12/2017 | Choi et al. |
| 2018/0114967 A1 | 4/2018 | Kim et al. |
| 2019/0067737 A1 | 2/2019 | Zhi et al. |
| 2019/0134609 A1 | 5/2019 | Yamauchi et al. |
| 2019/0181520 A1 | 6/2019 | Baik et al. |
| 2019/0273297 A1 | 9/2019 | Weisenstein et al. |
| 2019/0309426 A1 | 10/2019 | Jin et al. |
| 2020/0112050 A1 | 4/2020 | Hu et al. |
| 2022/0059888 A1 | 2/2022 | Iwata et al. |
| 2022/0407149 A1 | 12/2022 | Lee et al. |
| 2023/0088732 A1 | 3/2023 | Lee et al. |
| 2023/0092377 A1 | 3/2023 | Lee et al. |
| 2023/0420700 A9 | 12/2023 | Lee et al. |

FOREIGN PATENT DOCUMENTS

| CN | 103441300 A | 12/2013 |
| CN | 105733004 A | 7/2016 |
| CN | 107565159 A | 1/2018 |
| CN | 110227454 A | 9/2019 |
| CN | 106784611 B | 10/2019 |
| JP | 2005-154710 A | 6/2005 |
| JP | 2006-156041 A | 6/2006 |

(Continued)

OTHER PUBLICATIONS

Kotatha, Ditpon; "Preparation and characterization of gel electrolyte with bacterial cellulose coated with alternating layers of chitosan and alginate for electric double layer capacitors." Res Chem Intermed (2018) 44:4971-4987 (Year: 2018).*

Das, Gautam et al., Scientific Reports, "Quaternized cellulose and graphene oxide crosslinked polyphenylene oxide based anion exchange membrane", Jul. 2019, vol. 9, 11 pages (Year: 2019).*

Das, Gautam et al., Scientific Reports, Electronic Supplementary Information for "Quaternized cellulose and graphene oxide crosslinked polyphenylene oxide based anion exchange membrane", Jul. 2019, vol. 9, 7 pages (Year: 2019).*

Kim, Hyeyun et al., ACS Applied Energy Materials, "Lithium Ion Battery Separators Based on Carboxylated Cellulose Nanofibers from Wood", 2019, vol. 2, pp. 1241-1250 (Year: 2019).*

Kim, Jaehwan et al., J. Polym. Res., "Preparation and characterization of a Bacterial cellulose/Chitosan composite for potential biomedical application", 2011, vol. 18, pp. 739-744 (Year: 2011).*

(Continued)

*Primary Examiner* — Bahar Craigo
(74) *Attorney, Agent, or Firm* — Finch & Maloney PLLC

(57) ABSTRACT

A solid state electrolyte is provided. The solid state electrolyte may include a base complex fiber having bacterial cellulose and chitosan bound to the bacterial cellulose.

7 Claims, 43 Drawing Sheets

(56) References Cited

FOREIGN PATENT DOCUMENTS

| | | |
|---|---|---|
| JP | 2009-541198 A | 11/2009 |
| JP | 2015-504568 A2 | 2/2015 |
| JP | 2015-198056 A2 | 11/2015 |
| JP | 5924731 B2 | 5/2016 |
| JP | 6041813 B2 | 12/2016 |
| JP | 2017-516274 A | 6/2017 |
| JP | 6303278 B2 | 4/2018 |
| KR | 10-2007-0110568 A | 9/2008 |
| KR | 10-2011-0083940 A | 7/2011 |
| KR | 10-2012-0094249 A | 8/2012 |
| KR | 10-2012-0139066 A | 12/2012 |
| KR | 10-2013-0064019 A | 6/2013 |
| KR | 10-1281772 B1 | 6/2013 |
| KR | 10-2013-0118582 A | 10/2013 |
| KR | 10-2014-0046213 A | 4/2014 |
| KR | 10-2014-0137427 A | 12/2014 |
| KR | 10-2015-0031213 A | 3/2015 |
| KR | 10-1572545 B1 | 11/2015 |
| KR | 10-2016-0122009 A | 10/2016 |
| KR | 10-2016-0128164 A | 11/2016 |
| KR | 10-1734301 B1 | 5/2017 |
| KR | 1733492 B1 | 5/2017 |
| KR | 10-2018-0000941 A | 1/2018 |
| KR | 10-2018-0004407 A | 1/2018 |
| KR | 10-1827155 B1 | 2/2018 |
| KR | 10-2019-0139586 A | 12/2019 |
| KR | 10-2019-0139911 A | 12/2019 |
| WO | 2014-200198 | 12/2014 |

OTHER PUBLICATIONS

Phisalaphong, Muenduen et al., Carbohydrate Polymers, "Biosynthesis and characterization of bacteria cellulose-chitosan film", 2008, vol. 74, pp. 482-488 (Year: 2008).*

Torres, F.G. et al., Materials Science & Engineering C, "Bacterial cellulose nanocomposites: An all-nano type of material", 2019, vol. 98, pp. 1277-1293 (Year: 2019).*

Merriam-Webster "inject", available at https://www.merriam-webster.com/dictionary/inject, obtained online Aug. 6, 2024 (Year: 2024).*

Fernandes, S. C. et al., Green Chemistry, "Novel transparent nanocomposite films based on chitosan and bacterial cellulose", 2009, vol. 11, pp. 2023-2029 (Year: 2009).*

International Search Report for International Application PCT/KR2021/002214 mailed Jun. 1, 2021, 5 pages.

International Written Opinion for International Application PCT/KR2021/002214 mailed Jun. 1, 2021, 5 pages.

Kibsgaard et al., "Molybdenum Phosphosulfide: An Active, Acid-Stable, Earth-Abundant Catalyst for the Hydrogen Evolution Reaction", Angew. Chem. Int. Ed. 53, 1-6 (2014).

Kotatha et al., "Preparation and characterization of gel electrolyte with bacterial cellulose coated with alternating layers of chitosan and alginate for electric double-layer capacitors", Res Chem Intermed 44:4971-4987 (2018).

Luo et al., "Characterization of TEMPO-oxidized bacterial cellulose scaffolds for tissue engineering applications", Materials Chemistry and Physics, http://dx.doi.org/10.1016/j.matchemphys.2013.09.012 (2013).

Patel et al., "Electrochemically active and robust cobalt doped copper phosphosulfide electro-catalysts for hydrogen evolution reaction in electrolytic and photoelectrochemical water splitting", International Journal of Hydrogen Energy, https://doi.org/10.1016/j.ijhydene.2018.02.147 (2018).

Yue et al., "Sulfonated bacterial cellulose/polyaniline composite membrane for use as gel polymer electrolyte", Composites Science and Technology 145, 122-131 (2017).

Extended European Search Report and Opinion, Europe Patent Application 21756905 (9 pages) (Apr. 16, 2024).

Muhmed et al., "Emerging chitosan and cellulose green materials for ion exchange membrane fuel cell: a review", Energ. Ecol. Environ., https://doi.org/10.1007/s40974-019-00127-4 (Jul. 22, 2019).

Lai et al., "Nanocomposite films based on TEMPO-mediated oxidized bacterial cellulose and chitosan", Cellulose, 21:2757-2772 (2014).

Extended European Search Report, Europe Patent Application EP 21 731 881 (search report dated Mar. 18, 2025) (10 pages).

Xu et al., "Sulfur-doped Cu3P | S electrocatalyst for hydrogen evolution reaction", Materials Research Express, vol. 6, No. 7, p. 75501 (doi: 10.1088/2053-1591/ab1293) (2019).

Foresti et al., "Applications of bacterial cellulose as precursor of carbon and composites with metal oxide, metal sulfide and metal nanoparticles: A review of recent advances", Carbohydrate Polymers, 157, 447-467 (2017).

M. Minakshi et al., "Synthesis and characterization of olivine LiNiPO1 for aqueous rechargeable battery", Electrochimica Acta, 56, Jan. 31, 2011, pp. 4356-4360.

\* cited by examiner

[Fig. 1]
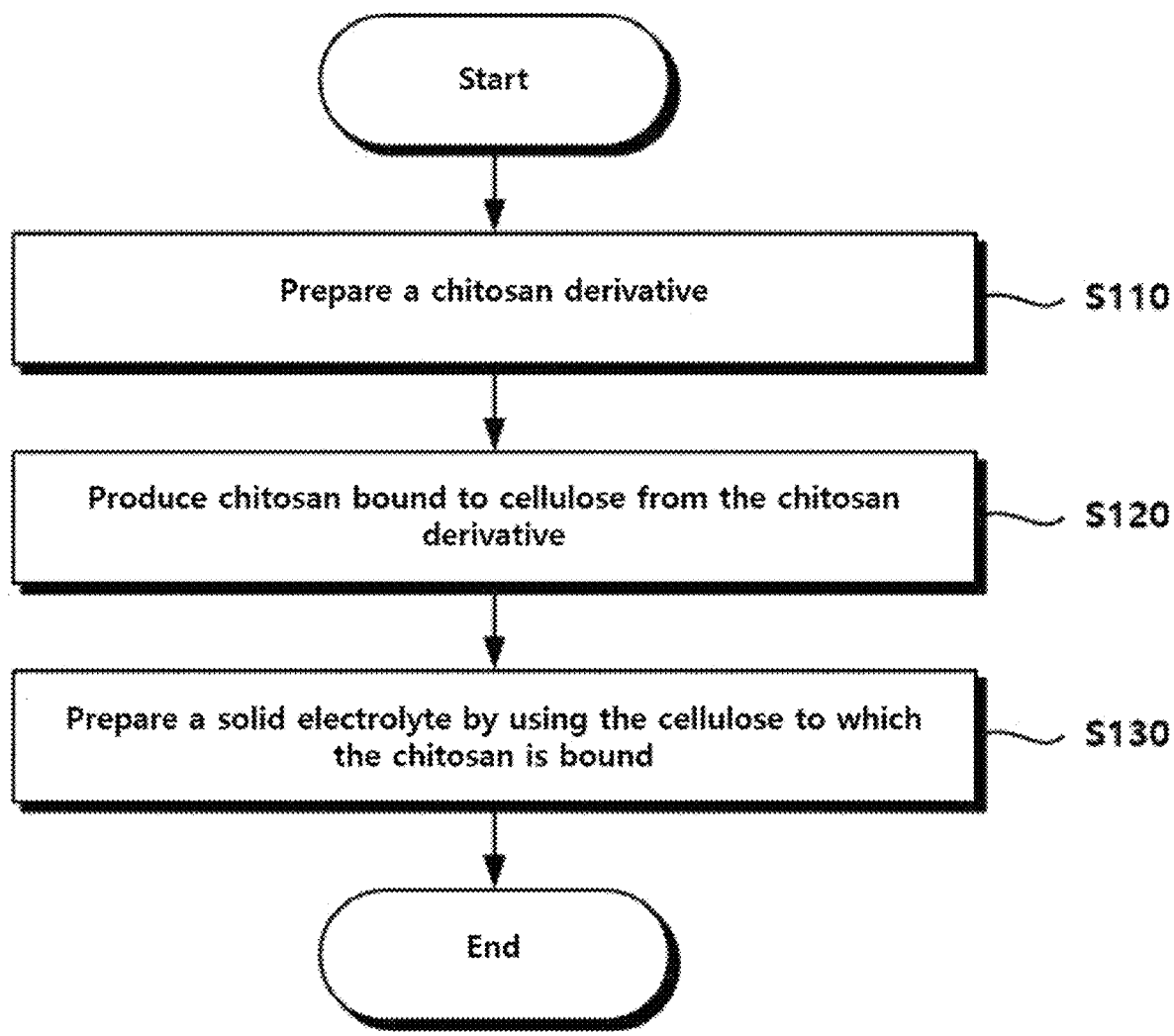

[Fig. 2]
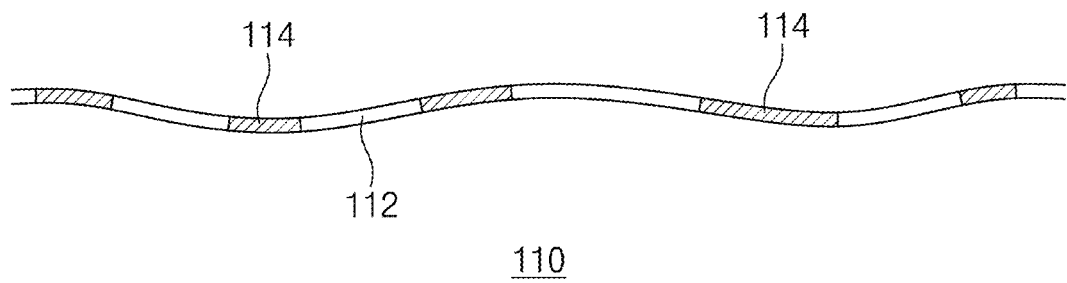
[Fig. 3]
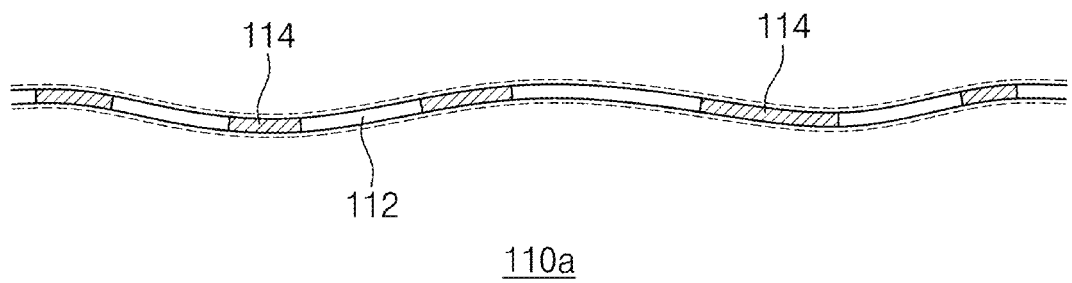
[Fig. 4]
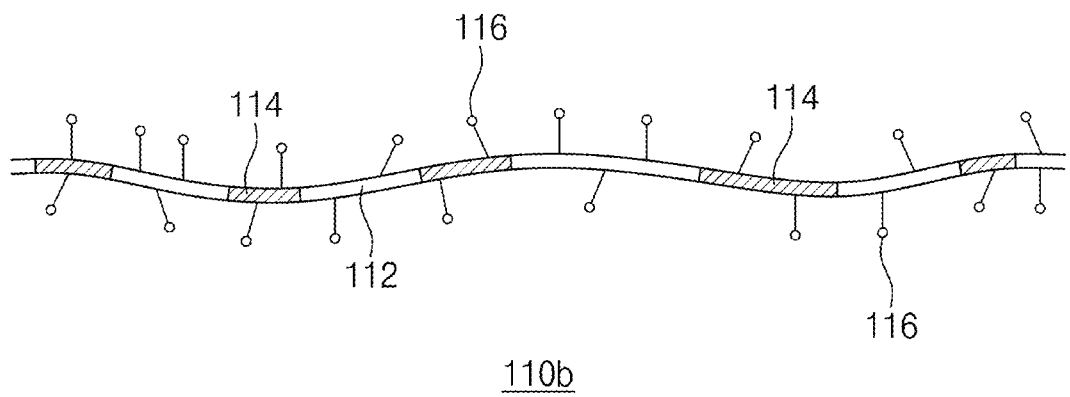

[Fig. 5]
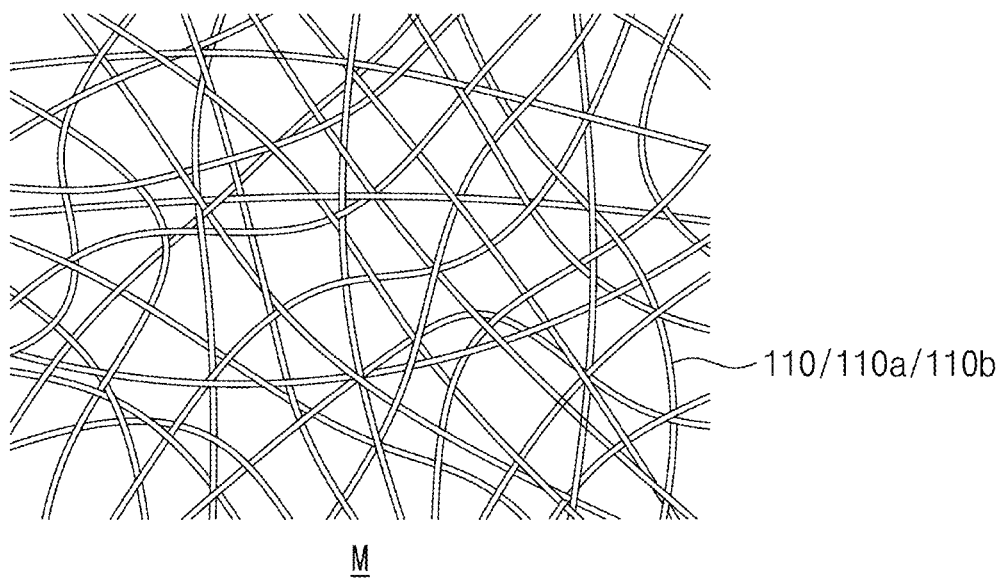
M
[Fig. 6]
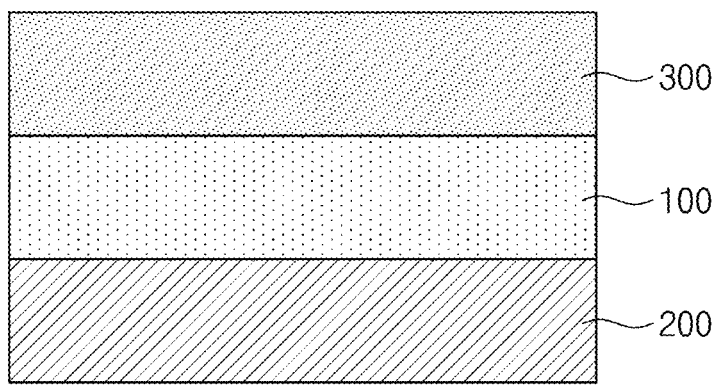

[Fig. 7]
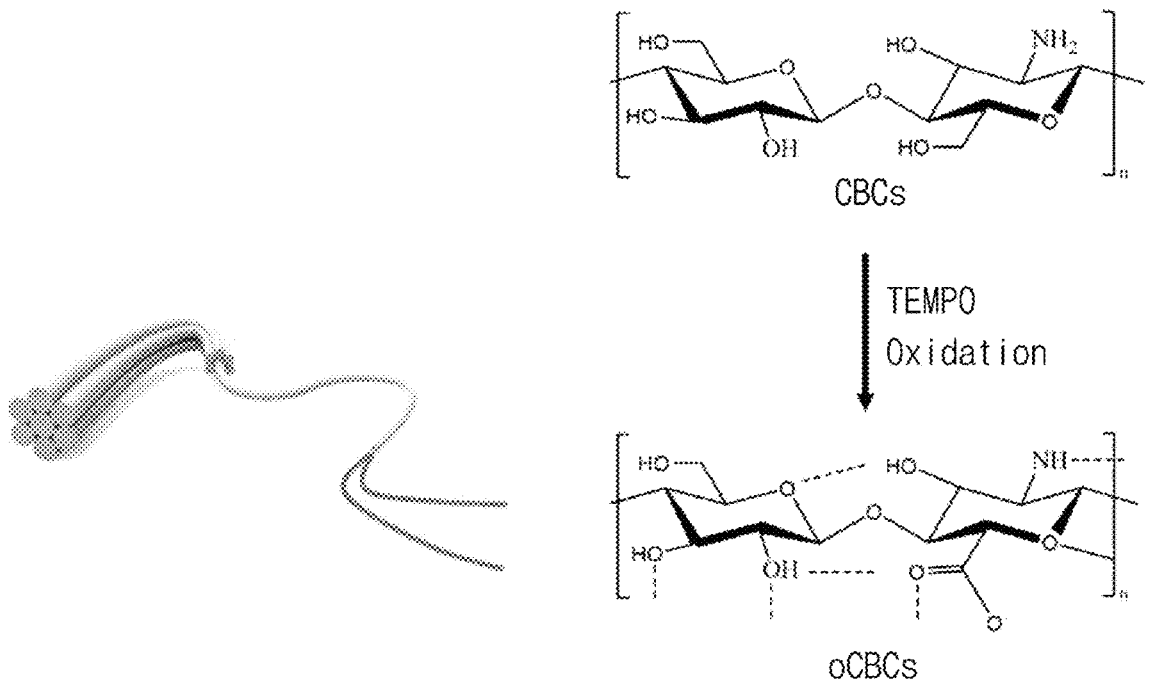
[Fig. 8]
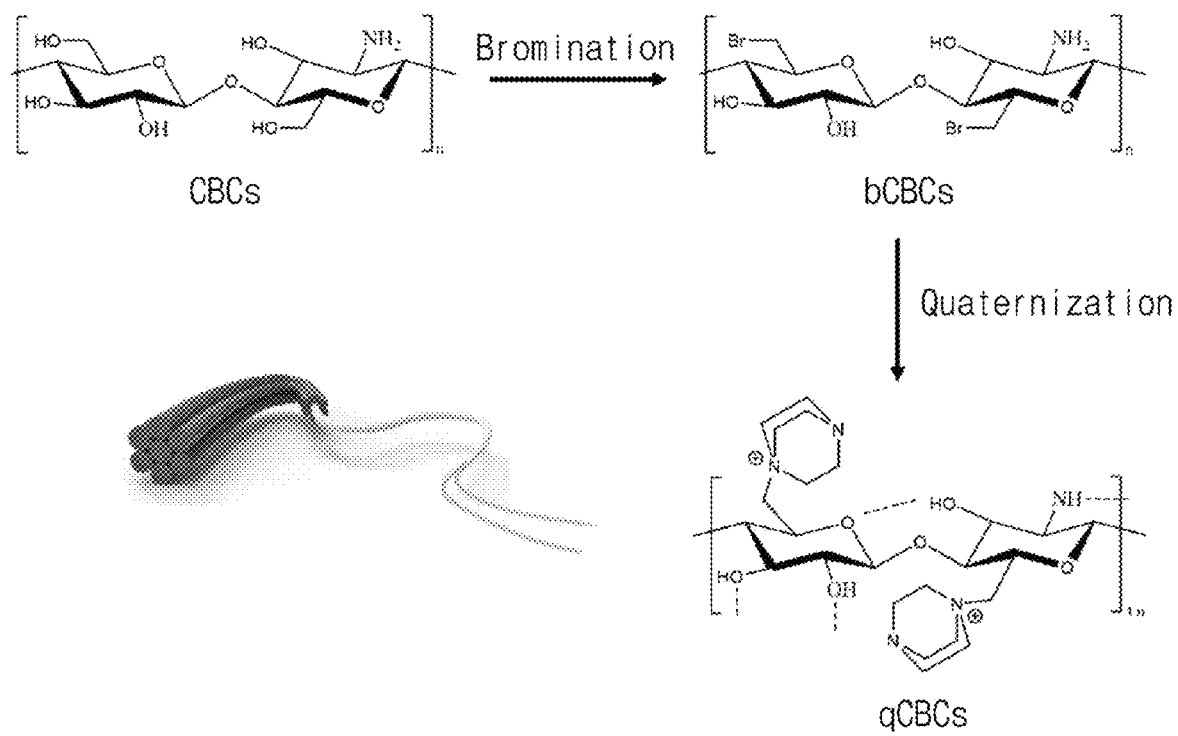

[Fig. 9]
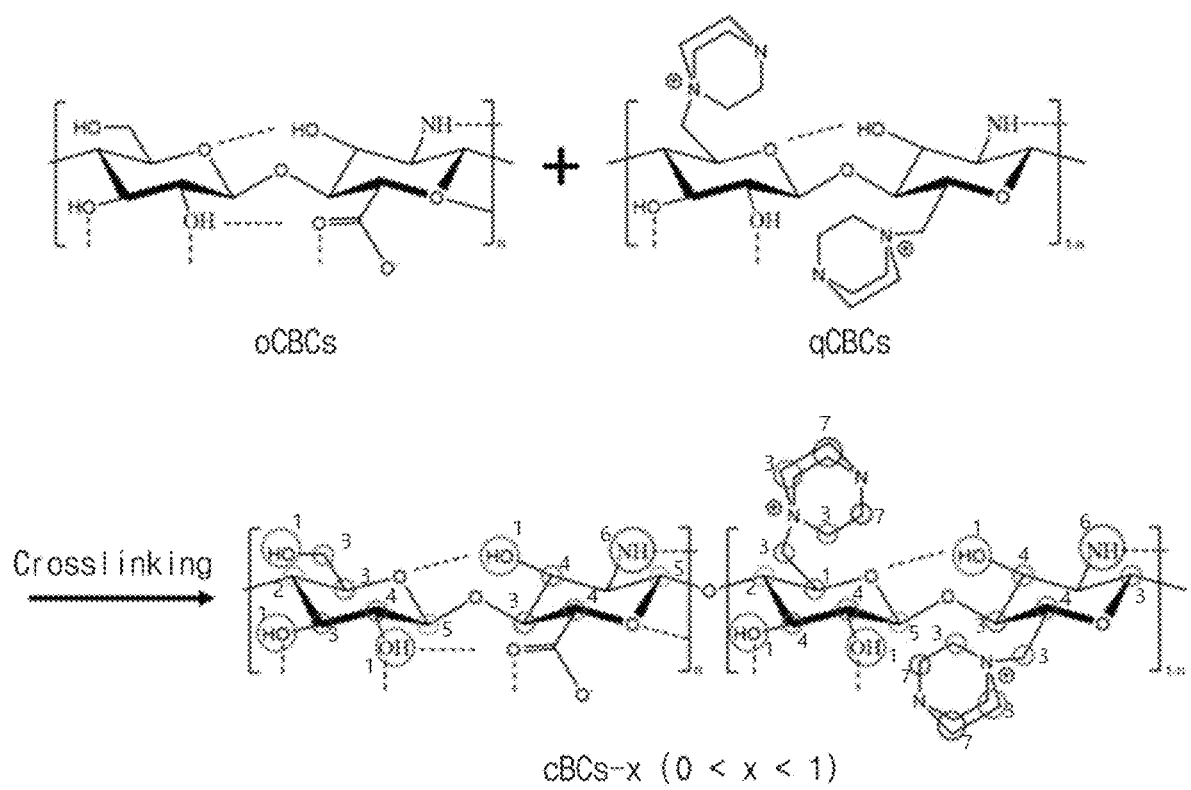

[Fig. 10]
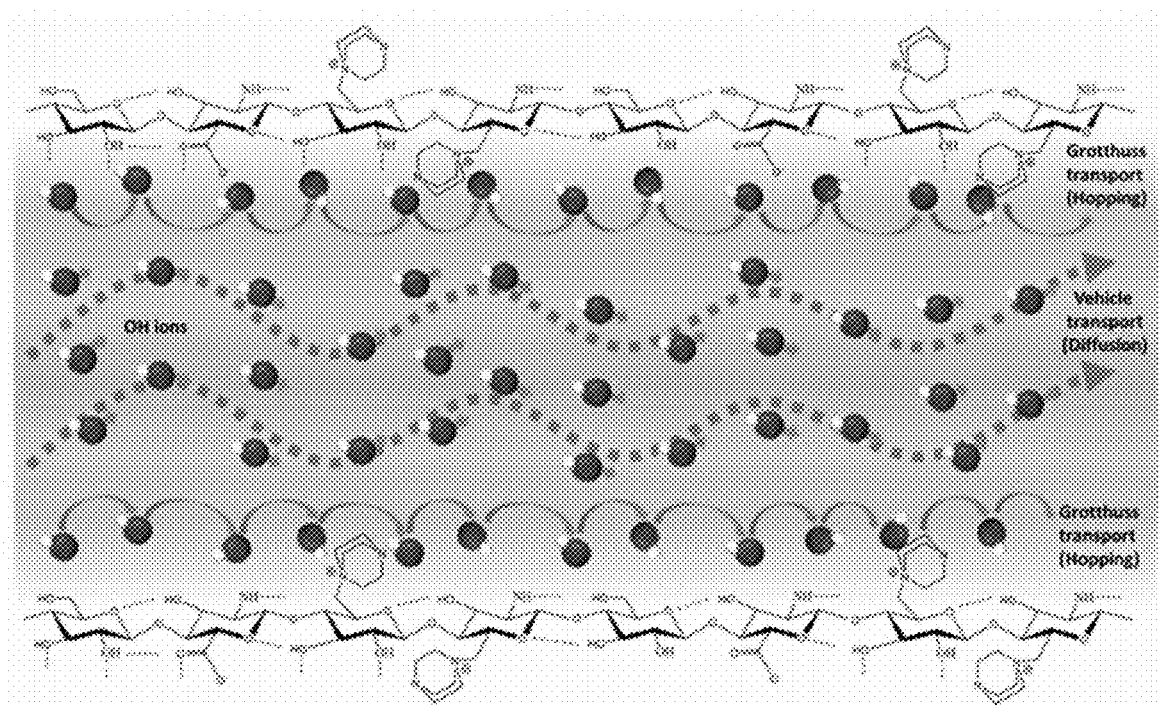

[Fig. 11]
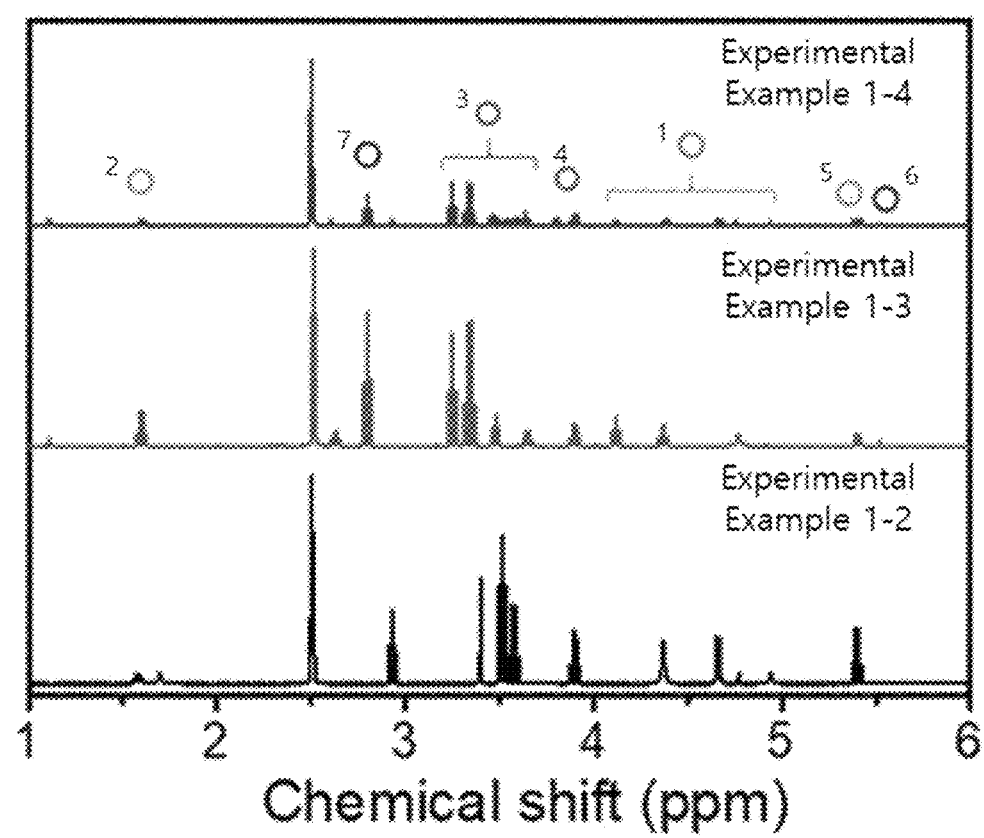

[Fig. 12]
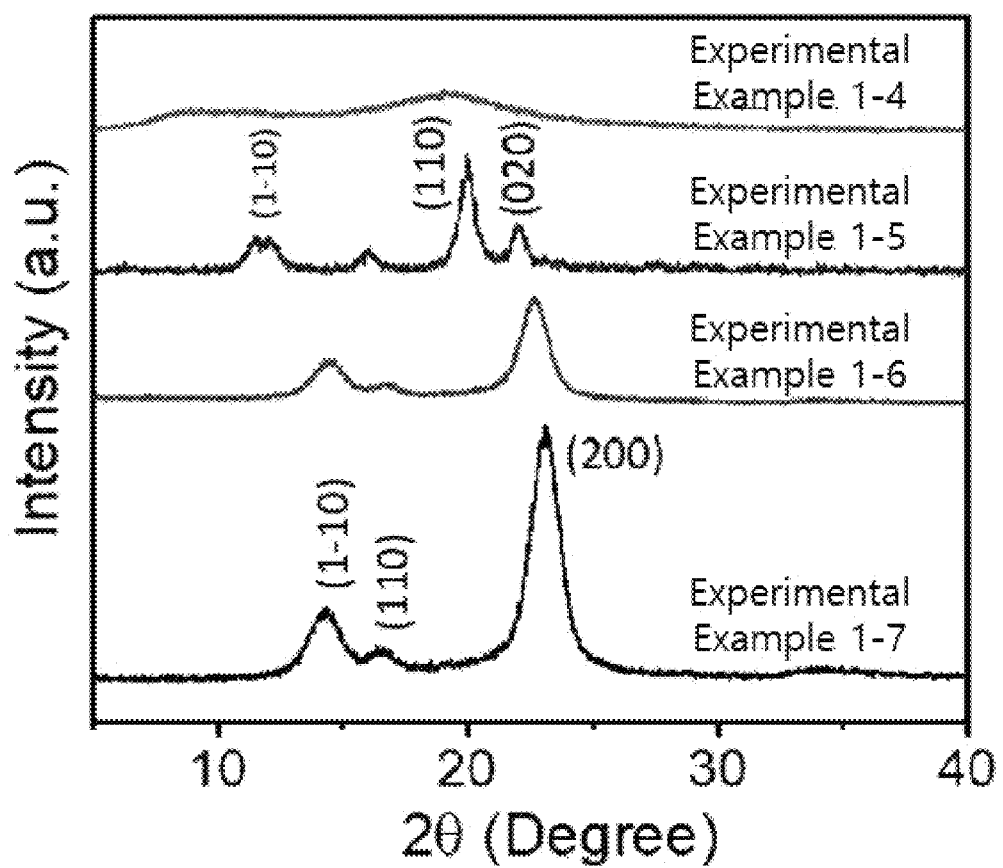

[Fig. 13]
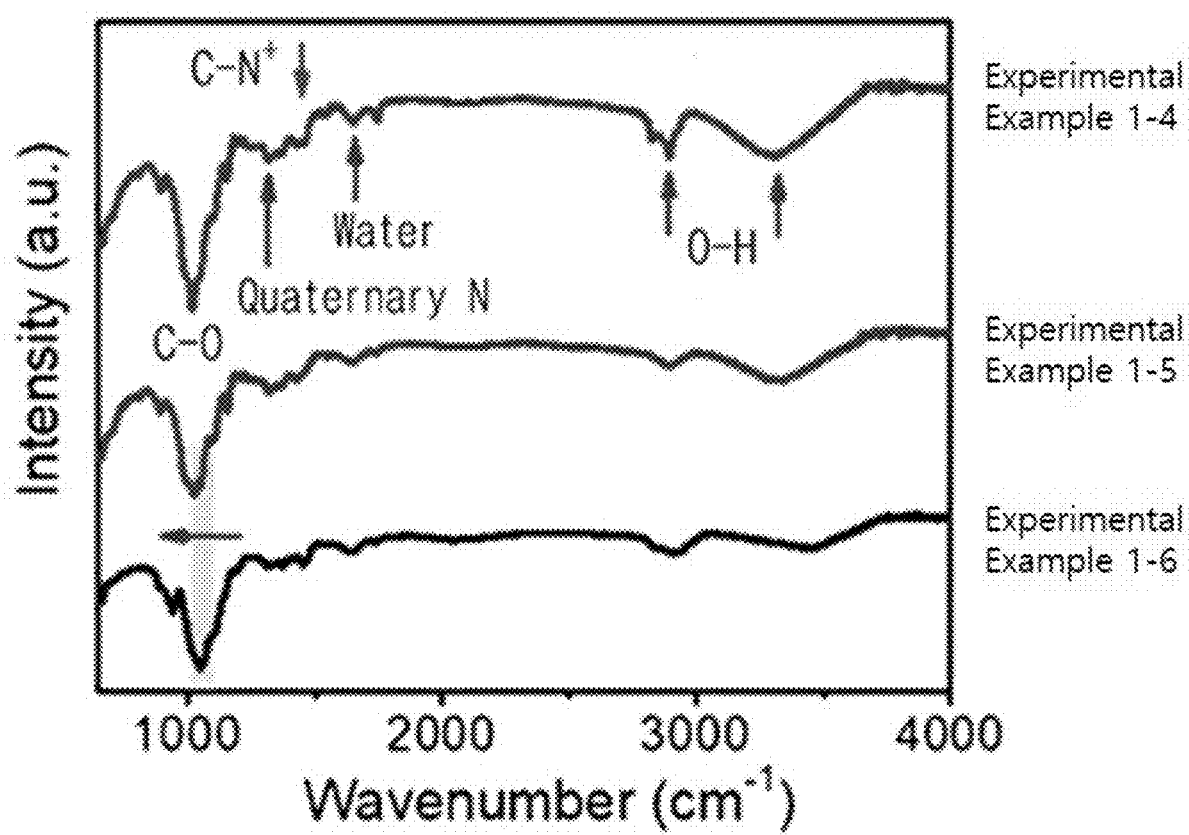

[Fig. 14]
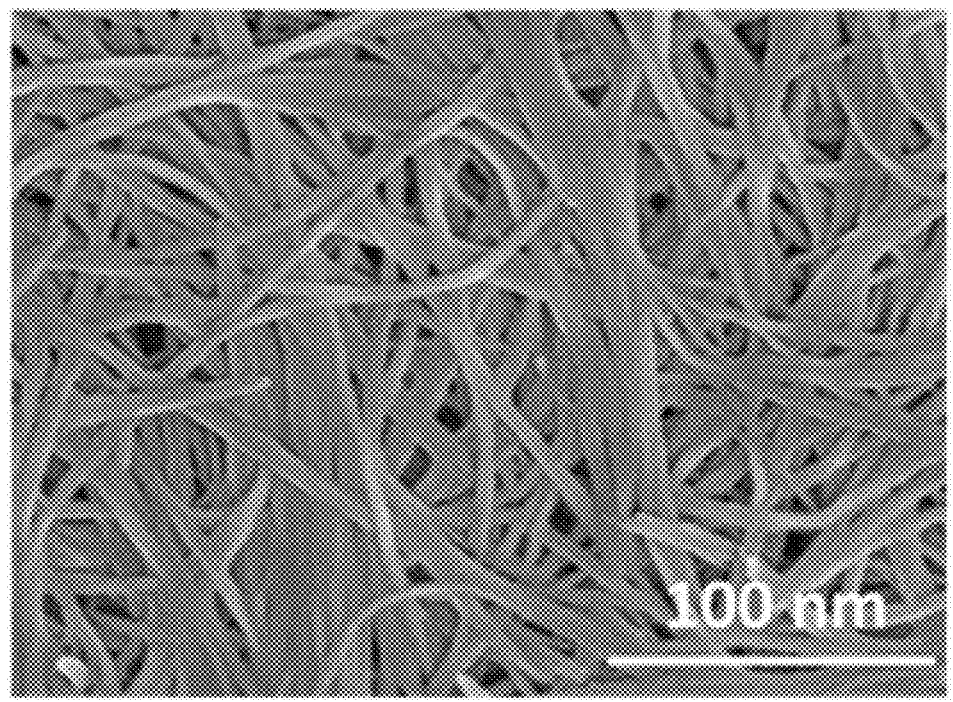

[Fig. 15]
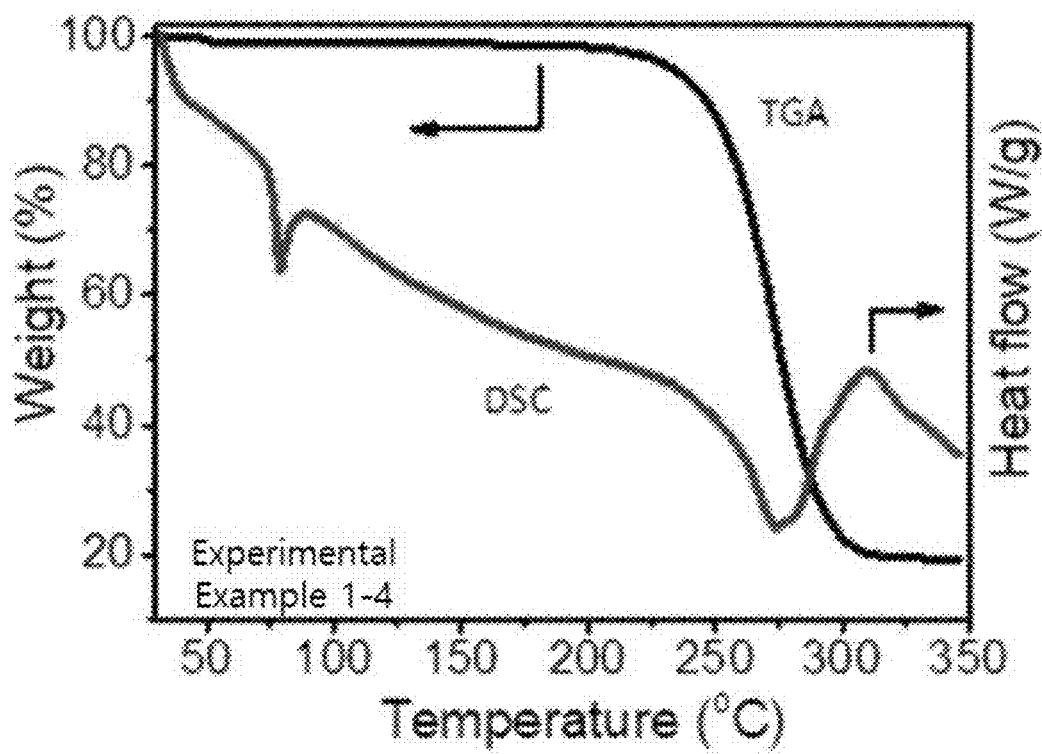

【Fig. 16】
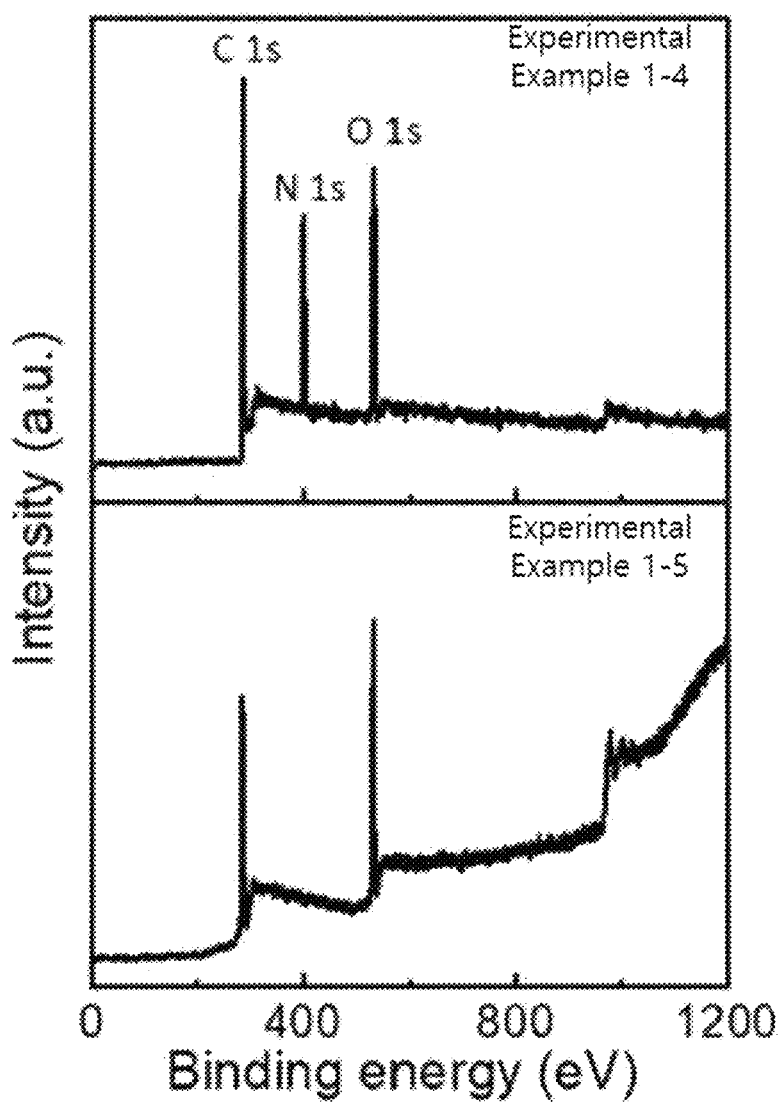

[Fig. 17]
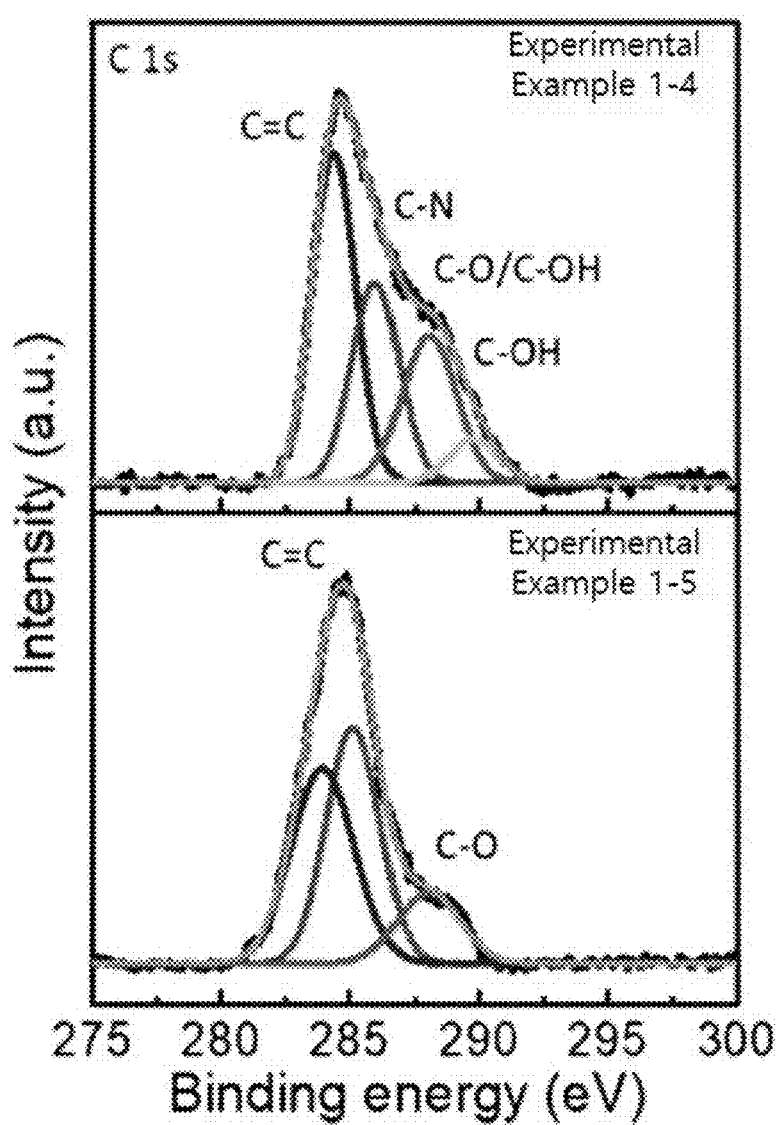

[Fig. 18]
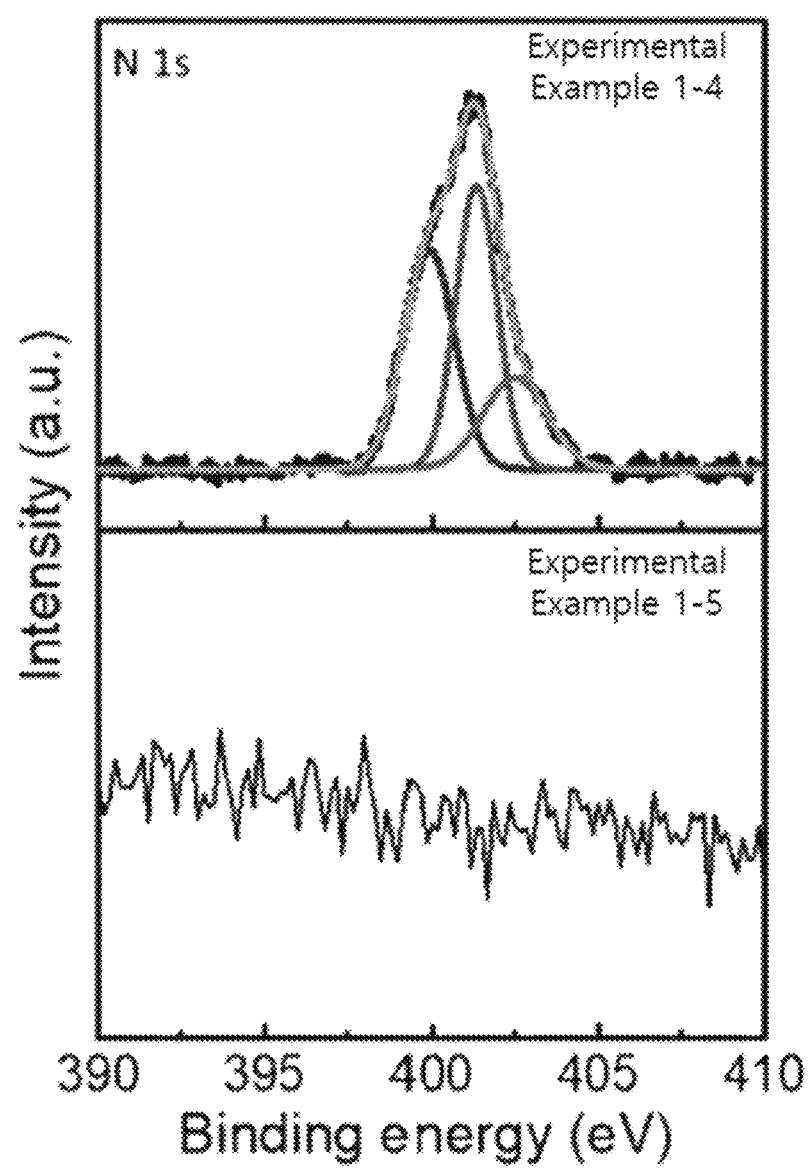

[Fig. 19]
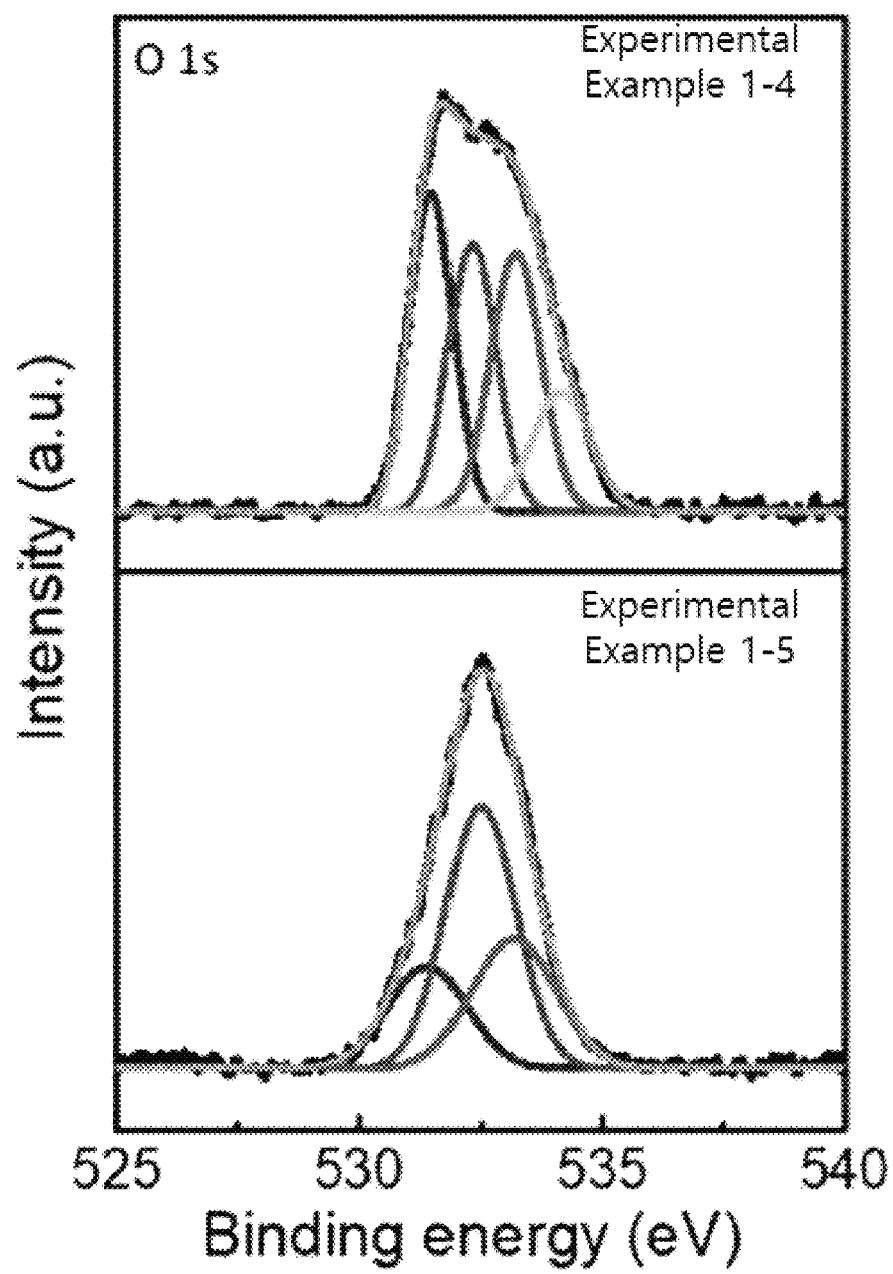

[Fig. 20]
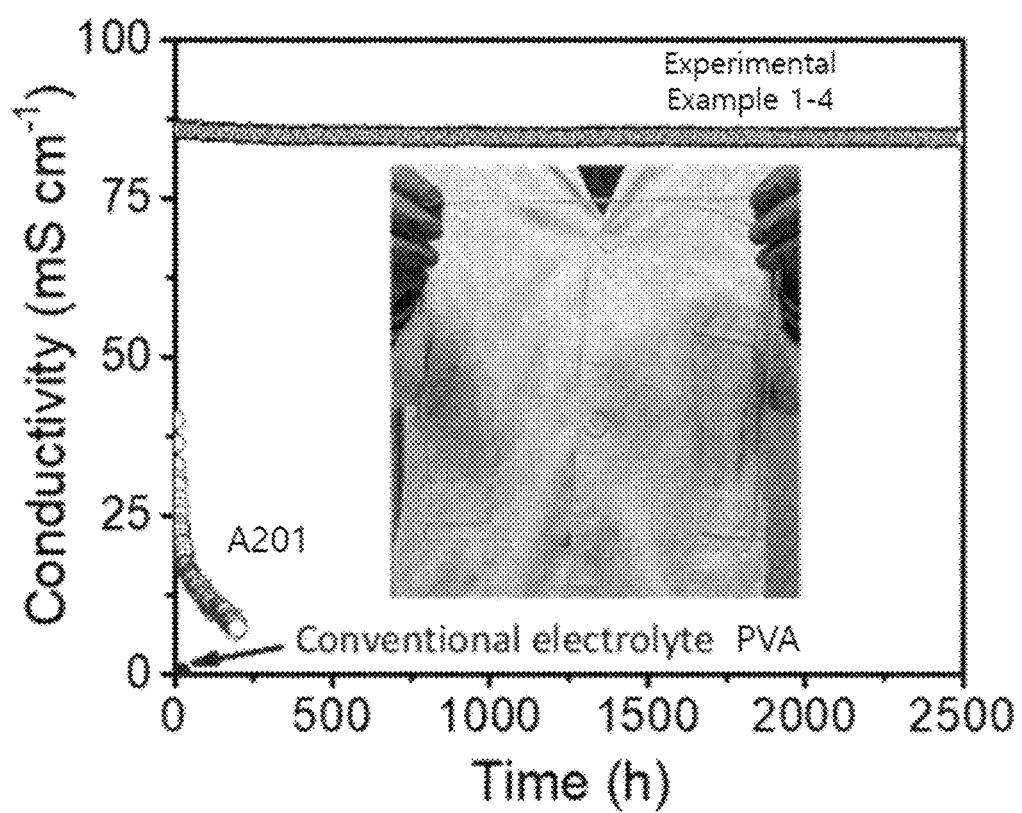

[Fig. 21]
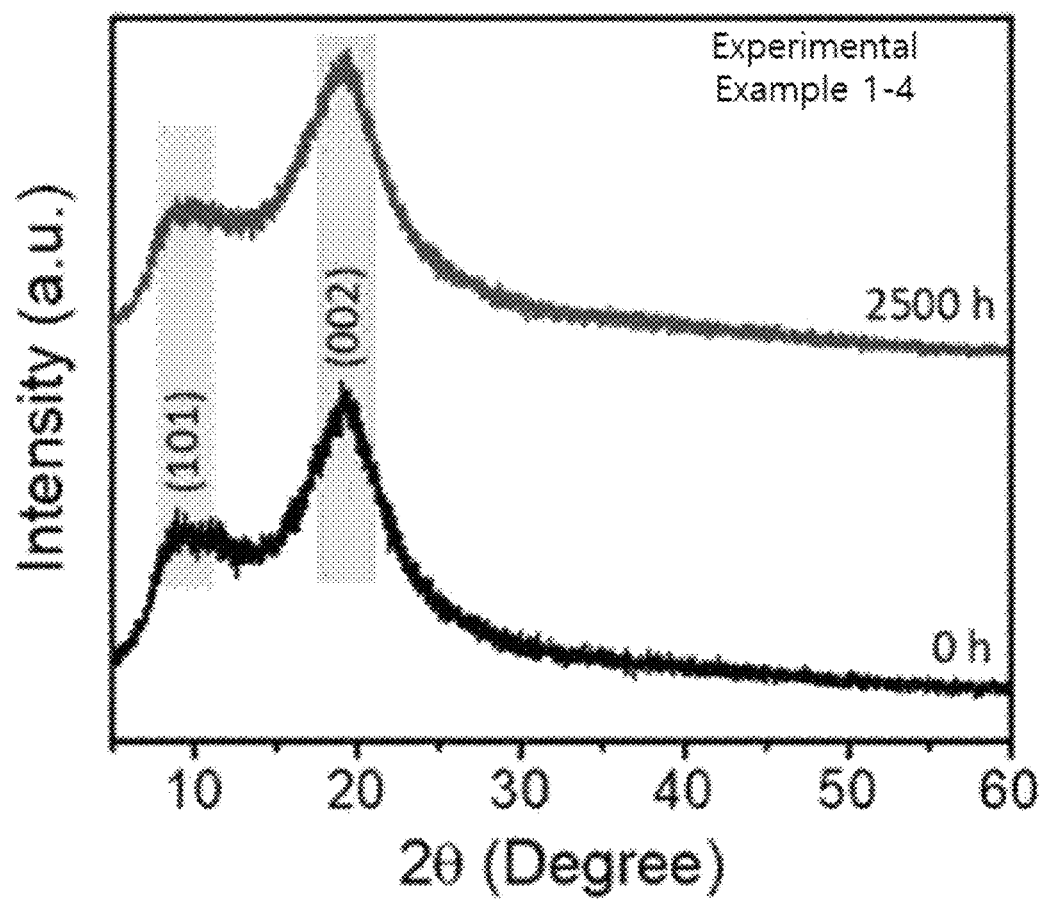

[Fig. 22]
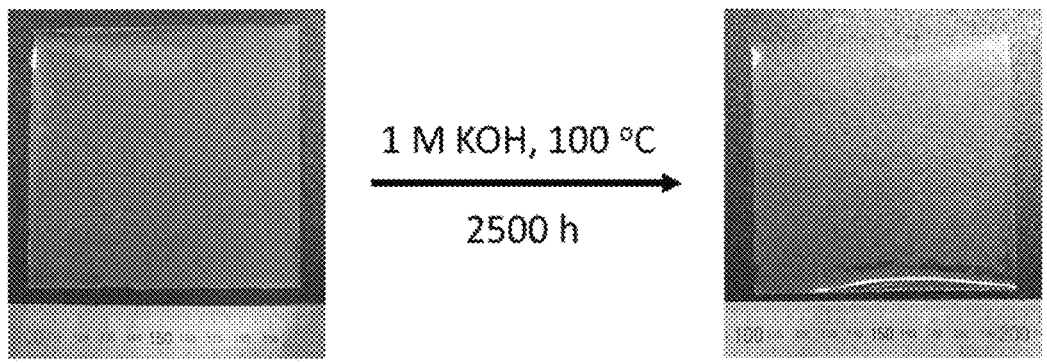
[Fig. 23]
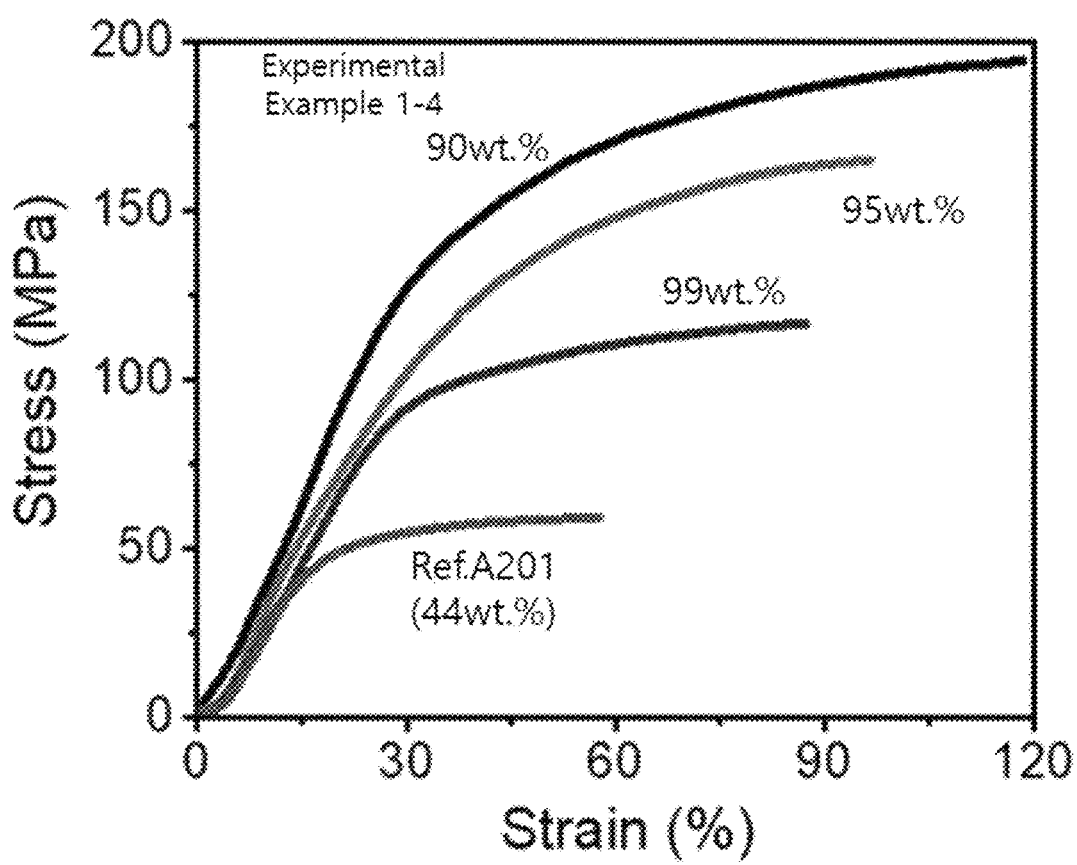

[Fig. 24]
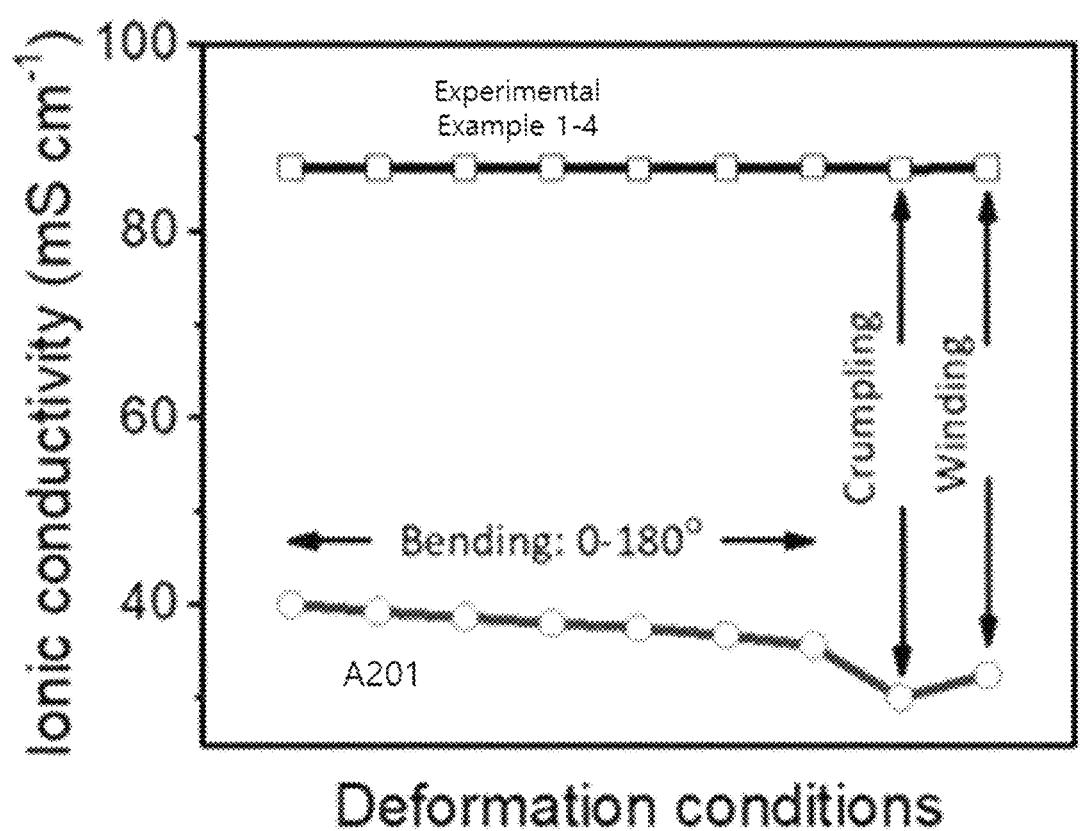

[Fig. 25]
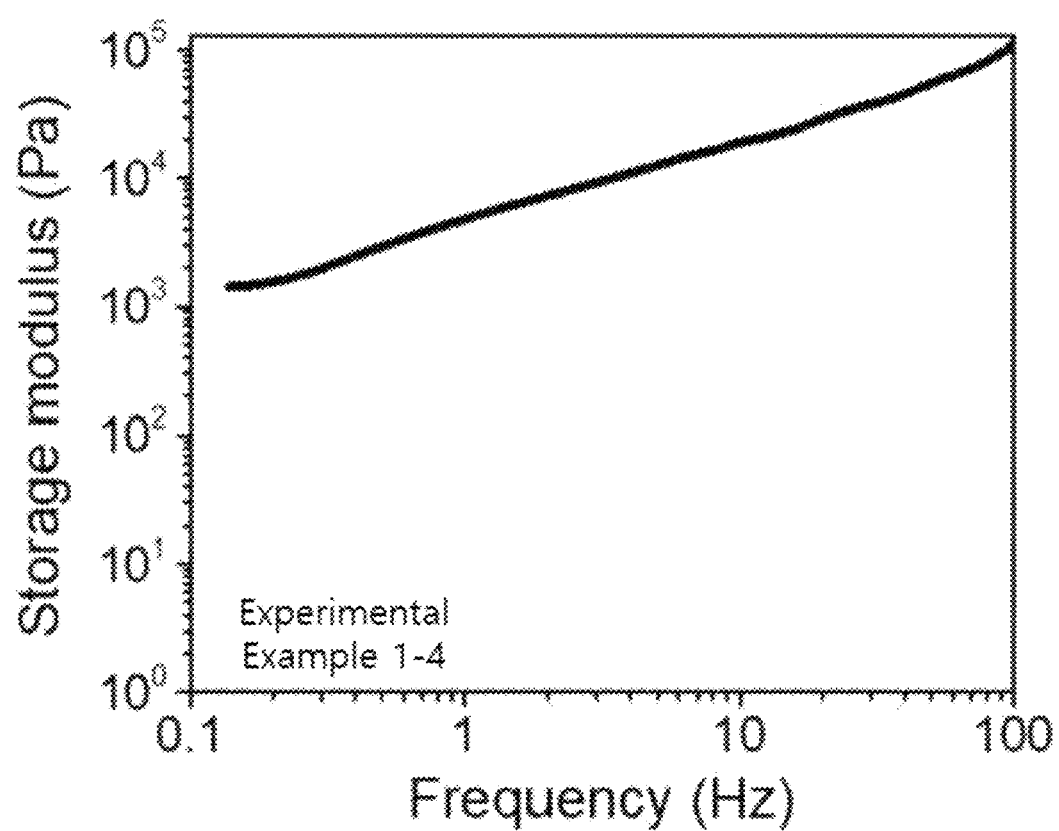

[Fig. 26]
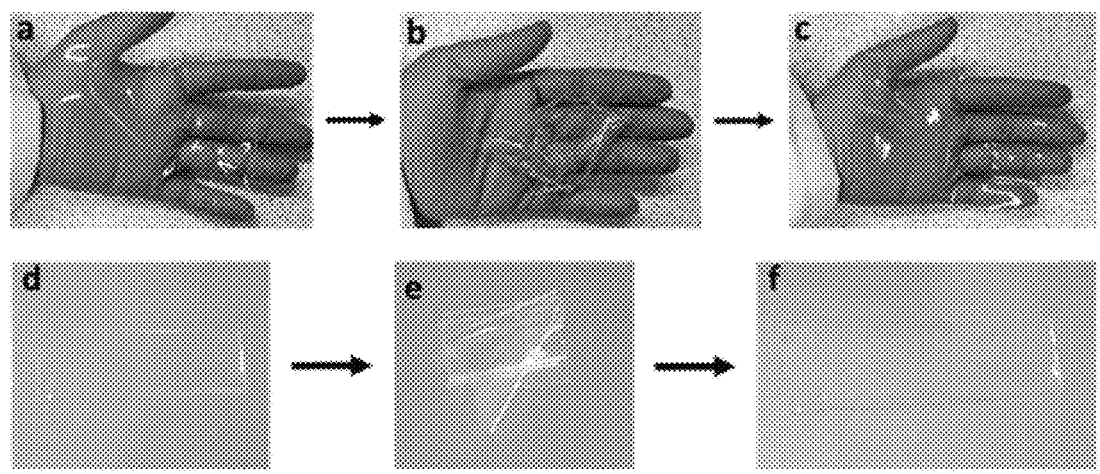
[Fig. 27]
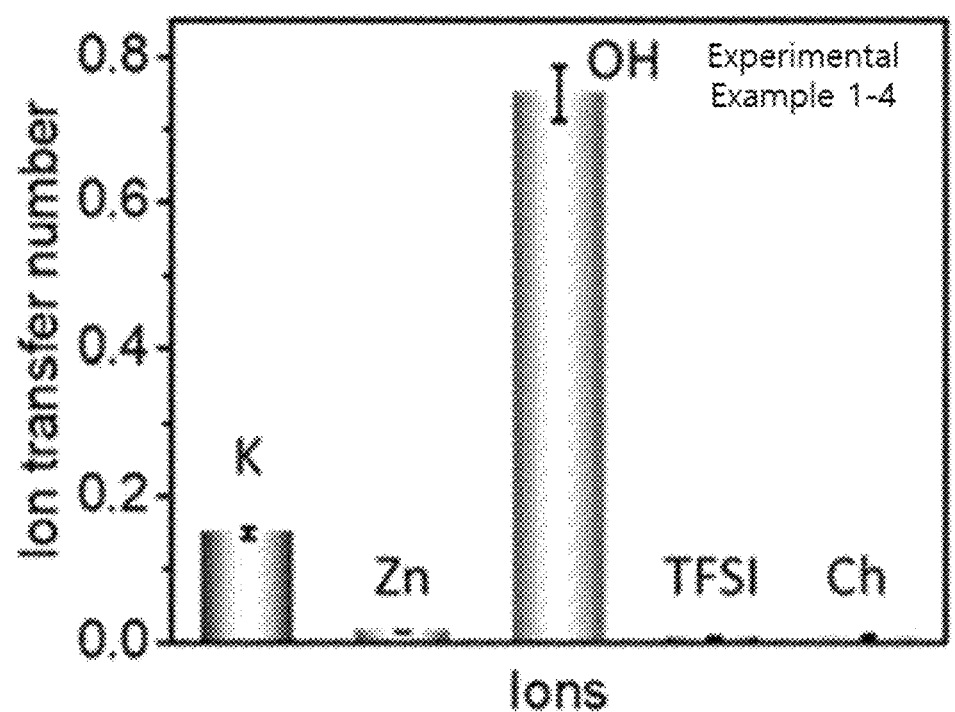

[Fig. 28]
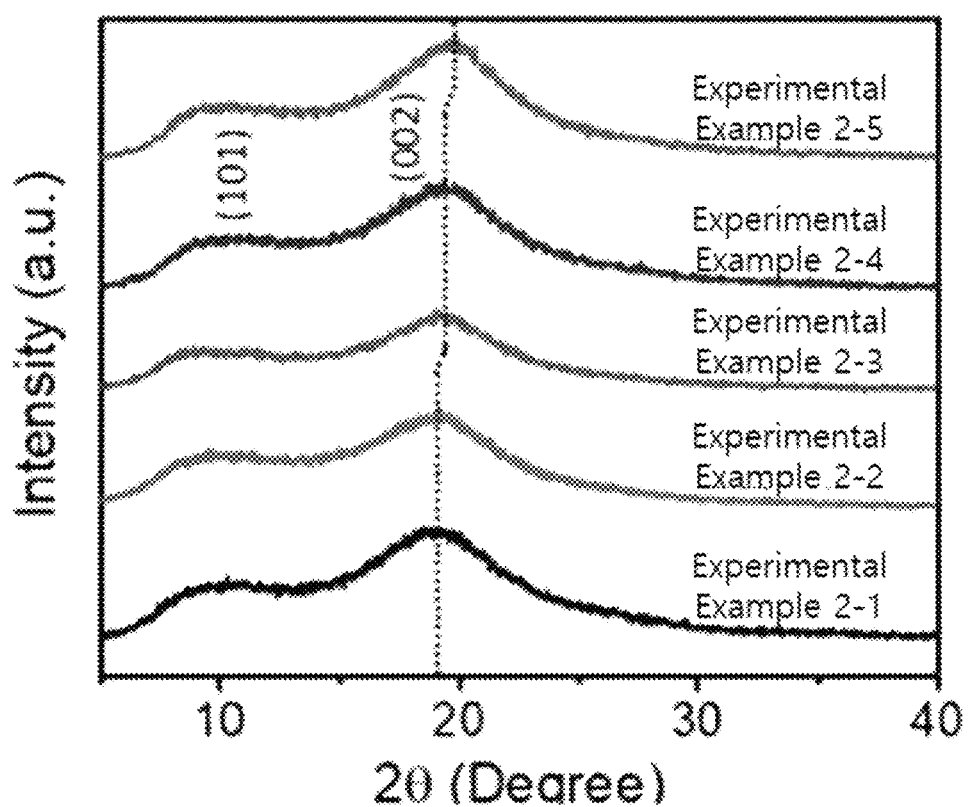

[Fig. 29]
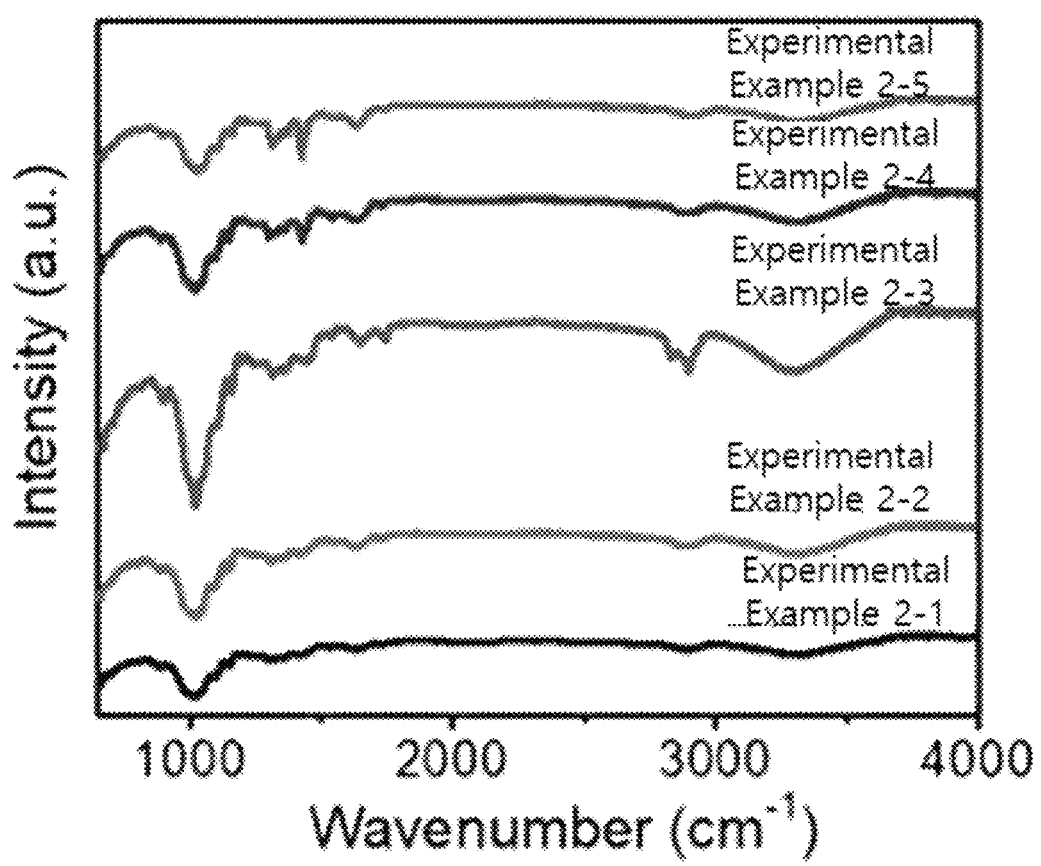

[Fig. 30]
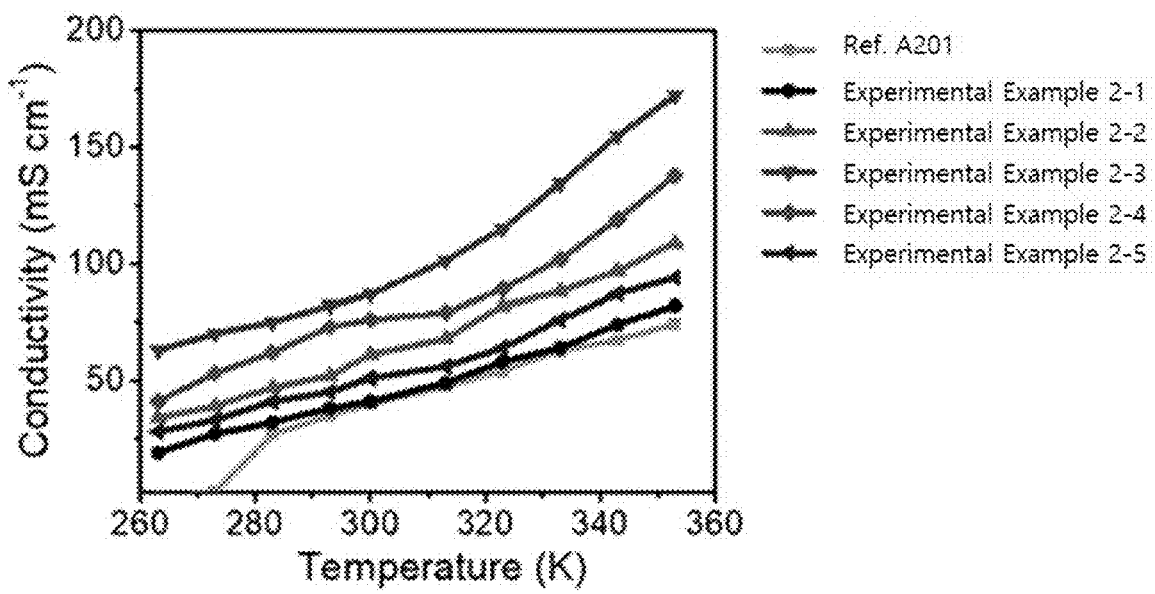
[Fig. 31]
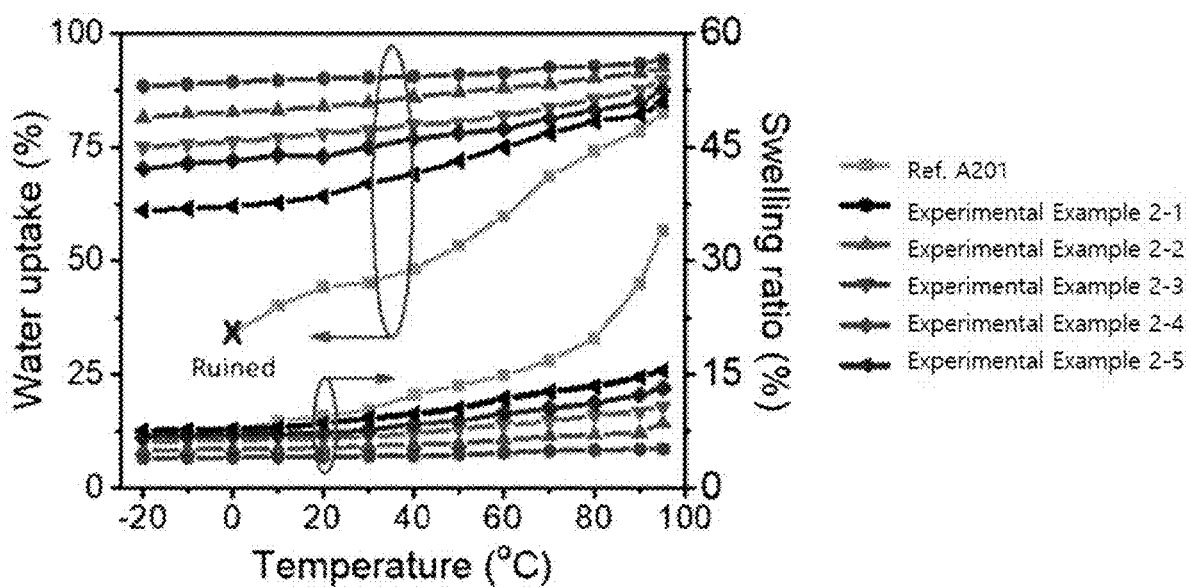

[Fig. 32]
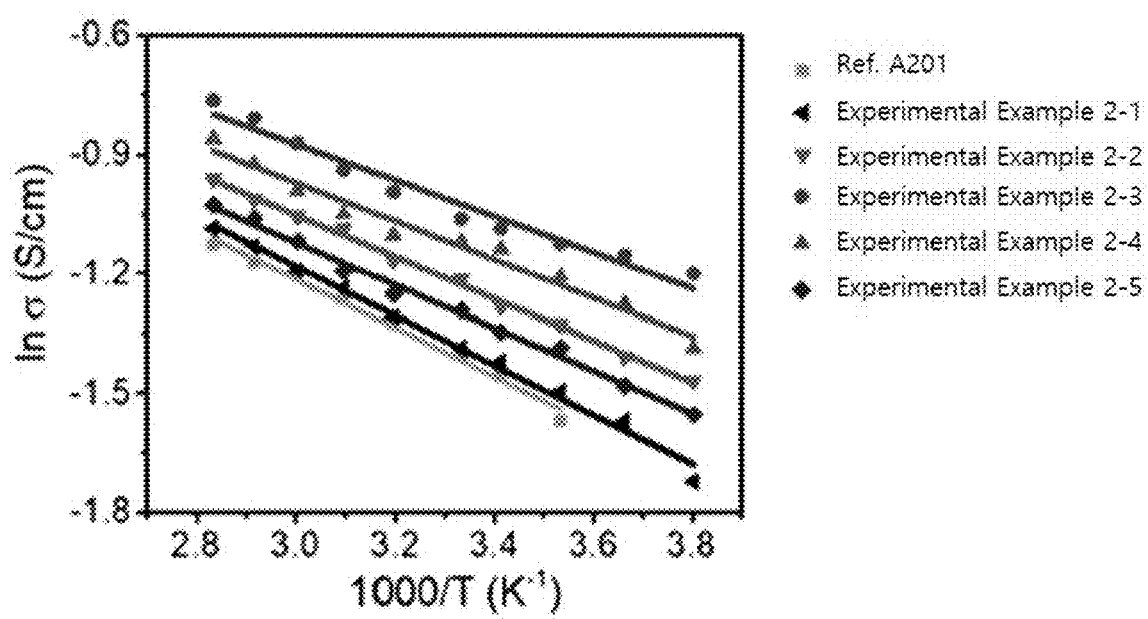

[Fig. 33]
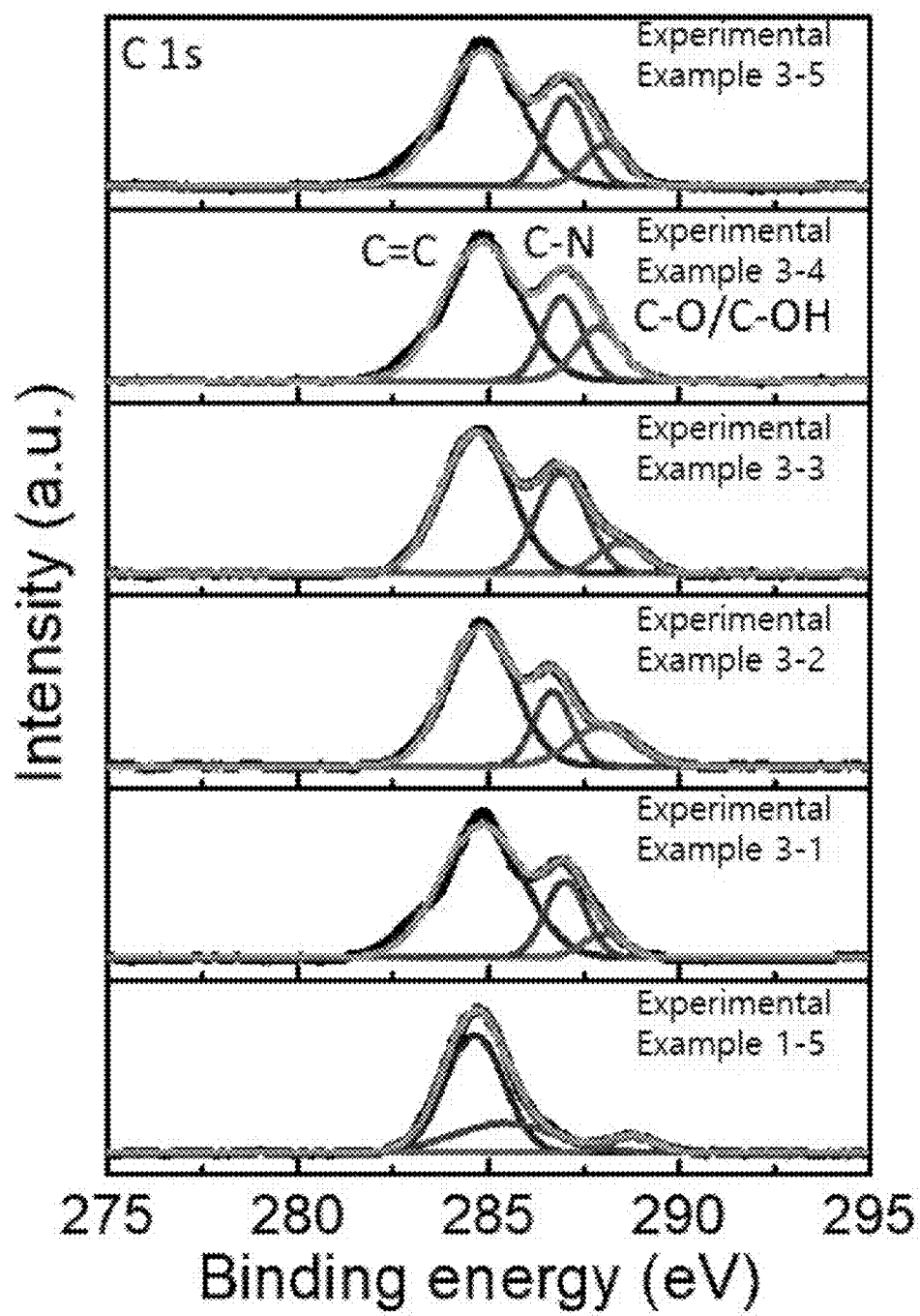

[Fig. 34]
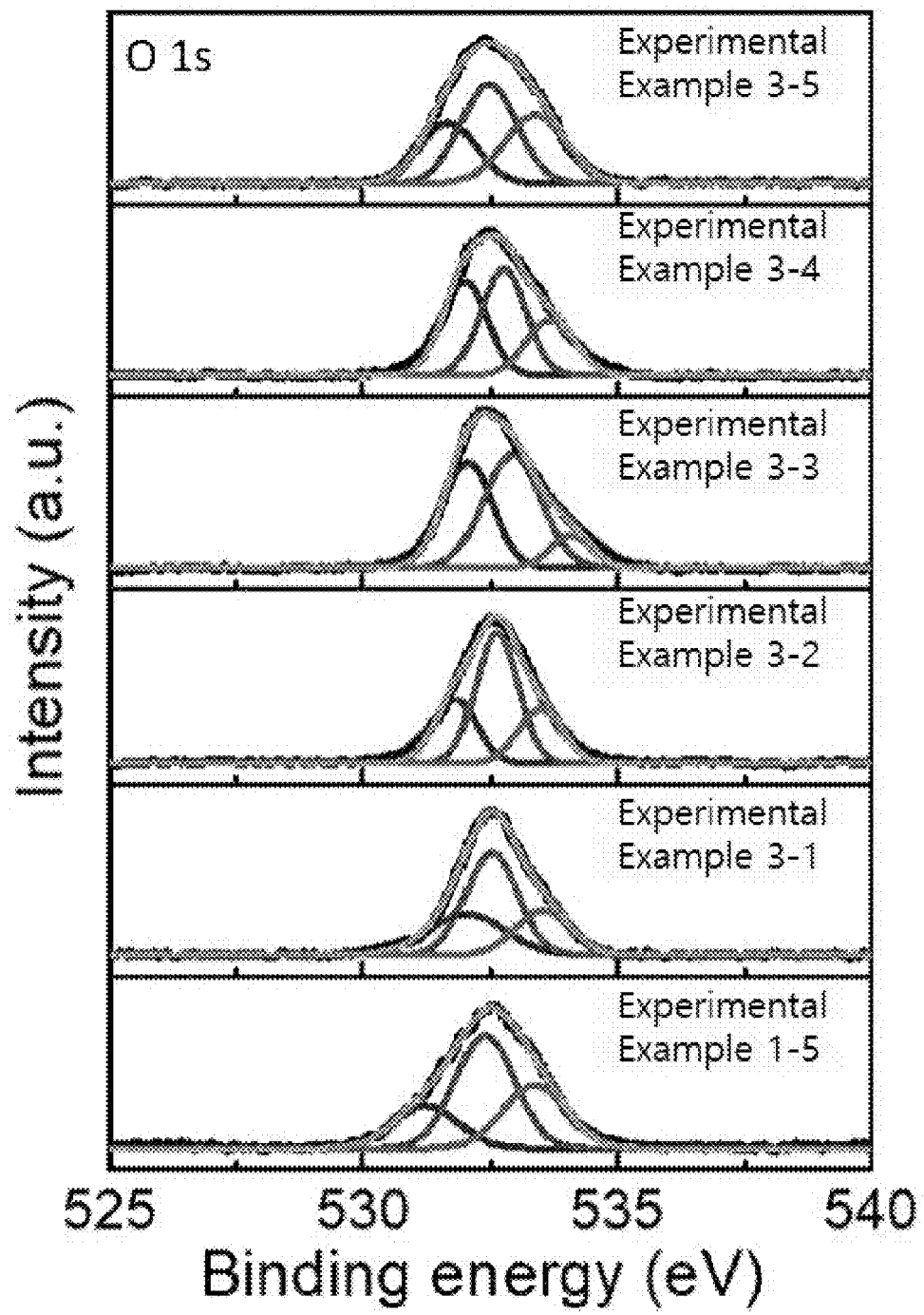

[Fig. 35]
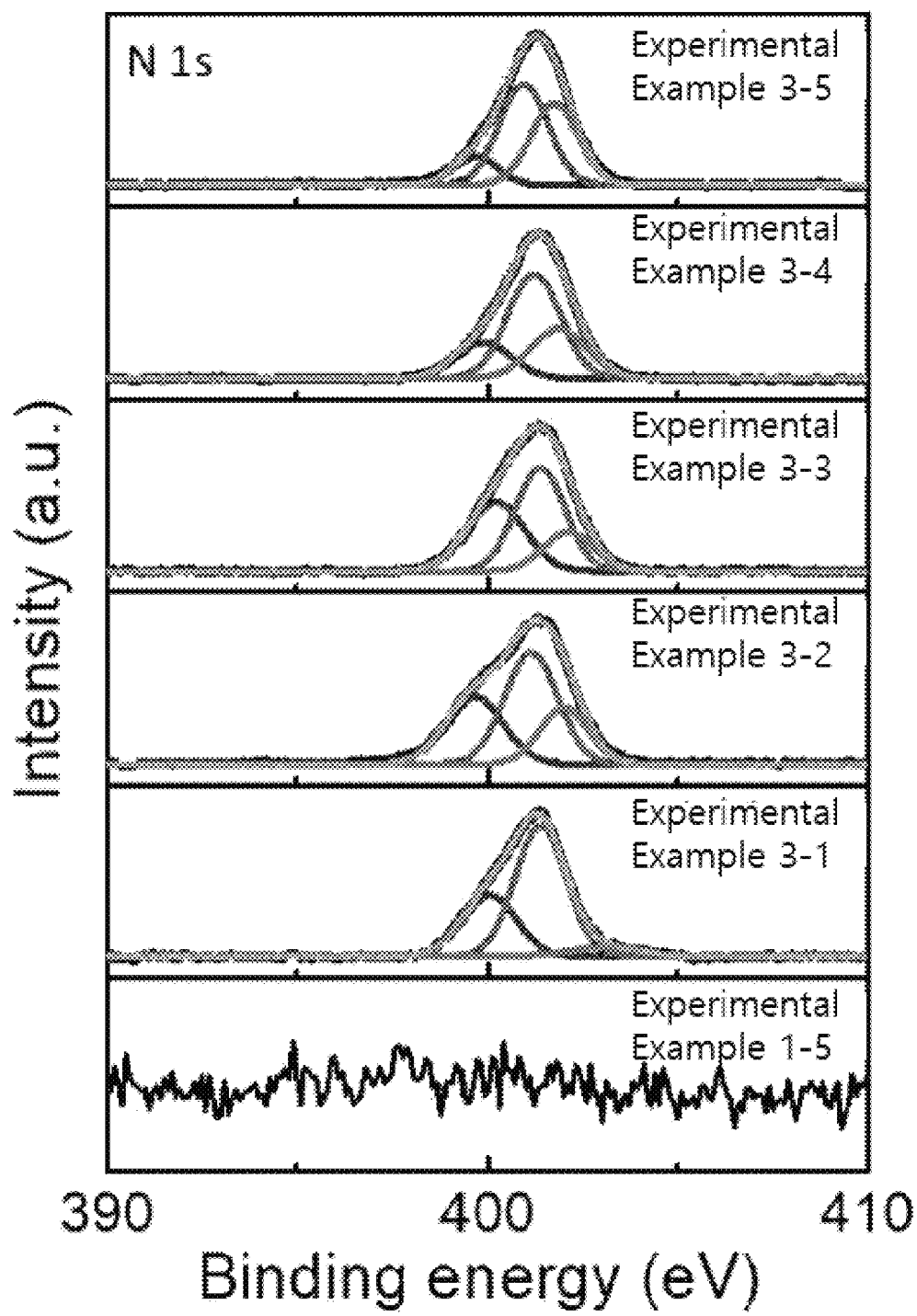

[Fig. 36]
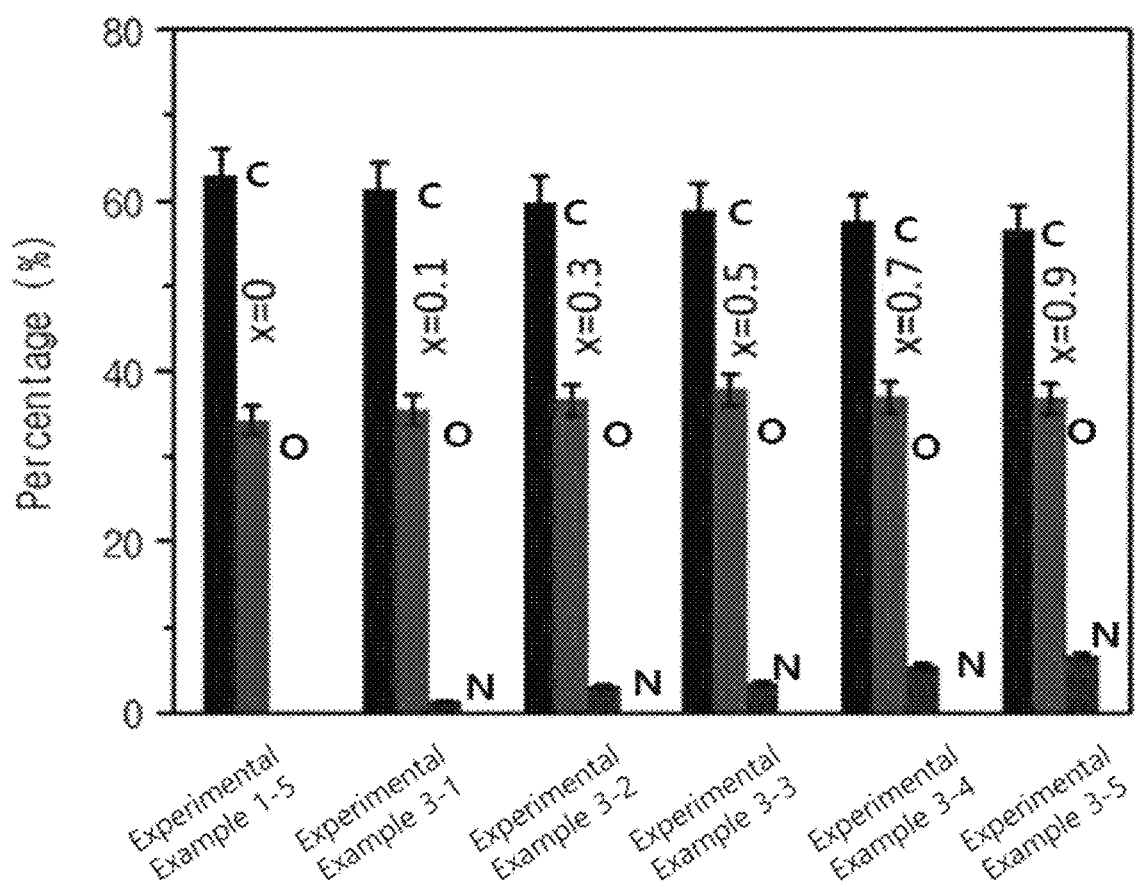

[Fig. 37]
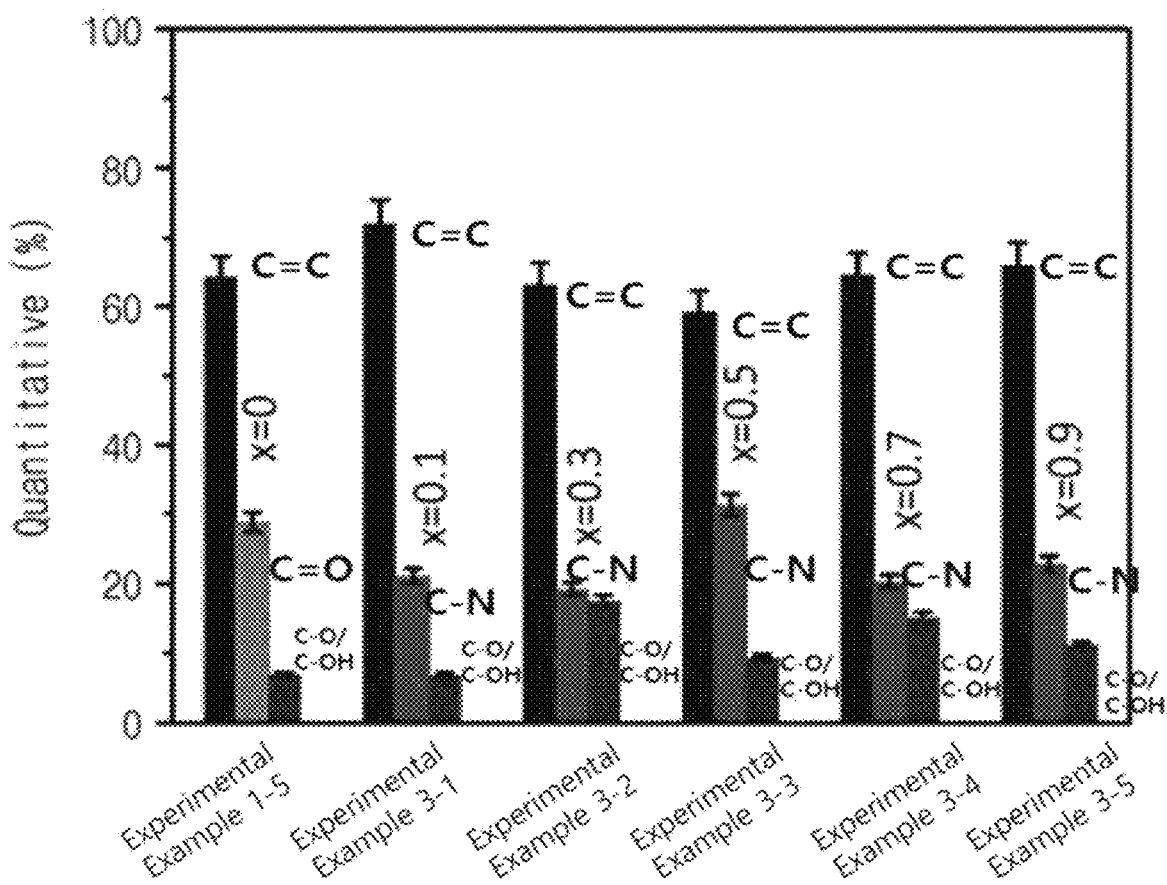

[Fig. 38]
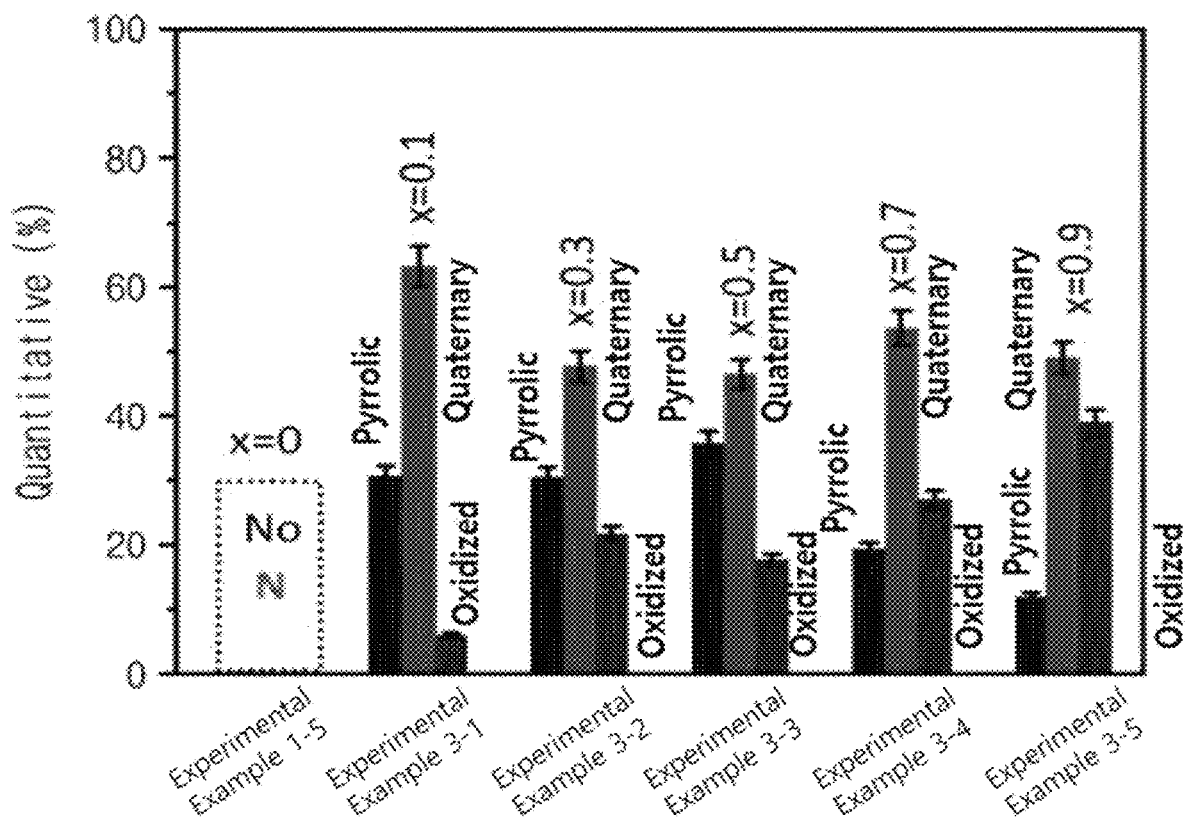

[Fig. 39]
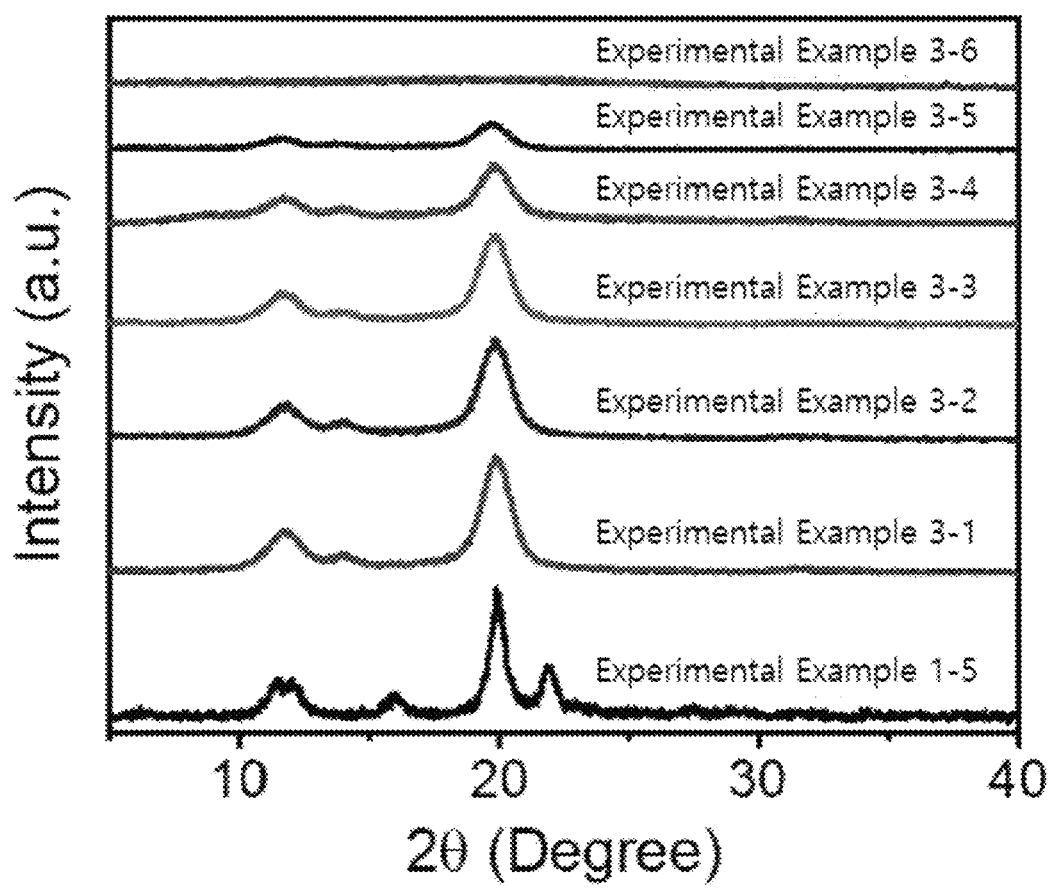

[Fig. 40]
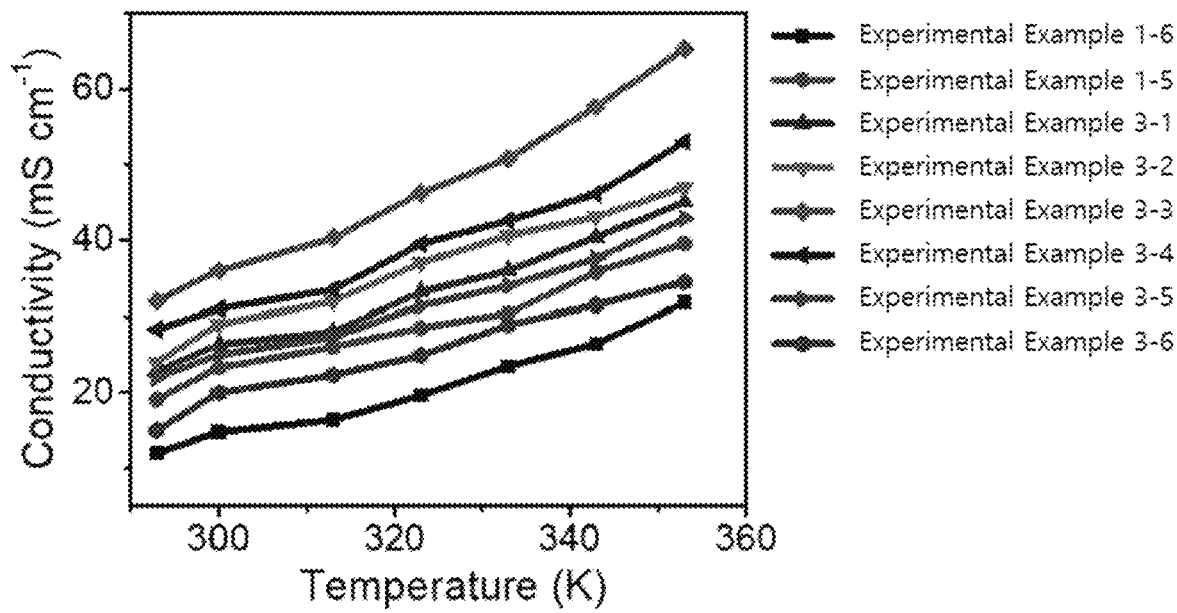
[Fig. 41]
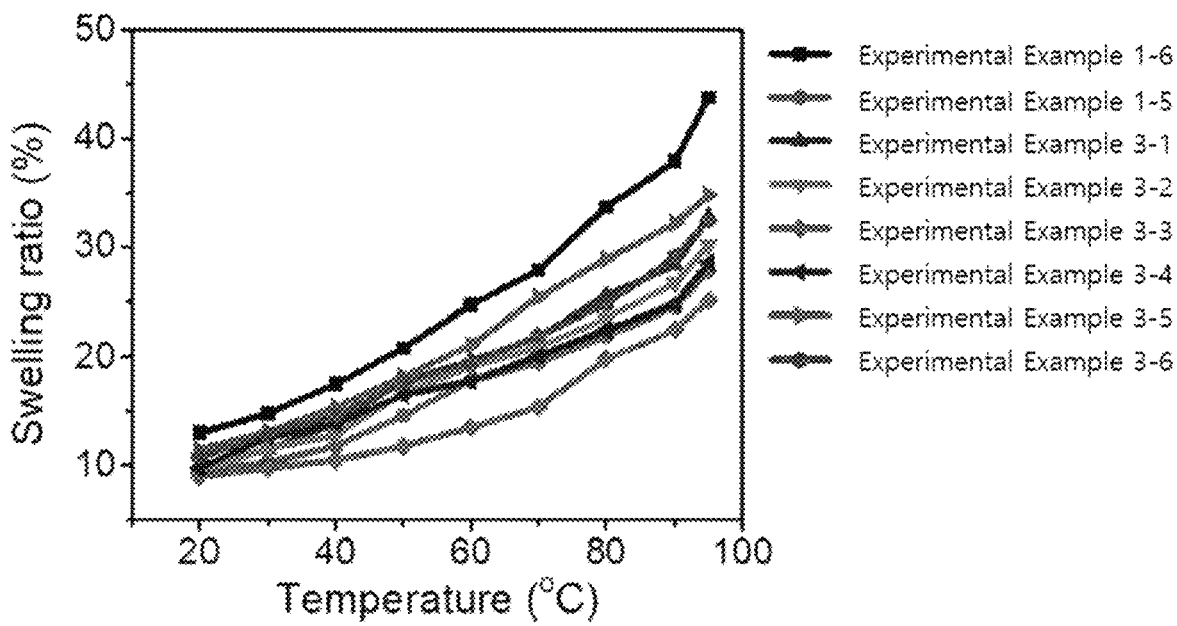

[Fig. 42]
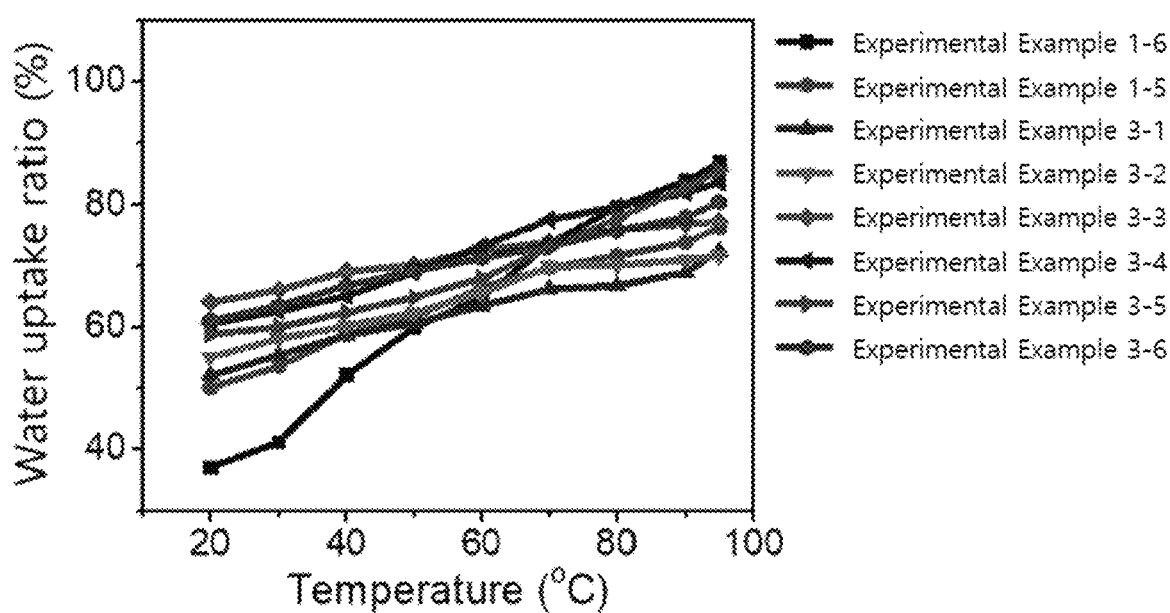

[Fig. 43]
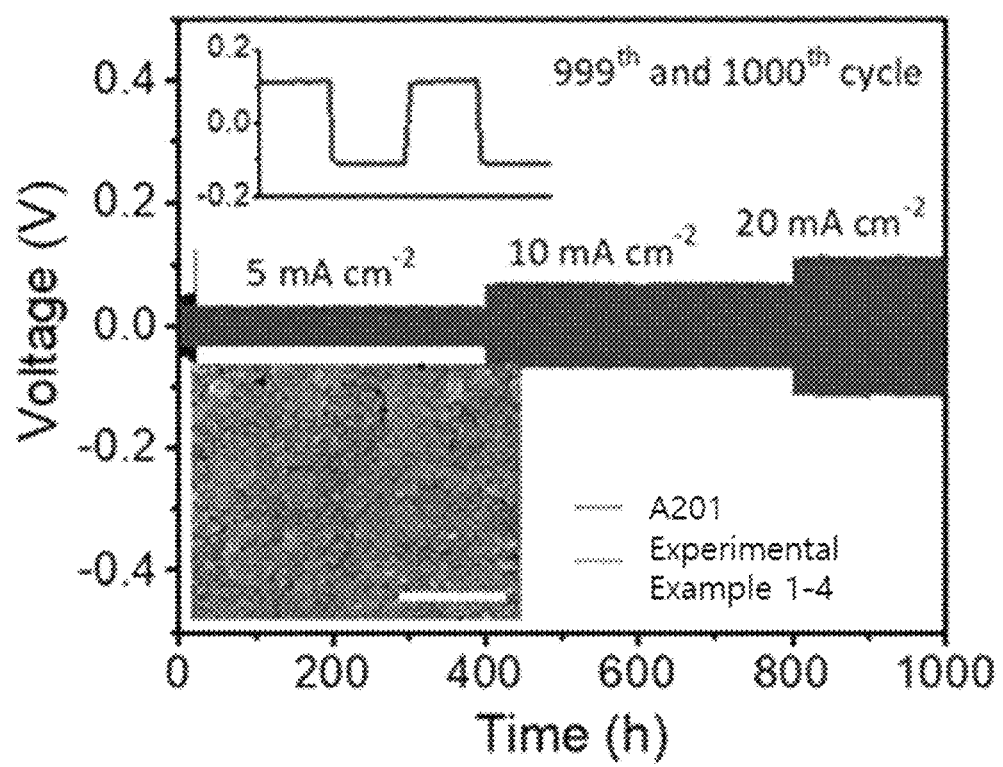

[Fig. 44]
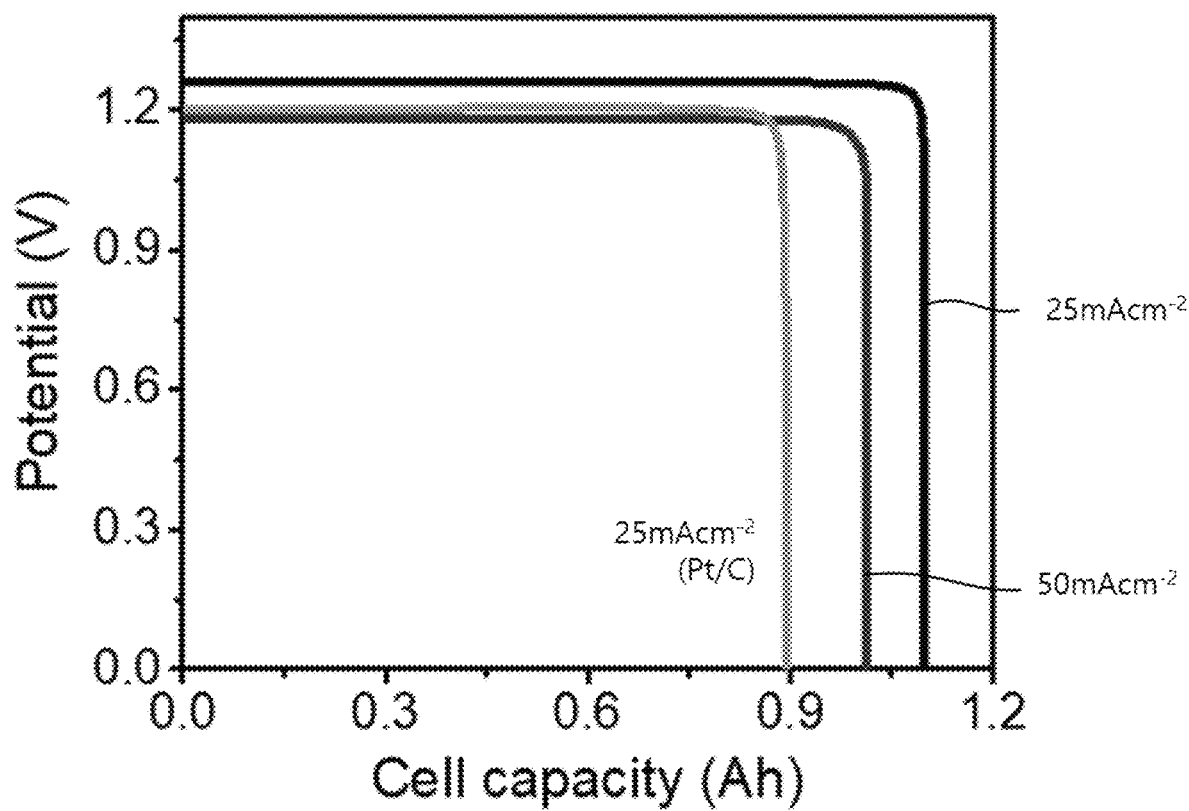

【Fig. 46】
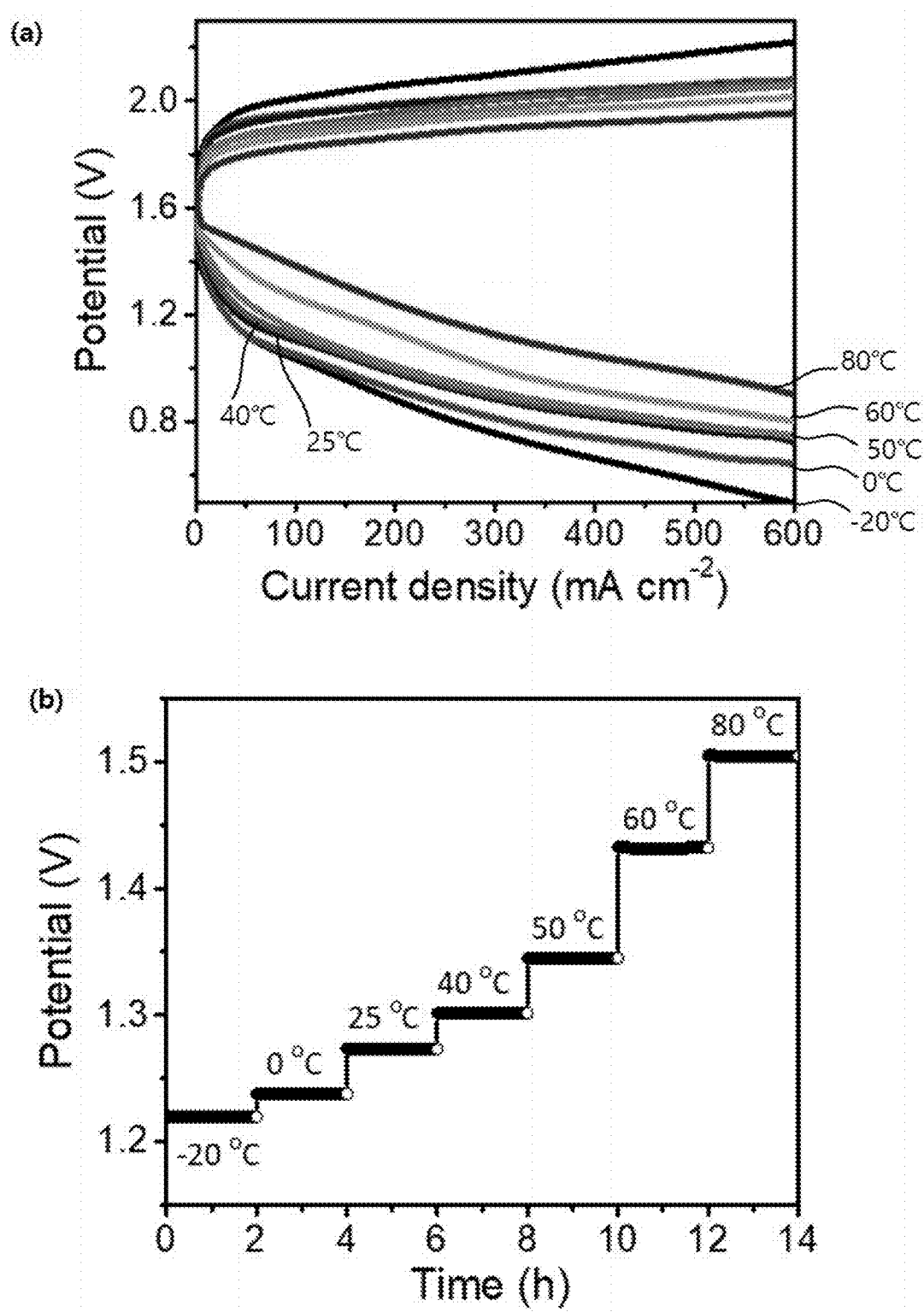

[Fig. 47]
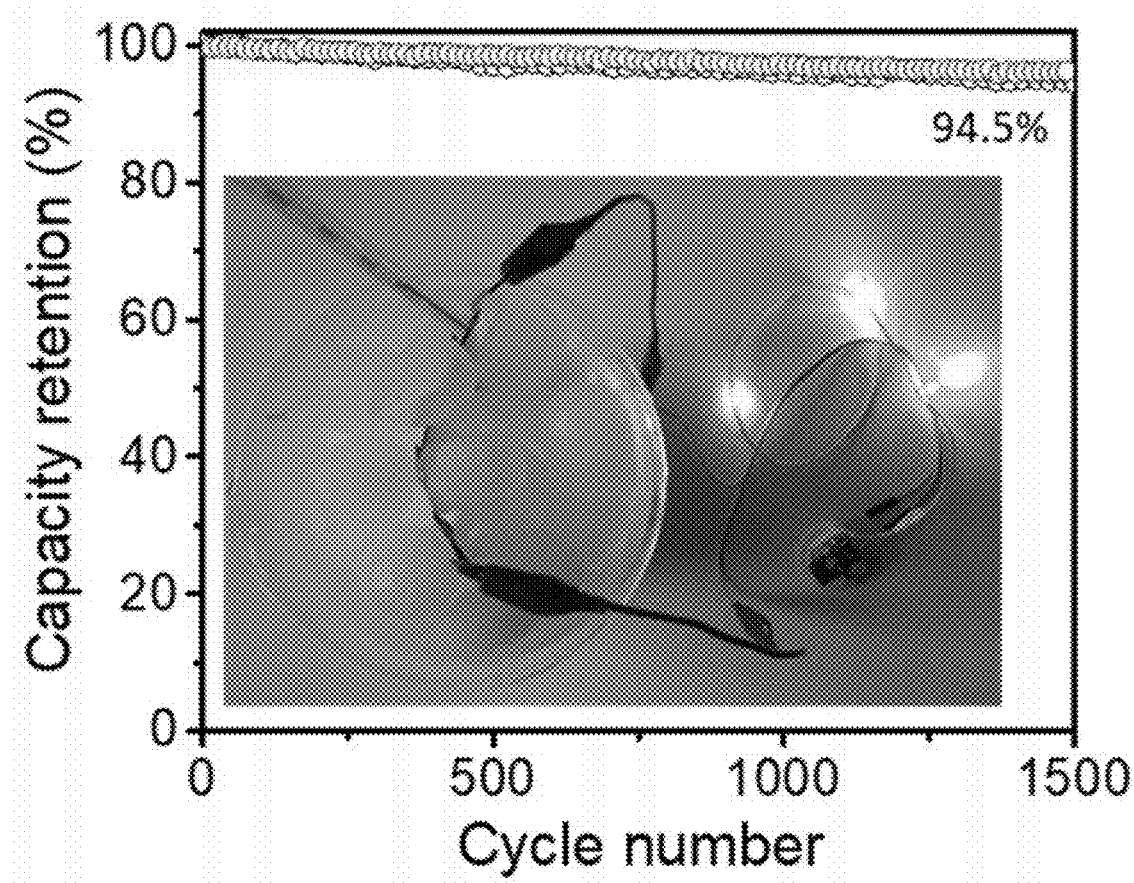

[Fig. 48]
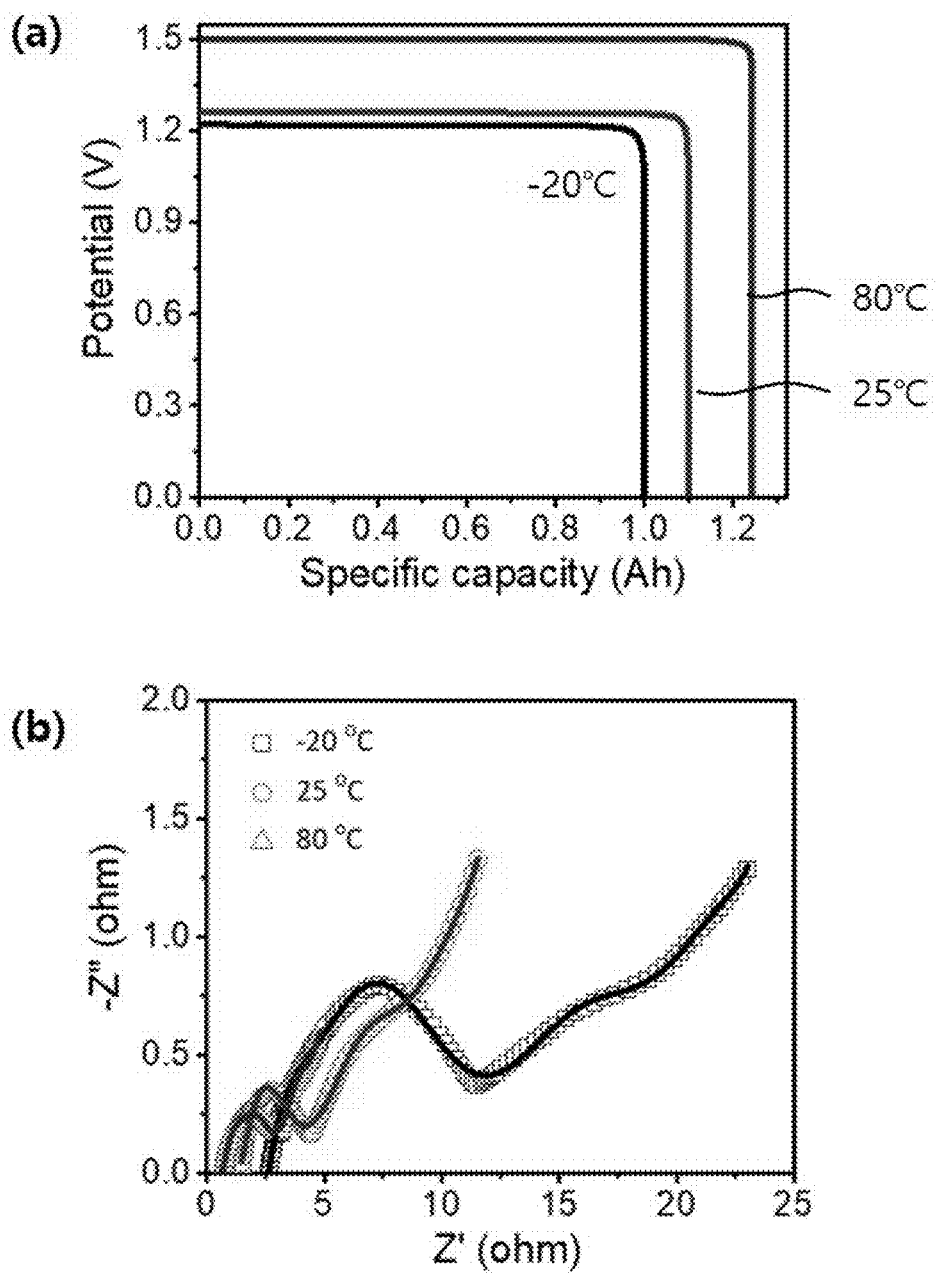

[Fig. 49]
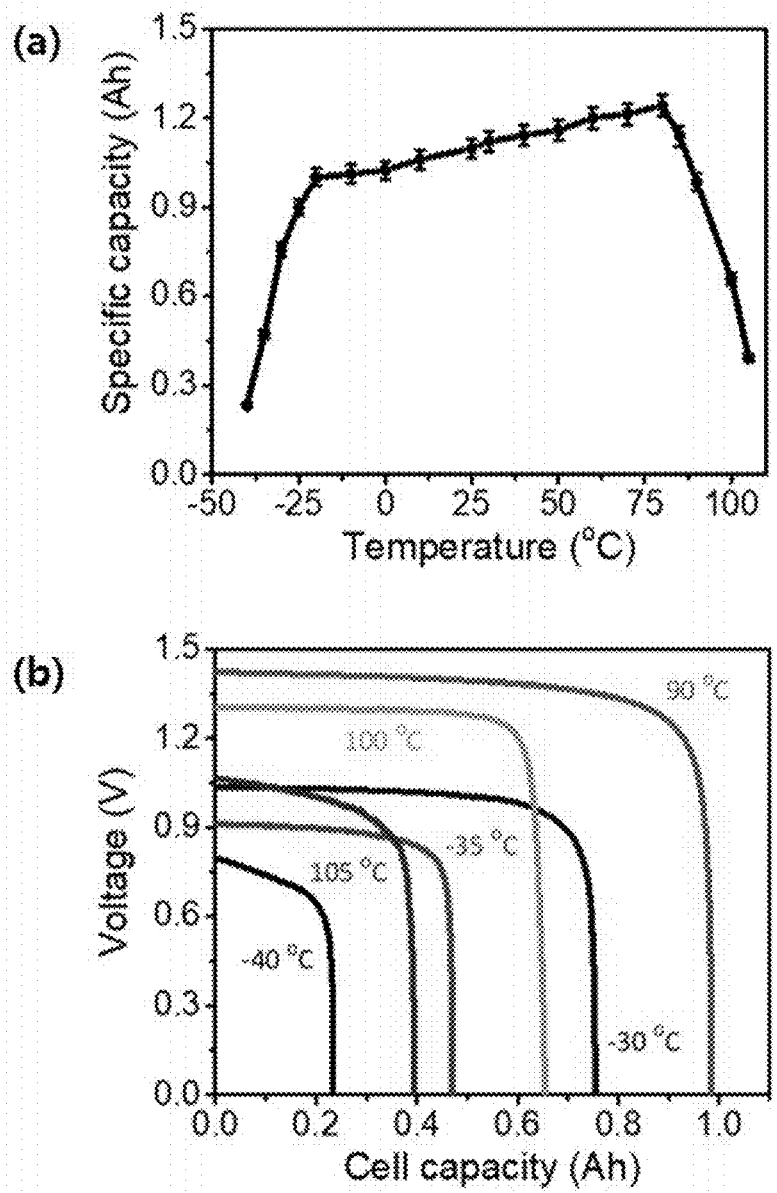

[Fig. 50]
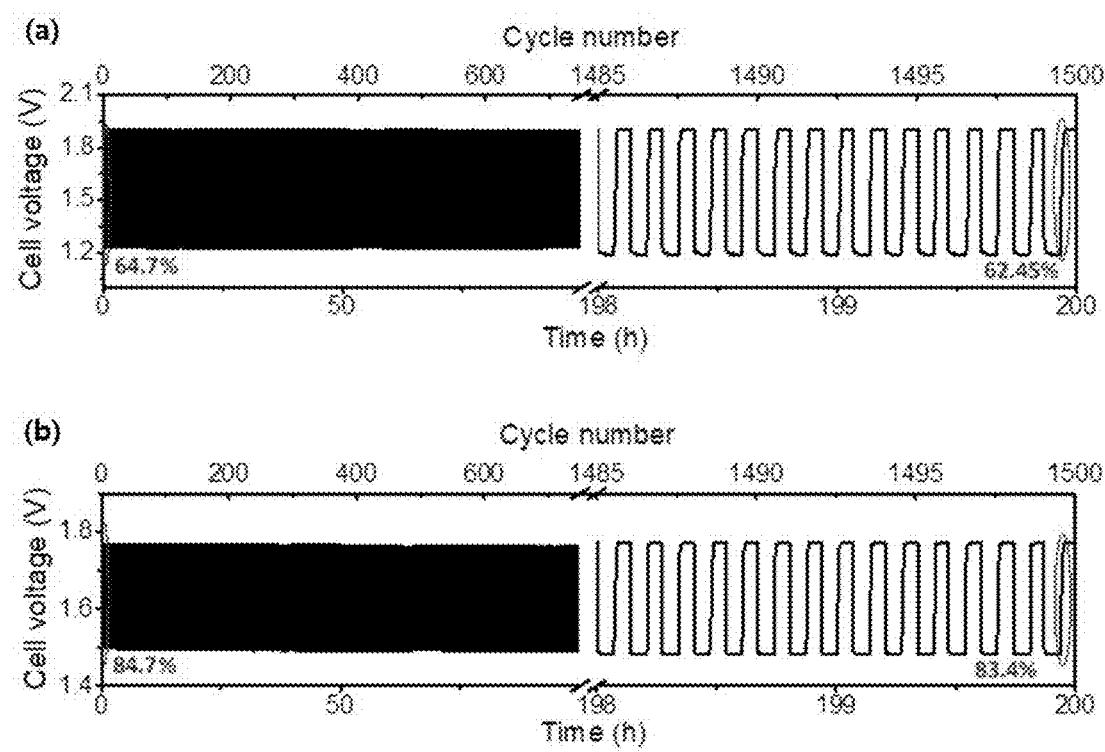

[Fig. 51]
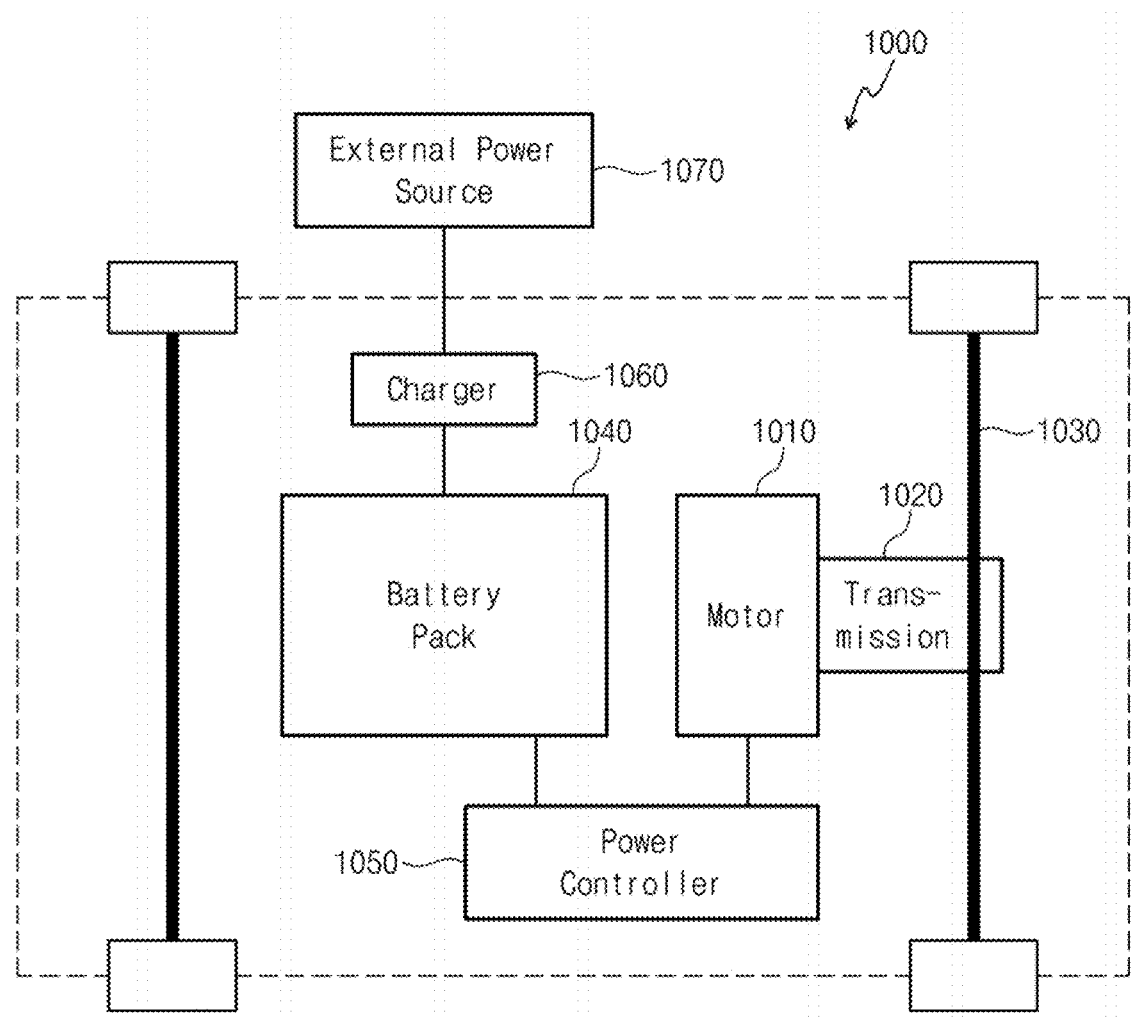

COMPLEX FIBER, SOLID STATE ELECTROLYTE COMPRISING SAME, AND METAL-AIR BATTERY COMPRISING SAME

TECHNICAL FIELD

The present application relates to a complex fiber, a solid state electrolyte including the same, and a metal-air battery including the same.

BACKGROUND ART

With the rapid growth of mid to large-sized high-energy applications such as electric vehicles and energy storage systems (ESS) beyond the existing secondary batteries for small devices and home appliances, the market value of the secondary battery industry was only about $22 billion in 2018, but is expected to grow to about $118 billion in 2025. As such, there is a need for significantly improved price competitiveness, energy density and stability compared to the current level so that a secondary battery can be used as a medium to large-sized energy storage medium.

In accordance with these technical needs, studies on secondary batteries using solid state electrolytes are actively being conducted.

For example, International Unexamined Patent Publication WO2014200198A1 discloses a complex electrode-complex electrolyte assembly, in which a complex electrode layer and a complex electrolyte layer form an integrated complex electrode-complex electrolyte assembly; the complex electrode layer includes a current collector and an electrode mixture layer formed on the current collector; the electrode mixture layer includes an electrode active material, a conductive material, a crosslinked polymer matrix, a dissociable salt and an organic solvent; the complex electrolyte layer includes a crosslinked polymer matrix, an inorganic particle, a dissociable salt, and an organic solvent; and the electrode mixture layer and the complex electrolyte layer are overlapped and physically bound.

As another example, Korean Registered Patent Publication 10-1734301 discloses a method for preparing a solid state electrolyte for lithium battery, which comprises: a first step of preparing a sol by reacting a first metal precursor made of a Li precursor, a second metal precursor made of an Al precursor, a third metal precursor made of a Ti precursor, and a P precursor with a chelating agent; a second step of heating the sol to prepare a gel; a third step of heating the gel to pyrolyze; a fourth step of heat treatment by contacting the pyrolyzed gel with air; a fifth step of cooling the powder obtained through the fourth step; a sixth step of mixing 0.2 to 1 wt % of a sintering aid Bi2O3 with the powder cooled in the fifth step; and a seventh step of press-molding the mixed powder obtained in the sixth step and sintering at 850° C. while contacting air, in which the sintered body has a relative density (%) of 90.0 to 99.7 and an ionic conductivity (S cm$^{-1}$) of $7.9 \times 10^{-4}$ to $9.9 \times 10^{-4}$.

DISCLOSURE

Technical Problem

One technical object of the present application is to provide a solid state electrolyte having high reliability and high ionic conductivity, and a metal-air battery including the same.

Another technical object of the present application is to provide a long-lived solid state electrolyte and a metal-air battery including the same.

Still another technical object of the present application is to provide a flexible solid state electrolyte with high mechanical stability, and a metal-air battery including the same.

Still another technical object of the present application is to provide a metal-air battery with an improved charge/discharge capacity and an improved longer life.

Still another technical object of the present application is to provide a complex fiber for a solid state electrolyte, and a method for preparing the same.

Still another technical object of the present application is to provide a solid state electrolyte capable of operating in high and low temperature environments, and a method for preparing the same.

Still another technical object of the present application is to provide a solid state electrolyte maintaining a high ionic conductivity in high and low temperature environments, and a method for preparing the same.

Still another technical object of the present application is to provide a flexible solid state electrolyte with high mechanical stability in high and low temperature environments, and a method for preparing the same.

Still another technical object of the present application is to provide a metal-air battery including a solid state electrolyte capable of operating in high and low temperature environments.

Another technical object of the present application is to provide a long-lived metal-air battery having a high charge/discharge capacity in high and low temperature environments.

The technical objects of the present application are not limited to the above.

Technical Solution

To solve the above technical objects, the present application may provide a solid state electrolyte.

According to one embodiment, the solid state electrolyte may include a base complex fiber having bacterial cellulose and chitosan bound to the bacterial cellulose.

According to one embodiment, the base complex fiber may include a mixture of a crystalline phase and an amorphous phase.

According to one embodiment, a surface of the bacterial cellulose, to which the chitosan is bound, may be oxidized.

According to one embodiment, the surface of the bacterial cellulose, to which the chitosan is bound, may be oxidized by using an aqueous TEMPO solution.

According to one embodiment, the surface of the bacterial cellulose, to which the chitosan is bound, may be bound to a first functional group having nitrogen.

According to one embodiment, the first functional group may be represented by <Formula 1> below.

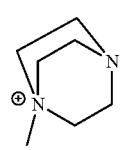

<Formula 1>

According to one embodiment, the solid state electrolyte may include a first complex fiber in which a surface of the base complex fiber is oxidized, and a second complex fiber in which a surface of the base complex fiber is bound to a first functional group having nitrogen.

According to one embodiment, a ratio of the first complex fiber may be more than 30 wt % and less than 70 wt %, and a ratio of the second complex fiber may be less than 70 wt % and more than 30 wt %.

According to one embodiment, the first complex fiber and the second complex fiber may be crosslinked.

According to one embodiment, the solid state electrolyte may include a membrane including cellulose, and chitosan bound to the cellulose of the membrane and having an amount of more than 30 wt % and less than 70 wt %.

According to one embodiment, a ratio of C—N bond may reach a maximum value in C1s spectrum as a result of XPS analysis, when the chitosan is 50 wt %.

According to one embodiment, the cellulose may include bacterial cellulose.

According to one embodiment, a ratio of crystallinity, ionic conductivity and swelling ratio may be controlled depending on a ratio of chitosan.

According to one embodiment, the ratio of crystallinity may gradually decrease as the ratio of chitosan increases.

To solve the above technical objects, the present application may provide a method for preparing a solid state electrolyte.

According to one embodiment, the method for preparing a solid state electrolyte may include the steps of preparing a chitosan derivative; producing chitosan bound to cellulose from the chitosan derivative; and preparing a solid state electrolyte by using the cellulose to which the chitosan is bound.

According to one embodiment, a ratio of crystallinity, ionic conductivity and swelling ratio may be controlled depending on a ratio of the chitosan derivative.

According to one embodiment, the cellulose may include bacterial cellulose.

According to one embodiment, the step of producing the chitosan bound to the cellulose may include the steps of preparing a culture medium having the chitosan derivative, and injecting and culturing a bacterial strain in the culture medium.

According to one embodiment, the method for preparing a solid state electrolyte may include the steps of oxidizing the surface of the cellulose, to which the chitosan is bound, by using an oxidizing agent so as to prepare a first complex fiber, or binding bromine to the surface of the cellulose, to which the chitosan is bound, and substituting a first functional group including nitrogen with bromine so as to prepare a second complex fiber.

According to one embodiment, the method for preparing a solid state electrolyte may include the steps of oxidizing the surface of the cellulose, to which the chitosan is bound, by using an oxidizing agent so as to prepare a first complex fiber, binding bromine to the surface of the cellulose, to which the chitosan is bound, substituting a first functional group including nitrogen with bromine so as to prepare a second complex fiber, and crosslinking the first complex fiber and the second complex fiber.

Advantageous Effects

According to an embodiment of the present application, a solid state electrolyte may include a membrane including cellulose, and chitosan bound to the cellulose of the membrane. The solid state electrolyte may be provided in the form of a membrane in which base complex fibers form a network. The solid state electrolyte may contain a large amount of OH ions and moisture by the chitosan, and may have high ionic conductivity.

Accordingly, the charge/discharge capacity and life properties of a metal-air battery including the solid state electrolyte may be improved.

In addition, the solid state electrolyte may be prepared by a method of injecting and culturing a bacterial strain in a culture medium having a chitosan derivative. Accordingly, a content of the chitosan in the solid state electrolyte may be improved, and the content of chitosan may be easily controlled.

Accordingly, the ionic conductivity, the swelling ratio, and the moisture impregnation rate of the solid state electrolyte may be improved.

The metal-air battery including the solid state electrolyte may perform a charge/discharge operation from −20° C. to 80° C., thereby providing a solid state electrolyte, which may be stably used in high and low temperature environments, and a metal-air battery including the same.

DESCRIPTION OF DRAWINGS

FIG. 1 is a flowchart for explaining a method for preparing a solid state electrolyte according to an embodiment of the present application.

FIG. 2 is a view showing a base complex fiber according to an embodiment of the present application.

FIG. 3 is a view showing a first complex fiber according to an embodiment of the present application.

FIG. 4 is a view showing a second complex fiber according to an embodiment of the present application.

FIG. 5 is a view showing a solid state electrolyte including a base complex fiber according to an embodiment of the present application.

FIG. 6 is a view showing a metal-air battery including a solid state electrolyte according to an embodiment of the present application.

FIG. 7 is a view for explaining a first complex fiber according to Experimental Example 1-2 of the present application, and a method for preparing the same.

FIG. 8 is a view for explaining a second complex fiber according to Experimental Example 1-3 of the present application, and a method for preparing the same.

FIG. 9 is a view for explaining a method for preparing a solid state electrolyte according to Experimental Example 1-4 of the present application.

FIG. 10 is a view for explaining a principle of ion transport in a solid state electrolyte according to Experimental Example 1-4 of the present application.

FIG. 11 is a view showing results of a hydrogen NMR analysis on a first complex fiber, a second complex fiber, and a solid state electrolyte prepared according to Experimental Examples 1-2 to 1-4 of the present application.

FIG. 12 is a view showing results of an XRD analysis on a solid state electrolyte, bacterial cellulose, general bacterial cellulose, and cellulose prepared according to Experimental Examples 1-4 to 1-7 of the present application.

FIG. 13 is a view showing results of an FT-IR analysis on a solid state electrolyte, bacterial cellulose, and general bacterial cellulose prepared according to Experimental Examples 1-4 to 1-6 of the present application.

FIG. 14 is an SEM picture of a solid state electrolyte prepared according to Experimental Example 1-4 of the present application.

FIG. 15 is a view showing results of a TGA and DSC analysis on a solid state electrolyte prepared according to Experimental Examples 1-4 of the present application.

FIGS. 16 to 19 are graphs showing results of an XPS analysis on a solid state electrolyte and bacterial cellulose according to Experimental Examples 1-4 and 1-5 of the present application.

FIG. 20 is a view showing results of measuring ionic conductivity for explaining results of an alkali tolerance test on a solid state electrolyte prepared according to Experimental Example 1-4 of the present application.

FIG. 21 is a view showing results of an XRD analysis for explaining results of an alkali tolerance test on a solid state electrolyte prepared according to Experimental Example 1-4 of the present application.

FIG. 22 is a picture for explaining results of an alkali tolerance test on a solid state electrolyte prepared according to Experimental Example 1-4 of the present application.

FIG. 23 is a stress-strain graph depending on a moisture impregnation rate of a solid state electrolyte according to Experimental Example 1-4 of the present application.

FIG. 24 is a graph showing results of measuring ionic conductivity depending on mechanical deformation of a solid state electrolyte according to Experimental Example 1-4 of the present application.

FIG. 25 is a graph showing results of measuring a storage modulus of a solid state electrolyte according to Experimental Example 1-4 of the present application.

FIG. 26 includes photographs a-f for explaining mechanical stability of a solid state electrolyte according to Experimental Example 1-4 of the present application.

FIG. 27 is a graph showing results of measuring various ion transfer numbers of a solid state electrolyte according to Experimental Example 1-4 of the present application.

FIG. 28 is a view showing results of an XRD analysis on a solid state electrolyte according to Experimental Examples 2-1 to 2-5 of the present invention.

FIG. 29 is a view showing results of an FT-IR analysis on a solid state electrolyte according to Experimental Examples 2-1 to 2-5 of the present invention.

FIG. 30 is a view showing results of measuring ionic conductivity depending on a temperature for a solid state electrolyte according to Experimental Examples 2-1 to 2-5 of the present invention.

FIG. 31 is a graph showing results of measuring the moisture impregnation rate and the swelling ratio of a solid state electrolyte according to Experimental Examples 2-1 to 2-5 of the present invention.

FIG. 32 is an arrhenius plot showing conductivity of a solid state electrolyte according to Experimental Examples 2-1 to 2-5 of the present invention.

FIGS. 33 to 35 are views showing results of an XPS analysis on a solid state electrolyte according to Experimental Examples 3-1 to 3-5 of the present application and bacterial cellulose according to Experimental Example 1-5.

FIG. 36 is a graph showing results of analyzing a ratio of elements in solid state electrolytes according to Experimental Examples 3-1 to 3-5 of the present application and bacterial cellulose according to Experimental Example 1-5.

FIG. 37 is a view showing results of analyzing a configuration ratio of C1s spectra in solid state electrolytes according to Experimental Examples 3-1 to 3-5 of the present application and bacterial cellulose according to Experimental Example 1-5.

FIG. 38 is a view showing results of analyzing a configuration ratio of N1s spectra in solid state electrolytes according to Experimental Examples 3-1 to 3-5 of the present application and bacterial cellulose according to Experimental Example 1-5.

FIG. 39 is a view showing results of an XRD analysis on solid state electrolytes according to Experimental Examples 3-1 to 3-5 of the present application, chitosan according to Experimental Example 3-6, and bacterial cellulose according to Experimental Example 1-5.

FIG. 40 is a view showing results of measuring ionic conductivity depending on a temperature for a solid state electrolyte according to Experimental Examples 3-1 to 3-5 of the present application, chitosan according to Experimental Example 3-6, bacterial cellulose according to Experimental Example 1-5, and general bacterial cellulose according to Experimental Example 1-6.

FIG. 41 is a view showing results of measuring a swelling ratio depending on a temperature for a solid state electrolyte according to Experimental Examples 3-1 to 3-5 of the present application, chitosan according to Experimental Example 3-6, bacterial cellulose according to Experimental Example 1-5, and general bacterial cellulose according to Experimental Example 1-6.

FIG. 42 is a view showing results of measuring a moisture impregnation rate depending on a temperature for a solid state electrolyte according to Experimental Examples 3-1 to 3-5 of the present application, chitosan according to Experimental Example 3-6, bacterial cellulose according to Experimental Example 1-5, and general bacterial cellulose according to Experimental Example 1-6.

FIG. 43 is a graph for explaining results of measuring a voltage of a solid state electrolyte according to Experimental Example 1-4 of the present application.

FIG. 44 is a graph for explaining a charge/discharge capacity of a metal-air battery including a solid state electrolyte according to Experimental Example 1-4 of the present application.

FIG. 46 includes graphs (a) and (b) for explaining a change in charge/discharge properties of a metal-air battery including a solid state electrolyte according to Experimental Example 1-4 of the present application depending on an external temperature condition.

FIG. 47 is a view for explaining retention properties of a metal-air battery including a solid state electrolyte according to Experimental Example 1-4 of the present application depending on the number of charges/discharges in low and high environments.

FIG. 48 includes graphs (a) and (b) for explaining charge/discharge properties of a metal-air battery including a solid state electrolyte according to Experimental Example 1-4 of the present application depending on an external temperature.

FIG. 49 includes graphs (a) and (b) for explaining a capacity property of a metal-air battery including a solid state electrolyte according to Experimental Example 1-4 of the present application depending on an external temperature.

FIG. 50 includes graphs (a) and (b) for explaining a change in charge/discharge properties of a metal-air battery including a solid state electrolyte according to Experimental Example 1-4 of the present application depending on a charge/discharge cycle caused by an external temperature.

FIG. 51 is a block view showing an electric automobile according to an embodiment of the present prevention.

MODE FOR INVENTION

Figure 45:
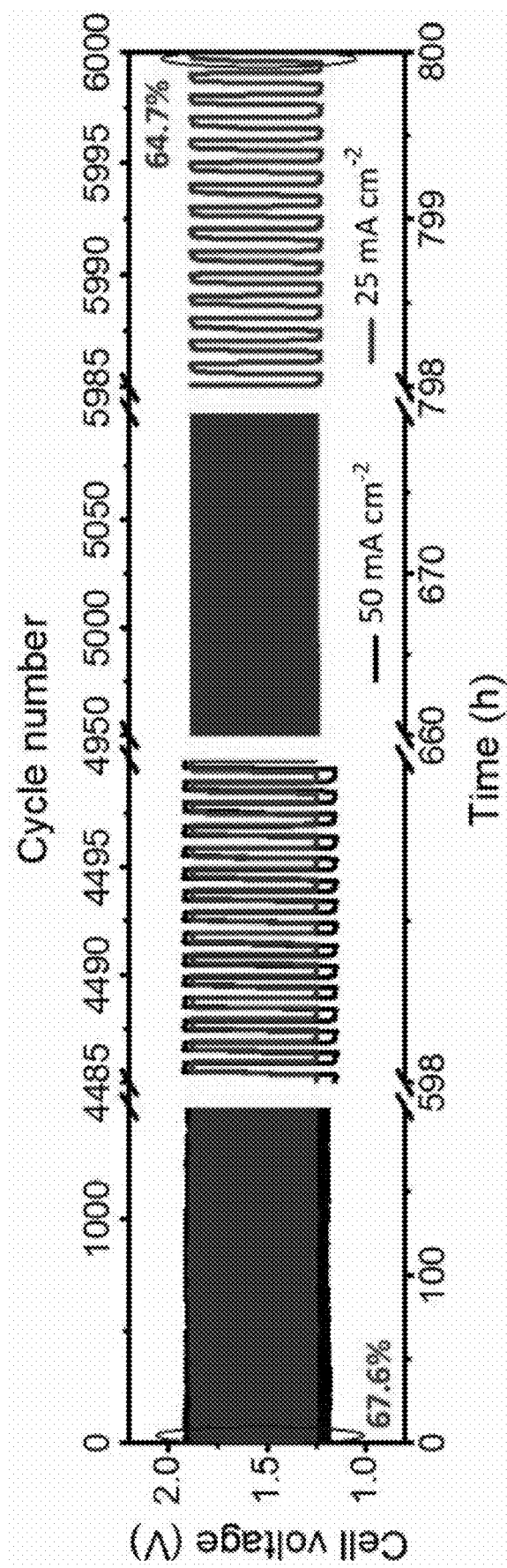
FIG. 45 is a graph showing results of measuring a voltage value of a metal-air battery including a solid state electrolyte according to Experimental Example 1-4 of the present application depending on the number of charges/discharges.

Hereinafter, preferred embodiments of the present invention will be described in detail with reference to the accompanying drawings. However, the technical spirit of the present invention is not limited to the embodiments, but may be realized in different forms. The embodiments introduced herein are provided to sufficiently deliver the spirit of the present invention to those skilled in the art so that the disclosed contents may become thorough and complete.

When it is mentioned in the specification that one element is on another element, it means that the first element may be directly formed on the second element or a third element may be interposed between the first element and the second element. Further, in the drawings, the thicknesses of the membrane and areas are exaggerated for efficient description of the technical contents.

Further, in the various embodiments of the present specification, the terms such as first, second, and third are used to describe various elements, but the elements are not limited to the terms. The terms are used only to distinguish one element from another element. Accordingly, an element mentioned in one embodiment may be mentioned as a second element in another embodiment. The embodiments illustrated here include their complementary embodiments. Further, the term "and/or" in the specification is used to include at least one of the elements enumerated in the specification.

In the specification, the terms of a singular form may include plural forms unless otherwise specified. Further, the terms "including" and "having" are used to designate that the features, the numbers, the steps, the elements, or combinations thereof described in the specification are present, and are not to be understood as excluding the possibility that one or more other features, numbers, steps, elements, or combinations thereof may be present or added. Further, in the following description of the present invention, a detailed description of known functions or configurations incorporated herein will be omitted when it may make the subject matter of the present invention unnecessarily unclear.

FIG. 1 is a flowchart for explaining a method for preparing a solid state electrolyte according to an embodiment of the present application, FIG. 2 is a view showing a base complex fiber according to an embodiment of the present application, FIG. is a view showing a first complex fiber according to an embodiment of the present application, FIG. 4 is a view showing a second complex fiber according to an embodiment of the present application, and FIG. 5 is a view showing a solid state electrolyte including a base complex fiber according to an embodiment of the present application.

Referring to FIGS. 1 to 5, a chitosan derivative may be prepared (S110).

The chitosan derivative may be obtained by mixing a chitosan precursor in a solvent. According to one embodiment, the chitosan derivative may be obtained by adding a solubilizing agent to chitosan chloride and a solvent. Accordingly, the chitosan chloride may be easily dissolved in a solvent, and the chitosan derivative may be easily provided in a medium to be described later, so that cellulose to which chitosan is bound may be easily prepared.

For example, the solvent may be an aqueous acetic acid, and the solubilizing agent may include at least one of glycidyltrimethylammonium chloride, (2-aminoethyl)trimethylammonium chloride, (2-chloroethyl)trimethylammonium chloride, (3-carboxypropyl)trimethylammonium chloride, or (formylmethyl)trimethylammonium chloride.

The chitosan may have excellent thermal and chemical stability, have high ionic conductivity, and contain OH ions without a long-term loss. In addition, as will be described later, when used in a metal-air battery, the chitosan may have high compatibility with a zinc negative electrode and a compound structure of copper, phosphorus, and sulfur.

Chitosan bound to cellulose may be produced from the chitosan derivative (S120). The step of producing the cellulose to which the chitosan is bound may include: preparing a culture medium having the chitosan derivative; and injecting and culturing a bacterial strain in the culture medium to produce a base complex fiber 110 including a cellulose 112 to which the chitosan 114 is bound. In this case, the cellulose 112 may be bacterial cellulose.

According to one embodiment, the cellulose 112, to which the chitosan 114 is bound, may be prepared by culturing a bacterial pellicle in the culture medium and then desalting the bacterial pellicle. The bacterial pellicle may be prepared by preparing a culture medium containing the chitosan derivative together with raw materials (for example, pineapple juice, peptone, disodium phosphate, citric acid) for culturing yeast and bacteria, and injecting and culturing a strain. For example, the strain may be *Acetobacter xylinum*.

The base complex fiber 110 including the cellulose 112, to which the chitosan 114 is bound, may be prepared by washing and drying the cultured bacterial pellicle, desalting with an acidic solution (for example, HCl), neutralizing and removing a solvent. In the desalting process, the remaining Na, K, or cell shielding materials and debris may be removed, so that the cellulose 112, to which the chitosan 114 of high purity is bound, may be prepared.

In addition, the chitosan 114 may be chemically bound to the cellulose 112. Accordingly, in the cellulose 112 to which the chitosan 114 is bound, a stretching vibration corresponding to C—N may be observed during an XPS analysis.

According to one embodiment, the surface of the cellulose 112 to which the chitosan 114 is bound, that is, the surface of the base complex fiber 110 may be oxidized using an oxidizing agent, so that the first complex fiber 110a may be prepared.

Specifically, the step of preparing a first complex fiber 110a may include the steps of: adding the base complex fiber 110 to an aqueous solution containing an oxidizing agent to prepare a source solution; adjusting the pH of the source solution to basic; adjusting the pH of the source solution to neutral; and washing and drying a pulp in the source solution to prepare the first complex fiber 110a.

For example, the aqueous solution containing the oxidizing agent may be an aqueous TEMPO solution. Alternatively, as another example, the aqueous solution containing the oxidizing agent may include at least one of 4-hydroxy-TEMPO, (diacetoxyiodo)benzene, 4-amino-TEMPO, 4-carboxy-TEMPO, 4-methoxy-TEMPO, TEMPO methacrylate, 4-acetamido-TEMPO, 3-carboxy-PROXYL, 4-maleimido-TEMPO, 4-hydroxy-TEMPO benzoate, or 4-phosphonooxy-TEMPO.

The source solution may further include a sacrificial reagent and an additional oxidizing agent for the oxidation reaction of the base complex fiber 110. For example, the sacrificial reagent may include at least one of NaBr, sodium iodide, sodium bromate, Sodium bromite, Sodium borate, sodium chlorite, or sodium chloride, and the additional oxidizing agent may include at least one of NaClO, potassium hypochlorite, lithium hypochlorite, sodium chlorite, sodium chlorate, perchloric acid, potassium perchlorate, lithium perchlorate, tetrabutylammonium perchlorate, zinc perchlorate, hydrogen peroxide, or sodium peroxide.

According to one embodiment, in the step of adjusting the pH of the source solution to be basic, the pH of the source solution may be adjusted to 10. Accordingly, the oxidation reaction may be easily induced while the precipitate is minimized, and a degree of oxidation of the first complex fiber 110a may be improved as compared to the reaction conditions at pH 8 to 9.

According to one embodiment, the additional oxidizing agent may be provided after the base complex fiber 110 and the sacrificial reagent are provided to the aqueous solution containing the oxidizing agent. In addition, the additional oxidizing agent may be provided by dropping. Accordingly, a rapid oxidation phenomenon of the base complex fiber 110 may be prevented, and as a result, the surface of the base complex fiber 110 may be uniformly and stably oxidized.

In addition, according to one embodiment, bromine may be bound to the surface of the cellulose 112 to which the chitosan 114 is bound, and a first functional group 116 containing nitrogen may be substituted with bromine, so that the second complex fiber 110b may be prepared.

The first functional group 116 may be represented as in <Formula 1> below, and the first functional group 116 may be bound with the chitosan 114 and/or the cellulose 112.

<Formula 1>

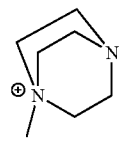

In other words, the second complex fiber 110b may have quaternary N.

Specifically, the step of preparing the second complex fiber 110b may include: dispersing the base complex fiber 110 in a first solvent and adding a bromine source to prepare a first source solution; adding a coupling agent to the first source solution and reacting to prepare a reaction suspension; filtering, washing and freeze-drying the reaction suspension to prepare a brominated base complex fiber; dispersing the brominated base complex fiber in a second solvent to prepare a second source solution; adding and reacting a precursor of the functional group 116 to the second source solution; filtering, washing, and freeze-drying the reacted solution to prepare the second complex fiber 110b.

For example, the first solvent and the second solvent may be the same as each other, and may include at least one of N,N-dimethylacetamide, acetamide, acetonitrile, ethanol, ethylenediamine, diethyl ether, or benzaldehyde.

For example, the bromine source may include at least one of LiBr, sodium bromide, or potassium bromide.

For example, the coupling agent may include N-bromosuccinimide and triphenylphosphine. Bromine can be easily bound to the surface of the base complex fiber 110 by the coupling agent. Specifically, bromine in N-bromosuccinimide may be bound with the base complex fiber 110, and triphenylphosphine may improve a reaction rate by reducing a bromine precursor (bromine source or N-bromosuccinimide).

As described above, after obtaining the brominated base complex fiber from the reaction suspension, the brominated base complex fiber may be freeze-dried. Accordingly, a loss of bromine in the brominated base complex fiber may be minimized, and secondary reaction of bromine with other elements may be minimized.

For example, the precursor of the first functional group 116 may include 1,4-diazabicyclo[2.2.2]octane.

A solid state electrolyte may be prepared by using the cellulose 112 to which the chitosan 114 is bound (S130).

As shown in FIG. 5, the solid state electrolyte may be prepared in the form of a membrane in which the base complex fiber 110 including the cellulose 112, to which the chitosan 114 is bound, forms a network. For this reason, the solid state electrolyte may be provided with a plurality of pores therein, may have a high surface area, and may be excellent in flexibility and mechanical properties.

The solid state electrolyte may be in a state in which a crystalline phase and an amorphous phase are mixed. More specifically, in the solid state electrolyte, the ratio of the amorphous phase may be higher than that of the crystalline phase. Accordingly, the solid state electrolyte may have high ion mobility.

In addition, when the solid state electrolyte is mounted on the metal-air battery, the metal-air battery may smoothly perform a charge/discharge operation from −20° C. to 80° C. In other words, the metal-air battery including the solid state electrolyte according to an embodiment of the present application may smoothly operate at low and high temperatures, may have a wide range of operating temperatures, and may be used in various environments.

According to one embodiment, the solid state electrolyte may be prepared by a gelatin process using the first complex fiber 110a and the second complex fiber 110b. In this case, the solid state electrolyte may include the first complex fiber 110a and the second complex fiber 110b, but the first complex fiber 110a and the second complex fiber 110b may be cross-linked with each other. Due to the first complex fiber 110a, the number of OH ions in the solid state electrolyte may be increased, ionic conductivity may be improved, a negative charge density may be increased, and swelling resistance may be improved. In addition, due to the second complex fiber 110b, a molecular weight may be increased to improve thermal stability, and ion exchange capacity may be improved to yield a high moisture impregnation rate and a high swelling resistance, improve cross-linking strength with the first complex fiber 110a, and provide a selectively high solubility (ion discerning selectivity) with regard to a specific solvent. Accordingly, the charge/discharge properties and life properties of the secondary battery including the solid state electrolyte may be improved.

Specifically, the step of preparing the solid state electrolyte may include the steps of: mixing the first complex fiber 110a and the second complex fiber 110b in a solvent to prepare a mixed solution; adding and reacting a crosslinking agent and an initiator to the mixed solution so as to prepare a suspension; casting and drying the suspension on a substrate to prepare a complex fiber membrane; and performing an ion exchange process on the complex fiber membrane.

For example, the solvent may include methylene chloride, 1,2-propanediol, acetone, and a mixed solvent thereof, the crosslinking agent may include glutaraldehyde, and the initiator may include N,N-diethyl-N-methyl-N-(2-methoxyethyl)ammonium bis(trifluoromethanesulfonyl)imide.

In addition, for example, an ion exchange process for the complex fiber membrane may include a step of providing a KOH aqueous solution and a ZnTFSI aqueous solution to the complex fiber membrane. Accordingly, the content of OH ions in the solid state electrolyte may be improved.

As described above, according to an embodiment of the present application, the solid state electrolyte may include the membrane (M), which has at least one of the base complex fiber 110, the first complex fiber 110a, or the second complex fiber 110b.

In the solid state electrolyte, the ratio of the chitosan 114 may be easily controlled depending on the content of the chitosan derivative provided in the culture medium. Depending on the ratio of the chitosan 114, the crystallinity, ionic conductivity, and swelling ratio of the solid state electrolyte may be controlled. Specifically, as the ratio of the chitosan 114 increases, the crystallinity of the solid state electrolyte may gradually decrease.

According to one embodiment, the content of the chitosan 114 may be more than 30 wt % and less than 70 wt %. If the content of the chitosan 114 is 30 wt % or less, or 70 wt % or more, the ionic conductivity of the solid state electrolyte may be remarkably lowered, and the swelling rate may be remarkably increased.

However, according to an embodiment of the present application, the ratio of the chitosan 114 in the solid state electrolyte may be more than 30 wt % and less than 70 wt %, and thus the solid state electrolyte may have a low swelling ratio value while maintaining high ionic conductivity properties.

FIG. 6 is a view showing a metal-air battery including a solid state electrolyte according to an embodiment of the present application.

Referring to FIG. 6, a metal-air battery according to an embodiment of the present application may be provided. The metal-air battery may include a negative electrode 200, a positive electrode 300, and a solid state electrolyte 100 between the negative electrode 200 and the positive electrode 300.

The solid state electrolyte 100 may be provided in the form of a membrane which includes at least one of the base complex fiber 110, the first complex fiber 110a, or the second complex fiber 110b as described with reference to FIGS. 1 to 5.

The negative electrode 200 may include zinc. Alternatively, in contrast, the negative electrode 200 may also include lithium.

According to one embodiment, the anode 300 may include Pt/C and $RuO_2$. Alternatively, according to another embodiment, the anode 300 may include a compound structure of copper, phosphorus, and sulfur. In this case, the compound structure of copper, phosphorus, and sulfur may be provided in a form in which a plurality of fibrillated fibers form a membrane and may have (101) crystal plane. A specific process of preparing the compound structure of copper, phosphorus, and sulfur will be described later with reference to FIG. 41.

According to an embodiment of the present application, the solid state electrolyte 100 included in the metal-air battery may include a large amount of OH ions and moisture, and may have high ionic conductivity. Accordingly, the charge/discharge capacity and lifetime properties of the metal-air battery may be improved, and a dendrite growth on the surface of the negative electrode 200 may be minimized during the charge/discharge process of the metal-air battery.

The solid state electrolyte according to an embodiment of the present application may be distributed, delivered, traded, and stored as various types of intermediate products. Hereinafter, the various types of intermediate products for preparing a solid state electrolyte according to an embodiment of the present application will be described.

According to a first modified example, the bacterial cellulose, which does not include chitosan by omitting a chitosan derivative and omitting a desalting process according to Experimental Example 1-5 to be described later, may be in a gel state immediately after synthesis, may have a solid state (powder) after drying, or may have a solution state provided in a solvent. The solvent may be, for example, DI water or an organic solvent (e.g., methylene chloride, DMSO, DMF, THF, and IPA).

According to a second modified example, the chitosan derivative according to an embodiment of the present application as described above may be in a gel state immediately after synthesis, may have a solid state (powder) after drying, or may have a solution state provided in a solvent. The solvent may be, for example, DI water or ethanol.

According to a third modified example, the base complex fiber 110, which includes cellulose, to which chitosan is bound according to an embodiment of the present application as described above, may be in a gel state immediately after synthesis, may have a solid state (powder) after drying, or may have a solution state provided in a solvent. The solvent may be, for example, DI water, DMSO, ethanol, methylene chloride, IPA, N,N, -DMF, or THF.

According to a fourth modified example, the first complex fiber 110a, in which a surface of the base complex fiber 110 is oxidized according to an embodiment of the present application as described above, may be in a gel state immediately after synthesis, may have a solid state (powder) after drying, or may have a solution state provided in a solvent. The solvent may be, for example, CHCl3, or DMSO.

According to a fifth modified example, the brominated base complex fiber, in which bromine is bound to the surface of the base complex fiber 110 according to an embodiment of the present application as described above, may be in a gel state immediately after synthesis, may have a solid state (powder) after drying, or may have a solution state provided in a solvent. The solvent may be, for example, CHCl3, DMSO, or ethanol.

According to a sixth modified example, the second complex fiber 110b, in which the first functional group according to an embodiment of the present application as described above has quaternary N bound to the surface of the base complex fiber 110, may be in a gel state immediately after synthesis, may have a solid state (powder) after drying, or may have a solution state provided in a solvent. The solvent may be, for example, CHCl3, or DMSO.

According to a seventh modified example, a solid state electrolyte, in which the first complex fiber 110a and the second complex fiber 100b are crosslinked according to an embodiment of the present application as described above, may have a solid state (membrane), or may have a solution state provided in a solvent. The solvent may be, for example, CHCl3, or DMSO.

Hereinafter, a method for preparing a base complex fiber, a first complex fiber, a second complex fiber, and a solid state electrolyte according to a specific experimental example of the present application will be described.

FIG. 7 is a view for explaining a first complex fiber according to Experimental Example 1-2 of the present application, and a method for preparing the same, FIG. 8 is a view for explaining a second complex fiber according to Experimental Example 1-3 of the present application, and a method for preparing the same, FIG. 9 is a view for explaining a method for preparing a solid state electrolyte according to Experimental Example 1-4 of the present application, and FIG. 10 is a view for explaining a principle of ion transport in a solid state electrolyte according to Experimental Example 1-4 of the present application.

Preparing of Base Complex Fiber (CBC) According to Experimental Example 1-1

*Acetobacter xylinum* was provided as a bacterial strain, and a chitosan derivative was provided. The chitosan derivative was prepared by dissolving 1 g of chitosan chloride in 1% (v/v) aqueous acetic acid, treating with 1 M glycidyltrimethylammonium chloride at 65° C. for 24 hours in an N2 atmosphere, precipitating, filtering multiple times with ethanol.

A Hestrin-Schramm (HS) culture medium containing pineapple juice (2% w/v), yeast (0.5% w/v), peptone (0.5% w/v), disodium phosphate (0.27% w/v), citric acid (0.015% w/v), and chitosan derivative (2% w/v) was prepared and steam-sterilized at 121° C. for 20 minutes. In addition, *Acetobacter xylinum* was activated in a pre-cultivation Hestrin-Schramm (HS) culture medium at 30° C. for 24 hours, and acetic acid was added to maintain pH 6.

After that, *Acetobacter xylinum* was cultured in the Hestrin-Schramm (HS) culture medium at 30° C. for seven days.

The harvested bacterial pellicle was washed with deionized water to neutralize the pH of the supernatant and dehydrated in vacuum at 105° C. The resulting cellulose was demineralized by using 1 N HCl for 30 minutes (mass ratio 1:15, w/v) to remove an excessive amount of reagent, and then was purified by centrifugation several times with deionized water until the supernatant reached a neutral pH. Finally, all solvents were evaporated at 100° C. to prepare a base complex fiber (chitosan-bacterial cellulose (CBC)).

Preparing of First Complex Fiber (oCBC) According to Experimental Example 1-2

A first complex fiber (TEMPO-oxidized CBC (oCBCs)), in which a surface of the base complex fiber is oxidized, was designed according to a method of conjugating a base complex fiber (CBC) of hydroxymethyl and ortho-para directing acetamido to the oxide of TEMPO by an oxidation reaction using 2,2,6,6-tetramethylpiperidine-1-oxyl (TEMPO), sodium bromide (NaBr) and sodium hypochlorite (NaClO) as shown in FIG. 7.

Specifically, 2 g of the base complex fiber dispersed in a 2 mM TEMPO aqueous solution was reacted with NaBr (1.9 mM). 5 mM NaClO was used as an additional oxidizing agent.

The reaction suspension was stirred with ultrasonic waves, and the reaction was allowed to proceed at room temperature for three hours. The pH of the suspension was maintained at 10 by successive addition of 0.5M NaOH solution. Then, 1N HCl was added to the suspension to keep the pH neutral for three hours. The oxidized pulp produced in the suspension was washed three times with 0.5 N HCl, and the supernatant was brought to a neutral pH with deionized water.

The washed pulp was exchanged with acetone and toluene for 30 minutes and dried to evaporate the solvent, and finally a first complex fiber (oCBC) fiber was obtained.

As can be understood from FIG. 7, the surface of the base complex fiber may be oxidized.

Preparing of Second Complex Fiber (qCBC) According to Experimental Example 1-3

A second complex fiber (covalently quaternized CBC (qCBC)), in which a first functional group having nitrogen is bound to the base complex fiber, was prepared according to a method of conjugating a brominated base complex fiber (CBC) and a quaternary amine group by a coupling agent using 1,4-diazabicyclo[2.2.2]octane, as shown in FIG. 8.

Specifically, 1 g of the base complex fiber dispersed in N,N-dimethylacetamide (35 ml) solution was reacted with LiBr (1.25 g) suspension while stirring for 30 minutes. N-bromosuccinimide (2.1 g) and triphenylphosphine (3.2 g) were used as a coupling agent. The two reaction mixtures were stirred for 10 minutes and reacted at 80° C. for 60 minutes.

Then, the reaction suspension was cooled to room temperature, added to deionized water, filtered, rinsed with deionized water and ethanol, and freeze-dried to obtain a brominated base complex fiber (bCBC) fiber.

The brominated base complex fiber was dissolved in 100 ml of N,N-dimethylformamide, and reacted with 1.2 g of 1,4-diazabicyclo[2.2.2]octane.

After that, the mixture was subjected to ultrasonic treatment for 30 minutes, and then reacted at room temperature for 24 hours. The resulting solution was mixed with diethyl ether, washed five times with diethyl ether/ethyl acetate, and freeze-dried to obtain a second complex fiber (covalently quaternized CBC (qCBC)).

As can be understood from FIG. 8, it can be confirmed that the first functional group having nitrogen is bound to the surface of the base complex fiber.

Preparing of Solid State Electrolyte (CBCs) According to Experimental Example 1-4

A solid state electrolyte was prepared by a gelatin process using the first complex fiber (oCBC) and the second complex fiber (qCBC), as shown in FIG. 8. Specifically, the first complex fiber (oCBC) and the second complex fiber (qCBC) were dissolved in a mixture of methylene chloride, 1,2-propanediol and acetone (8:1:1 v/v/v %) at the same weight ratio by using ultrasonic waves, and then 1 wt % of glutaraldehyde as a crosslinking agent and 0.3 wt % of N,N-diethyl-N-methyl-N-(2-methoxyethyl)ammonium bis(trifluoromethanesulfonyl)imide as an initiator were added.

Bubbles were removed from the gel suspension by using a vacuum chamber (200 Pa), and casted on a glass at 60° C. for six hours. The complex fiber membrane was peeled off while coagulating with deionized water, rinsed with deionized water, and vacuum dried.

A solid state electrolyte (CBCs) was prepared by an ion exchange with 1 M KOH aqueous solution and 0.1 M ZnTFSI at room temperature for six hours, respectively. After that, washing and immersion processes were performed with deionized water in an N2 atmosphere in order to avoid a reaction with $CO_2$ and a formation of carbonate.

As can be understood from FIG. 9, it can be confirmed that the first complex fibers (oCBC) and the second complex fibers (qCBC) are crosslinked to each other to form the solid state electrolyte (CBCs).

In addition, referring to FIG. 10, OH ions are hopping (grotthuss transport) on the surfaces of the first complex fiber (oCBC) and the second complex fiber (qCBC) crosslinked in the solid state electrolyte (CBCs), and may move through diffusion in the interior spaced apart from the surfaces of the first complex fiber and the second complex fiber. In addition, the solid state electrolyte (CBCs) may have an amorphous phase as will be described later with reference to FIG. 12, and thus may have high ionic conductivity compared to a crystalline structure.

Preparing of Bacterial Cellulose According to Experimental Example 1-5

In the method of preparing the base complex fiber of Experimental Example 1-1 as described above, bacterial cellulose without chitosan was prepared by omitting the chitosan derivative and omitting the desalting process.

Preparing of General Bacterial Cellulose According to Experimental Example 1-6

Bacterial cellulose was prepared by the same method as shown in Experimental Example 1-1 with a culture medium containing glucose (2 wt %), peptone (0.5 wt %), yeast (0.5 wt %), disodium phosphate (0.2 wt %), and citric acid (0.1 wt %), but by omitting the chitosan derivative and omitting the desalting process.

Preparing of Cellulose According to Experimental Example 1-7

Sugarcane bagasse was prepared, and a solvent was prepared by mixing deionized water, NaOH, and nitric acid in ethanol. Sugarcane bagasse was dispersed in a solvent, washed, filtered, and washed several times with deionized water until a neutral pH was reached.

The washed sugarcane bagasse was dried at 100° C. for three hours and polished with a stainless steel sieve of 16 mesh IKA MF-10 mill so as to prepare fiber pulp.

A unit process of bleaching the fiber pulp with hydrogen peroxide (1%, pH 13.5) at 55° C. for one hour was repeated a total of three times, and the residue was removed with NaOH solution for three hours in an air atmosphere, washed with ethanol and acetone, and dried at 50° C. for six hours so as to prepare cellulose.

Experimental Examples 1-1 to 1-7 may be summarized as shown in [Table 1] below.

TABLE 1

| Classification | Structure |
|---|---|
| Experimental Example 1-1 | Base complex fiber (CBC): Chitosan + Bacterial cellulose |
| Experimental Example 1-2 | First complex fiber (oCBC): Surface oxidized chitosan + Surface oxidized bacterial cellulose |
| Experimental Example 1-3 | Second complex fiber (qCBC): Chitosan having a first functional group + Bacterial cellulose having a first functional group |
| Experimental Example 1-4 | Crosslinking of first complex fiber (oCBC) and second complex fiber (qCBC) |
| Experimental Example 1-5 | Bacterial cellulose without chitosan |
| Experimental Example 1-6 | Common bacteria cellulose |
| Experimental Example 1-7 | Cellulose |

FIG. 11 is a view showing results of a hydrogen NMR analysis on a first complex fiber, a second complex fiber, and a solid state electrolyte prepared according to Experimental Examples 1-2 to 1-4 of the present application.

Referring to FIG. 11, a hydrogen NMR analysis was performed on a first complex fiber, a second complex fiber, and a solid state electrolyte prepared according to Experimental Examples 1-2 to 1-4.

As a result of analysis in FIG. 11, circles with numbers indicated correspond to hydrogen atoms corresponding to circles with the same numbers indicated in FIG. 9. In other words, the result of NMR analysis on circles with numbers indicated in FIG. 9 can be confirmed from FIG. 11. As can be understood from FIG. 11, it can be confirmed that the first complex fibers and the second complex fibers are alternately and repeatedly crosslinked at the same ratio.

FIG. 12 is a view showing results of an XRD analysis on a solid state electrolyte, bacterial cellulose, general bacterial cellulose, and cellulose prepared according to Experimental Examples 1-4 to 1-7 of the present application.

Referring to FIG. 12, an XRD analysis was performed on a solid state electrolyte, bacterial cellulose, general bacterial cellulose, and cellulose prepared according to Experimental Examples 1-4 to 1-7 as described above.

As can be understood from FIG. 12, it can be confirmed that the cellulose fiber of Experimental Example 1-7 has high crystallinity and has peak values corresponding to (200), (110), (1-10) crystal planes, and thus has a hexagonal crystal structure. In contrast, it could be confirmed for the bacterial cellulose (C(I)) of Experimental Example 1-6 that crystallinity is relatively decreased, and the 2θ value of the peak corresponding to (200) crystal plane is decreased.

For the bacterial cellulose of Experimental Example 1-5 prepared according to an embodiment of the present application, it could be confirmed that crystallinity is remarkably decreased compared to the general cellulose fiber of Experimental Example 1-7, and the bacterial cellulose has a peak value corresponding to (020) and (110) crystal planes unlike the general cellulose fiber of Experimental Example 1-7 and the general bacterial cellulose of Example 1-6, and has two peak values corresponding to (1-10) crystal plane. In addition, it can be confirmed that the peak value corresponding to (110) crystal plane is higher than the peak value corresponding to the other crystal planes (e.g., (101) and (1-10)).

In addition, it can be confirmed that the solid state electrolyte of Experimental Example 1-4 prepared according to an embodiment of the present application has a crystalline phase and an amorphous phase at the same time, but the ratio of the amorphous phase is remarkably high.

FIG. 13 is a view showing results of an FT-IR analysis on a solid state electrolyte, bacterial cellulose, and general bacterial cellulose prepared according to Experimental Examples 1-4 to 1-6 of the present application.

Referring to FIG. 13, an FT-IR analysis was performed on a solid state electrolyte, bacterial cellulose, and general bacterial cellulose according to Experimental Examples 1~4 to 1-6 as described above.

As can be understood from FIG. 13, it can be confirmed for the bacterial cellulose of Experimental Example 1-5 that a stretching vibration of C—O and O—H moves from 1056 $cm^{-1}$ and 2932 $cm^{-1}$ to 1022 $cm^{-1}$ and 2895 $cm^{-1}$ compared to the general bacterial cellulose of Experimental Example 1-6. In addition, it can be confirmed for the solid state electrolyte of Experimental Example 1-4 according to an embodiment of the present application that a stretching vibration of C—$N^+$ is observed at 1458 $cm^{-1}$ and thus a quaternization reaction occurs. It can be confirmed that the vibration at 2916 $cm^{-1}$ and 3320 $cm^{-1}$ corresponds to the stretching vibration of O—H and the vibration at 1652 $cm^{-1}$ and 1750 $cm^{-1}$ corresponds to water, suggesting that sufficient water molecules exist in the amorphous solid state electrolyte, and the increase in the stretching vibration of C—O in the solid state electrolyte of Experimental Example 1-4 is caused by the reaction of chitosan and bacterial cellulose. In addition, it can be confirmed that carbonate is not substantially present in the solid state electrolyte of Experimental Example 1-4, and accordingly it can be understood that it has an advantage compared to a commercialized PVA electrolyte.

FIG. 14 is an SEM picture of a solid state electrolyte prepared according to Experimental Example 1-4 of the present application.

Referring to FIG. 14, an SEM picture was taken of the solid state electrolyte prepared according to Experimental Example 1-4 as described above.

As can be understood from FIG. 14, it can be confirmed that a plurality of pores exist therein, and the bacterial cellulose fiber, to which chitosan is bound, is provided in a fibrillated form and has a diameter of 5 to 10 nm.

It can be understood that the size of the pores is measured to be about 20 to 200 nm, and the bacterial cellulose fibers, to which chitosan is bound, in the solid state electrolyte form a network with high pores and high surface area, thereby providing high strength against swelling.

FIG. 15 is a view showing results of a TGA and DSC analysis on a solid state electrolyte prepared according to Experimental Examples 1-4 of the present application.

Referring to FIG. 15, TGA and DSC analyses were performed on the solid state electrolyte prepared according to Experimental Example 1-4 as described above while increasing a temperature at 5° C./min in a nitrogen atmosphere.

As can be understood from FIG. 15, it can be confirmed that the solid state electrolyte according to Experimental Example 1-4 of the present application stably has thermal stability up to about 225° C. In other words, it can be understood that the solid state electrolyte prepared according to an embodiment of the present invention has high temperature stability.

FIGS. 16 to 19 are graphs showing results of an XPS analysis on a solid state electrolyte and bacterial cellulose according to Experimental Examples 1-4 and 1-5 of the present application.

Referring to FIGS. 16 to 19, an XPS analysis was performed on the solid state electrolyte and bacterial cellulose prepared according to Experimental Examples 1-4 and 1-5 as described above. FIG. 17 shows C1s spectra, FIG. 18 shows N1s spectra, and FIG. 19 shows O1s spectra.

In FIG. 17, 284.5 eV, 285.9 eV, 288 eV, and 289.7 eV correspond to C=C, C—N, C—O, and C—OH, respectively, and in FIG. 18, 399.9 eV, 401.3 eV, and 402.5 eV correspond to pyrrolic, quaternary, and oxidized N, respectively.

As can be understood from FIGS. 16 to 19, it can be confirmed as a result of the XPS analysis that the solid state electrolyte of Experimental Example 1-4 having a bacterial cellulose, to which chitosan is bound, has a peak value corresponding to pyrrolic, quaternary, and oxidized N in the N1s spectrum, compared to the bacterial cellulose of Experimental Example 1-5, from which chitosan was omitted.

FIG. 20 is a view showing results of measuring ionic conductivity for explaining results of an alkali tolerance test on a solid state electrolyte prepared according to Experimental Example 1-4 of the present application.

Referring to FIG. 20, the solid state electrolyte, prepared according to Experimental Example 1-4 as described above, a PVA film, and A201 membrane (Tokuyama), which is an anion exchange membrane, were immersed in a 1M KOH solution at 100° C., and then ionic conductivity was measured according to time for 2500 hours. The picture inserted in FIG. 20 was taken of the solid state electrolyte (30 cm×30 cm, 5 um) prepared according to Experimental Example 1-4 of the present application.

As can be understood from FIG. 20, it can be confirmed that the solid state electrolyte according to Experimental Example 1-4 of the present application has substantially no change in ionic conductivity. In contrast, it can be confirmed that the ionic conductivity of the A201 membrane and the PVA film is rapidly decreased. In other words, even if the solid state electrolyte according to an embodiment of the present application is used in a basic environment, it can be confirmed that it has long-term reliability without any change in ionic conductivity.

FIG. 21 is a view showing results of an XRD analysis for explaining results of an alkali tolerance test on a solid state electrolyte prepared according to Experimental Example 1-4 of the present application.

Referring to FIG. 21, the solid state electrolyte of Experimental Example 1-4 was immersed in a KOH solution, and then an XRD analysis was performed as described with reference to FIG. 20.

As can be understood from FIG. 21, it can be confirmed that there is no substantially crystallographic change in the solid state electrolyte even after being immersed in the basic solution for a long time. In other words, even if the solid state electrolyte according to an embodiment of the present application is used in a basic environment, it can be confirmed that it has long-term reliability without any crystallographic change.

FIG. 22 is a picture for explaining results of an alkali tolerance test on a solid state electrolyte prepared according to Experimental Example 1-4 of the present application.

Referring to FIG. 22, a picture was taken after the solid state electrolyte of Experimental Example 1-4 was immersed in a KOH solution, as described with reference to FIG. 20.

As can be understood from FIG. 22, it can be confirmed that the solid state electrolyte membrane has no substantial change in appearance even after being immersed in the basic solution for a long time. In other words, even if the solid state electrolyte according to an embodiment of the present application is used in a basic environment, it can be confirmed that it has long-term reliability without any change in appearance.

FIG. 23 is a stress-strain graph depending on a moisture impregnation rate of a solid state electrolyte according to Experimental Example 1-4 of the present application.

Referring to FIG. 23, a stress-strain analysis was performed on the solid state electrolyte (CBCs) prepared according to Experimental Example 1-4 as described above depending on a moisture impregnation rate at room temperature under 40% relative humidity. The stress-strain analysis was also performed on the A201 membrane (moisture impregnation rate of 44 wt %) under the same conditions.

As can be understood from FIG. 23, it can be confirmed that a strain value for the applied stress is changed according to the moisture impregnation rate. Specifically, it can be confirmed that the yield strength decreases as the moisture impregnation rate increases.

In particular, it can be confirmed that the solid state electrolyte according to an experimental example of the present application has a remarkably high moisture impregnation rate and remarkably high mechanical properties compared to the commercially available A201 membrane.

FIG. 24 is a graph showing results of measuring ionic conductivity depending on mechanical deformation of a solid state electrolyte according to Experimental Example 1-4 of the present application.

Referring to FIG. 24, ionic conductivity was measured for the solid state electrolyte (CBCs) prepared according to Experimental Example 1-4 as described above and the A201 membrane while being bent from 0° to 180°, and then the ionic conductivity was also measured after being crumpled or wound.

As can be understood from FIG. 24, it can be confirmed that the solid state electrolyte according to Experimental Example 1-4 of the present application has substantially no change in ionic conductivity despite various mechanical deformations. In contrast, it can be confirmed that the commercially available A201 membrane decreases in ionic conductivity according to the number of bending, and the ionic conductivity is rapidly decreased when being crumpled or wound.

In other words, it can be confirmed that the solid state electrolyte according to an experimental example of the present invention maintains a stable performance without a substantial change in ionic conductivity despite various mechanical deformations.

FIG. 25 is a graph showing results of measuring a storage modulus of a solid state electrolyte according to Experimental Example 1-4 of the present application.

Referring to FIG. 25, a storage modulus was measured for the solid state electrolyte prepared according to Experimental Example 1-4 as described above while changing the frequency to which an external force is applied. As can be understood from FIG. 25, it can be confirmed that the storage modulus of the solid state electrolyte linearly increases as the frequency increases.

FIG. 26 includes photographs a-f for explaining mechanical stability of a solid state electrolyte according to Experimental Example 1-4 of the present application.

Referring to FIG. 26, the solid state electrolyte prepared according to Experimental Example 1-4 as described above was crumpled at room temperature (a, b, c in FIG. 26) and −20° C. (d, e, f in FIG. 26), and whether it is restored or not was photographed. As can be understood from FIG. 26, it can be confirmed that it is easily restored to an actual original state even at room temperature as well as at low temperature, after being crumpled. In other words, it can be confirmed that the solid state electrolyte according to Experimental Example 1-4 of the present application is stably restored without a substantial change in appearance despite various mechanical deformations at room temperature as well as in a low temperature environment.

FIG. 27 is a graph showing results of measuring various ion transfer numbers of a solid state electrolyte according to Experimental Example 1-4 of the present application.

Referring to FIG. 27, an ion transfer rate for $K^+$, $Zn^{2+}$, $OH^-$, $TFSI^-$, and $[Ch]^+$ ions was calculated for the solid state electrolyte prepared according to Experimental Example 1-4 as described above. As shown in FIG. 27, it was confirmed to have the highest transfer rate for $OH^-$ ions, and it was also confirmed to have a high transfer rate for $K^+$ ions after $OH^-$ ions.

Specific ionic conductivity may be as shown in [Table 2] below.

TABLE 2

| Ion Type | Charge valence ($Z_i$) | Ionic conductivity ($m^2s^{-1}V^{-1}$) | Concentration (M) | Transfer coefficient ($t_i$) |
|---|---|---|---|---|
| $K^+$ | 1 | $6.88*10^{-8}$ | 6 | 0.15 |
| $Zn^{2+}$ | 2 | $5.32*10^{-8}$ | 0.2 | 0.014 |
| $OH^-$ | 1 | $2.15*10^{-7}$ | 6 | 0.75 |
| $TFSI^-$ | 1 | $3.69*10^{-8}$ | 0.4 | 0.006 |
| $[Ch]^+$ | 1 | $7.56*10^{-8}$ | 1 | 0.08 |

Preparing of Solid State Electrolyte According to Experimental Examples 2-1 to 2-5

The solid state electrolytes according to Experimental Examples 2-1 to 2-5 were prepared by the same method as shown in Experimental Example 1-4 as described above, while adjusting the ratio of the first complex fiber (oCBC) of Experimental Example 1-2 and the ratio of the second complex fiber (qCBC) of Experimental Example 1-3 as shown in [Table 3] below.

TABLE 3

| Classification | 1st complex fiber | 2nd complex fiber |
|---|---|---|
| Experimental Example 2-1 | 10 wt % | 90 wt % |
| Experimental Example 2-2 | 30 wt % | 70 wt % |
| Experimental Example 2-3 | 50 wt % | 50 wt % |
| Experimental Example 2-4 | 70 wt % | 30 wt % |
| Experimental Example 2-5 | 90 wt % | 10 wt % |

FIG. 28 is a view showing results of an XRD analysis on a solid state electrolyte according to Experimental Examples 2-1 to 2-5 of the present invention.

Referring to FIG. 28, an XRD analysis was performed on the solid state electrolytes according to Experimental Examples 2-1 to 2-5 as described above.

As can be understood from FIG. 28, it can be confirmed that the solid state electrolytes according to Experimental Examples 2-1 to 2-5 have peak values corresponding to (101) and (002) crystal planes, and the crystal structure does not substantially change depending on the ratio of the first complex fiber (oCBC) and the second complex fiber (qCBC), but the 2θ value of the peak value corresponding to (002) crystal plane slightly increases as the ratio of the second complex fiber increases.

FIG. 29 is a view showing results of an FT-IR analysis on a solid state electrolyte according to Experimental Examples 2-1 to 2-5 of the present invention.

Referring to FIG. 29, an FT-IR analysis was performed on the solid state electrolytes according to Experimental Examples 2-1 to 2-5 as described above.

It can be confirmed from FIG. 29 that the vibrations at 2916 $cm^{-1}$ and 3320 $cm^{-1}$ correspond to the O—H stretching vibration, and the solid state electrolyte with the same ratio of the first complex fiber and the second complex fiber according to Experimental Example 2-3 has a higher strength of the O—H stretching vibration than that of the solid state electrolytes according to Experimental Examples 2-1, 2-2, 2-4, and 2-5.

In other words, controlling the ratio of the first complex fiber to more than 30 wt % and less than 70 wt %, and controlling the ratio of the second complex fiber to less than 70 wt % and more than 30 wt % increases the content of OH ions in the solid state electrolyte, and thus is expected to be an efficient way to improve the ionic conductivity of OH ions.

FIG. 30 is a view showing results of measuring ionic conductivity depending on a temperature for a solid state electrolyte according to Experimental Examples 2-1 to 2-5 of the present invention.

Referring to FIG. 30, the ionic conductivity of the solid state electrolytes according to Experimental Examples 2-1 to 2-5 as described above was measured according to temperatures, and the ionic conductivity of the commercially available A201 membrane was measured according to temperatures.

As can be understood from FIG. 30, the ionic conductivity of the solid state electrolyte according to Experimental Examples 2-1 to 2-5 and the A201 membrane increased as the temperature increased. In addition, it can be confirmed that the ionic conductivity of the solid state electrolytes according to Experimental Examples 2-1 to 2-5 is remarkably higher than that of the A201 membrane.

In addition, it can be confirmed that the solid state electrolyte with the same ratio of the first complex fiber and the second complex fiber according to Experimental Example 2-3 has ionic conductivity higher than that of the solid state electrolytes according to Experimental Examples 2-1, 2-2, 2-4, and 2-5. As a result, it can be confirmed that controlling the ratio of the first complex fiber to more than 30 wt % and less than 70 wt %, and controlling the ratio of the second complex fiber to less than 70 wt % and more than 30 wt % is an efficient way to improve the ionic conductivity of OH ions.

FIG. 31 is a graph showing results of measuring the moisture impregnation rate and the swelling ratio of a solid state electrolyte according to Experimental Examples 2-1 to 2-5 of the present invention.

Referring to FIG. 31, the moisture impregnation rate and the swelling ratio of the solid state electrolytes according to Experimental Examples 2-1 to 2-5 as described above were measured according to temperatures, and the moisture impregnation rate and the swelling ratio of the commercially available A201 membrane were measured according to temperatures.

As can be understood from FIG. 31, the moisture impregnation rate of the solid state electrolyte according to Experimental Examples 2-1 to 2-5 and the A201 membrane increased as the temperature increased. In addition, it can be confirmed that the moisture impregnation rate of the solid state electrolytes according to Experimental Examples 2-1 to 2-5 is remarkably higher than that of the A201 membrane.

In addition, it can be confirmed that the solid state electrolyte with the same ratio of the first complex fiber and the second complex fiber according to Experimental Example 2-3 has the moisture impregnation rate higher than that of the solid state electrolytes according to Experimental Examples 2-1, 2-2, 2-4, and 2-5.

In addition, it can be confirmed that the swelling ratio of the A201 membrane remarkably increases as the temperature increases. In contrast, it can be confirmed that the solid state electrolytes according to Experimental Examples 2-1 to 2-5 have a remarkably low swelling ratio according to an increase in temperatures, and the solid state electrolyte according to Experimental Example 2-3 has no substantial change in the swelling ratio even when the temperature increases.

As a result, it can be confirmed that controlling the ratio of the first complex fiber to more than 30 wt % and less than 70 wt %, and controlling the ratio of the second complex fiber to less than 70 wt % and more than 30 wt % is an efficient way to improve a moisture impregnation rate and minimize a swelling ratio and a change in the swelling ratio depending on temperatures.

FIG. 32 is an arrhenius plot showing conductivity of a solid state electrolyte according to Experimental Examples 2-1 to 2-5 of the present invention.

Referring to FIG. 32, the arrhenius plots of the solid state electrolytes according to Experimental Examples 2-1 to 2-5 as described above and the A201 membrane are shown.

As can be understood from FIG. 32, it can be confirmed that the conductivity of the solid state electrolytes according to Experimental Examples 2-1 to 2-5 increases as the temperature increases. In addition, it can be confirmed that the conductivity of the solid state electrolytes according to Experimental Examples 2-1 to 2-5 is remarkably higher than that of the A201 membrane.

In addition, it can be confirmed that the solid state electrolyte with the same ratio of the first complex fiber and the second complex fiber according to Experimental Example 2-3 has the conductivity higher than that of the solid state electrolytes according to Experimental Examples 2-1, 2-2, 2-4, and 2-5.

As a result, it can be confirmed that controlling the ratio of the first complex fiber to more than 30 wt % and less than 70 wt %, and controlling the ratio of the second complex fiber to less than 70 wt % and more than 30 wt % is an efficient way to improve the conductivity.

Preparing of Solid State Electrolytes According to Experimental Examples 3-1 to 3-5

According to the above-described experimental example, a base complex fiber was prepared, but base complex fibers having different chitosan contents were prepared by adjusting the addition ratio of the chitosan derivative. After that, according to Experimental Example 1-4 as described above, a solid state electrolyte was prepared by using base complex fibers having different chitosan contents.

Providing of Chitosan According to Experimental Example 3-6

Pure chitosan was provided as a comparative example of Experimental Embodiments 3-1 to 3-5 as described above.

A content of chitosan in the solid state electrolytes according to Experimental Examples 3-1 to 3-6 are shown as shown in [Table 4] below.

TABLE 4

| Classification | Ratio of chitosan |
| --- | --- |
| Experimental Example 3-1 | 10 wt % |
| Experimental Example 3-2 | 30 wt % |
| Experimental Example 3-3 | 50 wt % |
| Experimental Example 3-4 | 70 wt % |
| Experimental Example 3-5 | 90 wt % |
| Experimental Example 3-6 | 100 wt % |

FIGS. 33 to 35 are views showing results of an XPS analysis on solid state electrolytes according to Experimental Examples 3-1 to 3-5 of the present application and bacterial cellulose according to Experimental Example 1-5, FIG. 36 is a graph showing results of analyzing a ratio of elements in solid state electrolytes according to Experimental Examples 3-1 to 3-5 of the present application and bacterial cellulose according to Experimental Example 1-5, FIG. 37 is a view showing results of analyzing a configuration ratio of C1s spectra in solid state electrolytes according to Experimental Examples 3-1 to 3-5 of the present application and bacterial cellulose according to Experimental Example 1-5, and FIG. 38 is a view showing results of analyzing a configuration ratio of N1s spectra in solid state electrolytes according to Experimental Examples 3-1 to 3-5 of the present application and bacterial cellulose according to Experimental Example 1-5.

Referring to FIGS. 33 to 38, an XPS analysis was performed on the solid state electrolytes according to Experimental Examples 3-1 to 3-5 as described above, and the bacterial cellulose from which chitosan was omitted according to Experimental Example 1-5 as described above. As shown in FIG. 36, the ratio of the elements in the solid state electrolyte was analyzed. As shown in FIG. 37, the configuration ratio of the C1s spectra was analyzed. As shown in FIG. 38, the configuration ratio of the N1s spectra was analyzed. FIG. 33 shows C1s spectra, FIG. 34 shows O1s spectra, and FIG. 35 shows N1s spectra.

It can be confirmed for the solid state electrolytes according to Experimental Examples 3-1 to 3-5 that C—N binding is observed according to the binding of chitosan and bacterial cellulose compared to the bacterial cellulose of Experimental Example 1-5 from which chitosan was omitted.

In addition, as can be understood from FIGS. 33 and 37, it can be confirmed that the ratio of C—N increases as the ratio of chitosan increases from 0 to 50 wt %, and the ratio of C—N decreases as the ratio of chitosan increases from 50 wt % to 90 wt %. In other words, when the ratio of chitosan is more than 30 wt % and less than 70 wt %, it can be confirmed that the ratio of C—N in the solid state electrolyte is remarkably high.

In addition, as can be understood from FIGS. 35 and 38, it can be confirmed that a nitrogen peak is not detected in the bacterial cellulose of Experimental Example 1-5 from which chitosan is omitted, and the ratio of oxidized N generally increases as the ratio of chitosan increases, but the ratio of pyrrolic N increases as the ratio of chitosan increases from 0 to 50 wt %, and decreases as the ratio of chitosan increases from 50 wt % to 90 wt %. In other words, when the ratio of chitosan is more than 30 wt % and less than 70 wt %, it can be confirmed that the ratio of pyrrolic N ratio in the solid state electrolyte is remarkably high.

In addition, as can be understood from FIG. 36, it can be confirmed that the ratio of nitrogen increases as the ratio of chitosan increases, and the ratio of nitrogen reaches 6.63 wt %, when the ratio of chitosan is 90 wt % according to Experimental Example 3-5.

FIG. 39 is a view showing results of an XRD analysis on solid state electrolytes according to Experimental Examples 3-1 to 3-5 of the present application, chitosan according to Experimental Example 3-6, and bacterial cellulose according to Experimental Example 1-5.

Referring to FIG. 39, an XRD analysis was performed on the solid state electrolytes according to Experimental Examples 3-1 to 3-5 as described above, chitosan according to Experimental Example 3-6, and bacterial cellulose according to Experimental Example 1-5, from which chitosan is omitted.

As can be understood from FIG. 39, it can be confirmed that a specific peak is not observed in the chitosan itself of Experimental Example 3-6, and the solid state electrolytes according to Experimental Examples 3-1 to 3-6 have somewhat low crystallinity compared to the bacterial cellulose of Experimental Example 1-5.

In addition, it can be confirmed that crystallinity decreases to have an amorphous phase like chitosan as the ratio of chitosan gradually increases. In particular, it can be confirmed that the crystallinity rapidly decreases when the ratio of chitosan is 70 wt % or more according to Experimental Example 3-4.

FIG. 40 is a view showing results of measuring ionic conductivity depending on a temperature for a solid state electrolyte according to Experimental Examples 3-1 to 3-5 of the present application, chitosan according to Experimental Example 3-6, bacterial cellulose according to Experimental Example 1-5, and general bacterial cellulose according to Experimental Example 1-6.

Referring to FIG. 40, the ionic conductivity was measured depending on temperatures for solid state electrolytes according to Experimental Examples 3-1 to 3-5, chitosan according to Experimental Example 3-6, bacterial cellulose according to Experimental Example 1-5, from which chitosan is omitted, and general bacterial cellulose according to Experimental Example 1-6.

As can be understood from FIG. 40, the ionic conductivity was increased as a temperature rose with regard to solid state electrolytes according to Experimental Examples 3-1 to 3-5, chitosan according to Experimental Example 3-6, bacterial cellulose according to Experimental Example 1-5, from which chitosan is omitted, and general bacterial cellulose according to Experimental Example 1-6. In addition, it can be confirmed that the bacterial cellulose according to Experimental Example 1-5 of the present invention has a high ionic conductivity compared to the general bacterial cellulose of Experimental Example 1-6 and the chitosan of Experimental Example 3-6, and it can be also confirmed that the solid state electrolytes according to Experimental Examples 3-1 to 3-5 have a remarkably high ionic conductivity compared with the bacterial cellulose according to Experimental Example 1-5, from which chitosan is omitted, the general bacterial cellulose according to Experimental Example 1-6, and the chitosan according to Experimental Example 3-6.

In addition, it can be confirmed that the solid state electrolyte with 50 wt % of chitosan according to Experimental Example 3-3 has ionic conductivity remarkably higher than that of the solid state electrolytes according to Experimental Examples 3-1, 3-2, 3-4, and 3-5. As a result, it can be confirmed that controlling the ratio of chitosan to more than 30 wt % and less than 70 wt % in the solid state electrolyte is an efficient way to improve the ionic conductivity of OH ions.

FIG. 41 is a view showing results of measuring a swelling ratio depending on a temperature for a solid state electrolyte according to Experimental Examples 3-1 to 3-5 of the present application, chitosan according to Experimental Example 3-6, bacterial cellulose according to Experimental Example 1-5, and general bacterial cellulose according to Experimental Example 1-6.

Referring to FIG. 41, a swelling ratio was measured depending on temperatures for solid state electrolytes according to Experimental Examples 3-1 to 3-5 as described above, chitosan according to Experimental Example 3-6, bacterial cellulose according to Experimental Example 1-5 and general bacterial cellulose according to Experimental Example 1-6.

As can be understood from FIG. 41, the swelling ratio was increased as a temperature rose with regard to solid state electrolytes according to Experimental Examples 3-1 to 3-5, chitosan according to Experimental Example 3-6, bacterial cellulose according to Experimental Example 1-5, from which chitosan is omitted, and general bacterial cellulose according to Experimental Example 1-6. In addition, it can be confirmed that the bacterial cellulose according to Experimental Example 1-5 of the present application has a low swelling ratio compared to the general bacterial cellulose of Experimental Example 1-6, the chitosan of Experimental Example 3-6, as well as Experimental Examples 3-1, 3-2, 3-4 and 3-5.

In addition, it can be confirmed that solid state electrolyte with 50 wt % of chitosan according to Experimental Example 3-3 has the swelling ratio remarkably higher than that of the solid state electrolytes according to Experimental Examples 3-1, 3-2, 3-4, and 3-5 as well as the bacterial cellulose of Experimental Example 1-5 of the present application. As a result, it can be confirmed that controlling the ratio of chitosan to more than 30 wt % and less than 70 wt % in the solid state electrolyte is an efficient way to improve the swelling ratio.

FIG. 42 is a view showing results of measuring a moisture impregnation rate depending on a temperature for a solid state electrolyte according to Experimental Examples 3-1 to 3-5 of the present application, chitosan according to Experimental Example 3-6, bacterial cellulose according to Experimental Example 1-5, and general bacterial cellulose according to Experimental Example 1-6

Referring to FIG. 42, a moisture impregnation rate was measured depending on temperatures for solid state electrolytes according to Experimental Examples 3-1 to 3-5 as described above, chitosan according to Experimental Example 3-6, bacterial cellulose according to Experimental Example 1-5 and general bacterial cellulose according to Experimental Example 1-6.

As can be understood from FIG. 42, the moisture impregnation rate was increased as a temperature rose with regard to solid state electrolytes according to Experimental Examples 3-1 to 3-5, chitosan according to Experimental Example 3-6, bacterial cellulose according to Experimental Example 1-5, from which chitosan is omitted, and general bacterial cellulose according to Experimental Example 1-6.

In the room temperature range, it can be confirmed that the solid state electrolyte with 50 wt % of chitosan according to Experimental Example 3-3 has a moisture impregnation rate higher than that of the solid state electrolytes according to Experimental Examples 3-1, 3-2, 3-4, and 3-5 as well as the bacterial cellulose of Experimental Example 1-5, from which chitosan is omitted, the general bacterial cellulose of Experimental Example 1-6, and chitosan of Experimental Example 3-6. As a result, it can be confirmed that controlling the ratio of chitosan to more than 30 wt % and less than 70 wt % in the solid state electrolyte is an efficient way to improve the moisture impregnation rate.

FIG. 43 is a graph for explaining results of measuring a voltage of a solid state electrolyte according to Experimental Example 1-4 of the present application.

Referring to FIG. 43, the solid state electrolyte according to Experimental Example 1-4 as described above was inserted between the zinc electrodes, and voltage was measured under current density conditions of 5 mAcm$^{-2}$, 10 mAcm$^{-2}$, and 20 mAcm$^{-2}$, while instead of the solid state electrolyte according to Experimental Example 1-4, the A201 membrane was inserted between the zinc electrodes to measure the voltage under the same conditions. The graph at the top of FIG. 43 indicates a voltage value in 999 and 1000 consecutive cycles, and the picture at the bottom of FIG. 43 is a SEM picture of the zinc electrode after 1000 times.

As can be understood from FIG. 43, it could be confirmed that, when the A201 membrane is used, it does not run about 23 hours later, but when the solid state electrolyte according to Experimental Example 1-4 of the present application is used, it stably runs up to 1000 times at a high current density.

In addition, as can be understood from the SEM picture at the bottom of FIG. 43, it can be confirmed that it is stably driven without dendrites produced, even when a high-density current is applied for a long time.

FIG. 44 is a graph for explaining a charge/discharge capacity of a metal-air battery including a solid state electrolyte according to Experimental Example 1-4 of the present application.

Referring to FIG. 44, a metal-air battery was prepared by using the solid state electrolyte according to Experimental Example 1-4 as described above, a positive electrode of a compound structure of copper, phosphorus, and sulfur, and a patterned negative electrode of zinc. Under the same conditions, a metal-air battery (Pt/C) was prepared by using commercially available Pt/C and RuO$_2$ instead of the compound structure of copper, phosphorus, and sulfur as a positive electrode.

The positive electrode of the compound structure of copper, phosphorus, and sulfur was prepared by the following method.

Three suspensions of ethanol/ethylenediamine were prepared, and then dithiooxamide, tetradecylphosphonic acid/ifosfamide, and copper chloride were added and stirred, respectively.

Subsequently, a dithiooxamide solution and tetradecylphosphonic acid/ifosfamide were continuously and gradually injected into the copper chloride solution while stirring, and ammonium hydroxide was added thereto, and stirred for two hours.

The resulting black suspension of copper-dithiooxamide-tetradecylphosphonic acid-ifosfamide was refluxed at 120° C. for six hours, collected by centrifugation, washed with deionized water and ethanol, and dried under vacuum.

After that, the obtained precursor suspension of copper-dithiooxamide-tetradecylphosphonic acid-ifosfamide was mixed with deionized water containing Triton X-165 and sodium bisulfite in an ice bath. The reaction suspension was autoclaved and cooled to room temperature. The obtained black solid state sponge was washed with deionized water and ethanol until the supernatant reached a neutral pH.

The resulting product was transferred to a −70° C. environment for two hours, immersed in liquid nitrogen, and freeze-dried in a vacuum condition to prepare a positive electrode material of a compound structure of copper, phosphorus and sulfur, and a positive electrode material (90 wt %), super P carbon (5 wt %), and PTFE (5 wt %) were mixed in N-methyl-pyrrolidone containing 0.5 wt % of Nafion solution so as to prepare a slurry. The slurry was coated on a stainless steel mesh and the solvent was evaporated. Then, the resulting product was cut into a size of 6 cm×1.5 cm and dried under vacuum to prepare a positive electrode.

As can be understood from FIG. 44, it can be confirmed that it has excellent charge/discharge capacity under the conditions of 25 mAcm$^{-2}$ and 50 mAcm$^{-2}$. In case of using the compound structure of copper, phosphorus, and sulfur prepared as described above, it can be confirmed that it has a remarkably high capacity compared to the case of using Pt/C and RuO$_2$.

FIG. 45 is a graph showing results of measuring a voltage value of a metal-air battery including a solid state electrolyte according to Experimental Example 1-4 of the present application depending on the number of charges/discharges.

Referring to FIG. 45, a voltage value according to the number of charge/discharge times was measured under the conditions of 50 mAcm$^{-2}$ and 25 mA$^{-2}$ for a metal-air battery using a solid state electrolyte according to Experimental Example 1-4 as described above with reference to FIG. 44, a positive electrode of a compound structure of copper, phosphorus, and sulfur, and a patterned negative electrode of zinc.

As can be understood from FIG. 45, it can be confirmed that it is stably driven for about 600 times of charging and discharging. In other words, it can be confirmed that the solid state electrolyte prepared according to an embodiment of the present invention as described above is stably used as a solid state electrolyte for a metal-air battery.

FIG. 46 includes graphs (a) and (b) for explaining a change in charge/discharge properties of a metal-air battery including a solid state electrolyte according to Experimental Example 1-4 of the present application depending on an external temperature condition.

Referring to (a) and (b) of FIG. 46, a change in charge/discharge properties was measured while changing an external temperature from −20° C. to 80° C. with regard to a metal-air battery using a solid state electrolyte (CBCs) according to Experimental Example 1-4 as described above with reference to FIG. 44, a positive electrode of a compound structure of copper, phosphorus, and sulfur, and a patterned negative electrode of zinc. In (b) of FIG. 46, a current density was measured at 25 mA cm$^{-2}$.

As can be understood from (a) and (b) of FIG. 46, it can be confirmed that a voltage value increases and has a low overpotential as a temperature increases. In other words, it can be confirmed that the secondary battery including the solid state electrolyte according to Experimental Example 1-4 of the present application is stably driven in high and low temperature environments.

FIG. 47 is a view for explaining retention properties of a metal-air battery including a solid state electrolyte according to Experimental Example 1-4 of the present application depending on the number of charges/discharges in low and high environments.

Referring to FIG. 47, a cycle of charge/discharge was performed under the condition of 25 mAcm$^{-2}$ while controlling an external temperature to −20° C. and 80° C. with regard to a metal-air battery using an solid state electrolyte (CBCs) according to Experimental Example 1-4 as described above with reference to FIG. 44, a positive electrode of a compound structure of copper, phosphorus, and sulfur, and a patterned negative electrode of zinc.

As can be understood from FIG. 44, it can be confirmed that the retention properties are subtly degraded under the condition of −20° C., but it is stably driven while maintaining high retention properties of about 94.5% and stably runs even after 1,500 charges/discharges at high and low temperatures.

FIG. 48 includes graphs (a) and (b) for explaining charge/discharge properties of a metal-air battery including a solid state electrolyte according to Experimental Example 1-4 of the present application depending on an external temperature.

Referring to (a) and (b) of FIG. 48, a voltage of charge/discharge was measured and a Nyquist plot was illustrated under the condition of 25 mA cm$^{-2}$ while controlling an external temperature to −20° C., 25° C., and 80° C. with regard to a metal-air battery using an solid state electrolyte (CBCs) according to Experimental Example 1-4 as described above with reference to FIG. 44, a positive electrode of a compound structure of copper, phosphorus, and sulfur, and a patterned negative electrode of zinc.

As can be understood from (a) and (b) of FIG. 48, it can be confirmed that only a slight deterioration in properties is observed in a low-temperature environment, and it stably runs at low, room and high temperatures.

FIG. 49 includes graphs (a) and (b) for explaining a capacity property of a metal-air battery including a solid state electrolyte according to Experimental Example 1-4 of the present application depending on an external temperature.

Referring to (a) and (b) of FIG. 49, a capacity was measured under the condition of 25 mA cm$^{-2}$ while controlling an external temperature to −40° C. to 105° C. with regard to a metal-air battery using an solid state electrolyte (CBCs) according to Experimental Example 1-4 as described above, a positive electrode of a compound structure of copper, phosphorus, and sulfur, and a patterned negative electrode of zinc.

As can be understood from (a) and (b) of FIG. 49, it can be confirmed that it has a high capacity of 1 Ah or more in the range of −20° C. to 80° C. In contrast, it can be confirmed that the mobility of OH ions in the solid state electrolyte rapidly decreases rapidly below −20° C., and thus the capacity rapidly decreases rapidly, while the capacity properties are rapidly deteriorated due to evaporation of the solvent in the solid state electrolyte at more than 80° C. Specifically, the capacity significantly decreased to 0.234 Ah at −40° C. and significantly decreased to 0.394 Ah at 105° C.

FIG. 50 includes graphs (a) and (b) for explaining a change in charge/discharge properties of a metal-air battery including a solid state electrolyte according to Experimental Example 1-4 of the present application depending on a charge/discharge cycle caused by an external temperature.

Referring to (a) and (b) of FIG. 50, charge/discharge were performed 1,500 times for 200 hours under the condition of 25 mA cm$^{-2}$ while controlling an external temperature to −20° C. and 80° C. with regard to a metal-air battery using an solid state electrolyte (CBCs) according to Experimental Example 1-4 as described above with reference to FIG. 44, a positive electrode of a compound structure of copper, phosphorus, and sulfur, and a patterned negative electrode of zinc. The result of charge/discharge under the condition of −20° C. is shown in (a) of FIG. 50, and the result of charge/discharge under the condition of 80° C. is shown in (b) of FIG. 50.

As can be understood from (a) and (b) of FIG. 50, it can be confirmed that the charge/discharge properties are slightly deteriorated in a low temperature environment of −20° C., but it stably runs for a long time and stably runs for a long time even in a high temperature environment of 80° C.

FIG. 51 is a block view showing an electric automobile according to an embodiment of the present prevention.

Referring to FIG. 51, an electric automobile 1000 according to an embodiment of the present invention may include at least one of a motor 1010, a transmission 1020, an axle 1030, a battery pack 1040, a power control unit 1050, and a charging unit 1060.

The motor 1010 may convert electric energy of the battery pack 1040 into kinetic energy. The motor 1010 may provide the converted kinetic energy to the axle 1030 through the transmission 1020. The motor 1010 may be formed of a single motor or a plurality of motors. For example, when the motor 1010 includes a plurality of motors, the motor 1010 may include a front wheel motor for supplying kinetic energy to a front axle and a rear wheel motor for supplying kinetic energy to a rear axle.

The transmission 1020 may be positioned between the motor 1010 and the axle 1030 to provide the kinetic energy from the motor 1010 to the axle 1030 by shifting to suit the driving environment desired by the driver.

The battery pack 1040 may store electric energy from the charging unit 1060 and may provide the stored electric energy to the motor 1010. The battery pack 1040 may directly supply electric energy to the motor 1010 or may supply electric energy through the power control unit 1050.

In this case, the battery pack 1040 may include at least one battery cell. In addition, the battery cell may include a metal-air secondary battery including the solid state electrolyte according to an embodiment as described above, but is not limited thereto and may include various types of secondary batteries. Meanwhile, the battery cell may refer to an individual battery, and the battery pack may refer to an assembly of battery cells in which individual battery cells are interconnected to have a desired voltage and/or capacity.

The power control unit 1050 may control the battery pack 1040. In other words, the power control unit 1050 may control the power from the battery pack 1040 to the motor 1010 to have a required voltage, current, and waveform. For this purpose, the power control unit 1050 may include at least one of a passive power device and an active power device.

The charging unit 1060 may receive power from an external power source 1070 as shown in FIG. 43 and may provide to the battery pack 1040. The charging unit 1060 may generally control a charging state. For example, the charging unit 1060 may control charging on/off, a charging speed, and the like.

Although the invention has been described in detail with reference to embodiments, the scope of the present invention is not limited to a specific embodiment and should be interpreted by the attached claims. In addition, those skilled in the art should understand that many modifications and variations are possible without departing from the scope of the present invention.

INDUSTRIAL APPLICABILITY

A solid state electrolyte according to an embodiment of the present application may be used in various industrial fields such as an electrochemical element, e.g., a secondary battery, an energy storage device, a battery for an electric automobile, a water electrolysis cell, and a fuel cell.

The invention claimed is:

1. A method for preparing a solid state electrolyte, the method comprising:
preparing a quaternized chitosan derivative from chitosan chloride by (a) dissolving chitosan chloride in aqueous acetic acid, and (b) treating the dissolved chitosan chloride with glycidyltrimethylammonium chloride to form the quaternized chitosan derivative;
preparing a culture medium having the quaternized chitosan derivative;
culturing *Acetobacter xylinum* in the culture medium to produce quaternized chitosan bound to bacterial cellulose; and
oxidizing a surface of the quaternized chitosan bound to bacterial cellulose by using an oxidizing agent to form a solid state electrolyte, wherein the solid state electrolyte has a chitosan content that is more than 30 wt % and less than 70 wt %.

2. The method of claim 1, wherein a ratio of crystallinity of the solid state electrolyte, an ionic conductivity of the solid state electrolyte, and a swelling ratio of the solid state electrolyte are controlled depending on a ratio of the quaternized chitosan derivative in the culture medium.

3. The method of claim 1, wherein:
oxidizing agent comprises a hypochlorite.

4. A method for preparing a solid state electrolyte, the method comprising:
oxidizing a surface of bacterial a cellulose, to which quaternized chitosan is bound, by using an oxidizing agent to prepare a first complex fiber;
binding bromine to the surface of the bacterial cellulose to form a brominated complex fiber;
substituting bromine in the brominated complex fiber with a nitrogen-containing first functional group to prepare a second complex fiber; and
crosslinking the first complex fiber and the second complex fiber to form a solid state electrolyte.

5. A method for preparing a solid state electrolyte, the method comprising:
preparing a quaternized chitosan derivative from chitosan chloride;
preparing a culture medium having the quaternized chitosan derivative;
culturing *Acetobacter xylinum* in the culture medium to produce quaternized chitosan bound to bacterial cellulose; and
oxidizing a surface of the quaternized chitosan bound to the bacterial cellulose by using an oxidizing agent to form
a solid state electrolyte, wherein a content of the quaternized chitosan in the solid state electrolyte is more than 30 wt % and less than 70 wt %.

6. The method of claim 5, wherein the content of the quaternized chitosan is adjusted based on an amount of the quaternized chitosan derivative used when producing the quaternized chitosan bound to the bacterial cellulose.

7. The method of claim 5, further comprising:
brominating a surface of the quaternized chitosan bound to the bacterial cellulose to form a brominated complex fiber; and
substituting bromine in the brominated complex fiber with a nitrogen-containing functional group to prepare a complex fiber.

* * * * *